US006343237B1

(12) United States Patent
Rossow et al.

(10) Patent No.: US 6,343,237 B1
(45) Date of Patent: Jan. 29, 2002

(54) USER INTERFACE FUNCTIONALITY FOR POWER MACHINE CONTROL SYSTEM

(75) Inventors: Scott R. Rossow, Kindred; Kenneth A. Brandt, Wyndmere, both of ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/326,108

(22) Filed: Jun. 4, 1999

(51) Int. Cl.$^7$ ............................................. G05B 15/00
(52) U.S. Cl. .................................... 700/83; 701/50
(58) Field of Search .................. 701/50, 35; 700/83; 340/462

(56) References Cited

U.S. PATENT DOCUMENTS

| | | | |
|---|---|---|---|
| 4,447,860 A | 5/1984 | Stone et al. ................ 362/30 |
| 4,570,151 A | * 2/1986 | Martorano et al. ......... 340/462 |
| 4,716,262 A | 12/1987 | Morse ....................... 200/5 A |
| 4,744,218 A | 5/1988 | Edwards et al. ............. 60/368 |
| 4,852,680 A | 8/1989 | Brown et al. ............... 180/287 |
| 4,910,662 A | 3/1990 | Heiser et al. ................ 700/65 |
| 4,926,331 A | * 5/1990 | Windle et al. ............... 701/35 |
| D316,393 S | 4/1991 | Kaczmarski ............... D12/192 |
| 5,260,875 A | 11/1993 | Tofte et al. .................. 701/50 |
| 5,361,059 A | * 11/1994 | Hoffman et al. ........... 340/438 |
| 5,404,443 A | 4/1995 | Hirata ......................... 345/327 |
| 5,425,431 A | * 6/1995 | Brandt et al. .............. 180/273 |
| 5,430,266 A | 7/1995 | Austin, Jr. et al. ....... 200/302.1 |
| 5,446,655 A | 8/1995 | Fukuda et al. ................. 701/1 |
| 5,448,028 A | 9/1995 | Filion et al. .............. 200/52 R |
| 5,547,039 A | 8/1996 | Berger et al. ............... 180/287 |
| 5,558,178 A | 9/1996 | Hess et al. .................. 108/197 |
| 5,579,227 A | 11/1996 | Simmons, Jr. et al. ........ 701/29 |
| 5,586,620 A | 12/1996 | Dammeyer et al. ......... 187/227 |
| 5,680,099 A | 10/1997 | Springston .................. 340/461 |
| 5,687,081 A | 11/1997 | Wellman et al. ............. 701/50 |
| 5,694,318 A | 12/1997 | Miller et al. ................ 455/575 |
| 5,821,631 A | 10/1998 | Loraas et al. .............. 307/10.4 |
| 5,854,988 A | * 12/1998 | Davidson et al. ............ 701/50 |
| 5,949,330 A | * 9/1999 | Hoffman et al. ............ 340/438 |
| 6,060,981 A | 5/2000 | Landes ....................... 340/426 |
| 6,061,617 A | * 5/2000 | Berger et al. ................. 701/50 |

* cited by examiner

*Primary Examiner*—William Grant
*Assistant Examiner*—Edward F Gain, Jr.
(74) *Attorney, Agent, or Firm*—Joseph R. Kelly; Westman, Champlin & Kelly, P.A.

(57) ABSTRACT

The present invention is directed to a user interface to a computer-based control system for controlling hydraulic and/or electro-mechanical actuators, or electrical actuators on a power machine. The user interface provides one or more features to increase functionality or usefulness in the user interface.

In one illustrative embodiment, the user interface includes a display device, such as a bit-mapped liquid crystal display screen which displays the status of a number of vital functions associated with the power machine. In accordance with another feature of the present invention, the control system senses a number of parameters and records warning conditions associated with the sensed parameters. The user interface can allow the user to view active warning conditions, scroll through active warning conditions and view help screens designed to enhance trouble shooting associated with the active warnings. In accordance with another illustrative embodiment, the control system monitors for shutdown conditions and displays a display screen on the user interface which allows the user to view information describing the shutdown conditions. In accordance with yet another illustrative embodiment of the present invention, the user interface allows a user to access tutorial-type help screens which assist in the performance of various tasks associated with attachments to a power machine and associated operator actuable inputs.

25 Claims, 57 Drawing Sheets

```
═══════════VITALS═══════════                    M/E  >

ENGINE OIL PRESSURE                              16 BAR
ENGINE COOLANT TEMPERATURE                       32 °C

HYDRAULIC CHARGE PRESSURE                        34 BAR
HYDRAULIC OIL TEMPERATURE                        65 °C

SYSTEM VOLTAGE                                   14.3 V
ENGINE SPEED                                     2320 N/M

EXIT
```

USER INTERFACE FUNCTIONALITY FOR POWER MACHINE CONTROL SYSTEM

REFERENCE TO CO-PENDING APPLICATIONS

Reference is made to the following co-pending patent applications:

"DISPLAY PANEL FOR POWER MACHINE", Ser. No. 29/103,252, filed Apr. 12, 1999;

"DISPLAY PANEL FOR POWER MACHINE", Ser. No. 29/103,267, filed Apr. 12, 1999;

"DISPLAY PANEL FOR POWER MACHINE", Ser. No. 29/103,256, filed Apr. 12, 1999; and "FEATURES OF MAIN CONTROL COMPUTER FOR A POWER MACHINE" Ser. No. 09/298,671, filed Apr. 23, 1999.

The applications are hereby incorporated by reference.

BACKGROUND OF THE INVENTION

The present invention generally relates to power machines. More specifically, the present invention relates to a user interface for a control system used to control a power machine.

Power machines, such as skid steer loaders, typically have a frame which supports a cab and a movable lift arm which, in turn, supports a work tool such as a bucket. The movable lift arm is pivotally coupled to the frame of the skid steer loader by power actuators which are commonly hydraulic cylinders. In addition, the tool is coupled to the lift arm by one or more additional power actuators which are also commonly hydraulic cylinders. An operator manipulating the skid steer loader raises and lowers the lift arm, and manipulates the tool, by actuating the hydraulic cylinders coupled to the lift arm, and the hydraulic cylinders coupled to the tool. When the operator causes the hydraulic cylinders coupled to the lift arm to increase in length, the lift arm moves generally vertically upward. Conversely, when the operator causes the hydraulic cylinders coupled to the lift arm to decrease in length, the lift arm moves generally vertically downward. Similarly, the operator can manipulate the tool (e.g., tilt the bucket) by controlling the hydraulic cylinders coupled to the lift arm and the working tool to increase or decrease in length, as desired.

Skid steer loaders also commonly have an engine which drives a hydraulic pump to, in turn, power hydraulic traction motors which power movement of the skid steer loader. The traction motors are commonly coupled to the wheels through a drive mechanism such as a chain drive.

SUMMARY OF THE INVENTION

The present invention is directed to a user interface to a computer-based control system for controlling hydraulic and/or electromechanical actuators, or electrical actuators on a power machine. The user interface provides one or more features to increase functionality or usefulness in the user interface.

In one illustrative embodiment, the user interface includes a display device, such as a bitmapped liquid crystal display (LCD) screen which displays the status of a number of vital functions associated with the power machine. Such functions can include oil pressure, temperature, engine speed, and battery voltage. The user interface also provides help screens which describe various aspects of the display.

In accordance with another feature of the present invention, the control system senses a number of parameters and records warning conditions associated with the sensed parameters. The user interface can allow the user to view active warning conditions, scroll through active warning conditions, and view help screens designed to enhance trouble shooting associated with the active warnings.

In accordance with another illustrative embodiment, the control system monitors certain parameters which cause a shutdown condition. In the event of a shutdown condition, the control system automatically displays a display screen on the user interface which allows the user to view information describing the shutdown condition. The user interface provides a help screen associated with each shutdown condition in order to provide additional information regarding the shutdown condition, should the operator desire such information.

In accordance with yet another illustrative embodiment of the present invention, in the user interface allows the user to access additional information about features of the power machine, such as attachments which are then attached to the power machine. In one such embodiment, the control computer automatically detects the type of attachment which is attached to the control computer, and allows the user to view tutorial-type help screens which indicate the function performed by various operator actuable inputs. In another such embodiment, the user manually selects the type of attachment then attached to the power machine, and the user interface allows the user to view the associated tutorial-type help screens.

DETAILED DESCRIPTION OF THE ILLUSTRATIVE EMBODIMENTS

The present description proceeds with respect to a loader described below. However, it should be noted that the present invention can be implemented in other power machines, such as mini-excavators, as well. The present invention is described with respect to the loader for illustrative purposes only.

Figure 1:
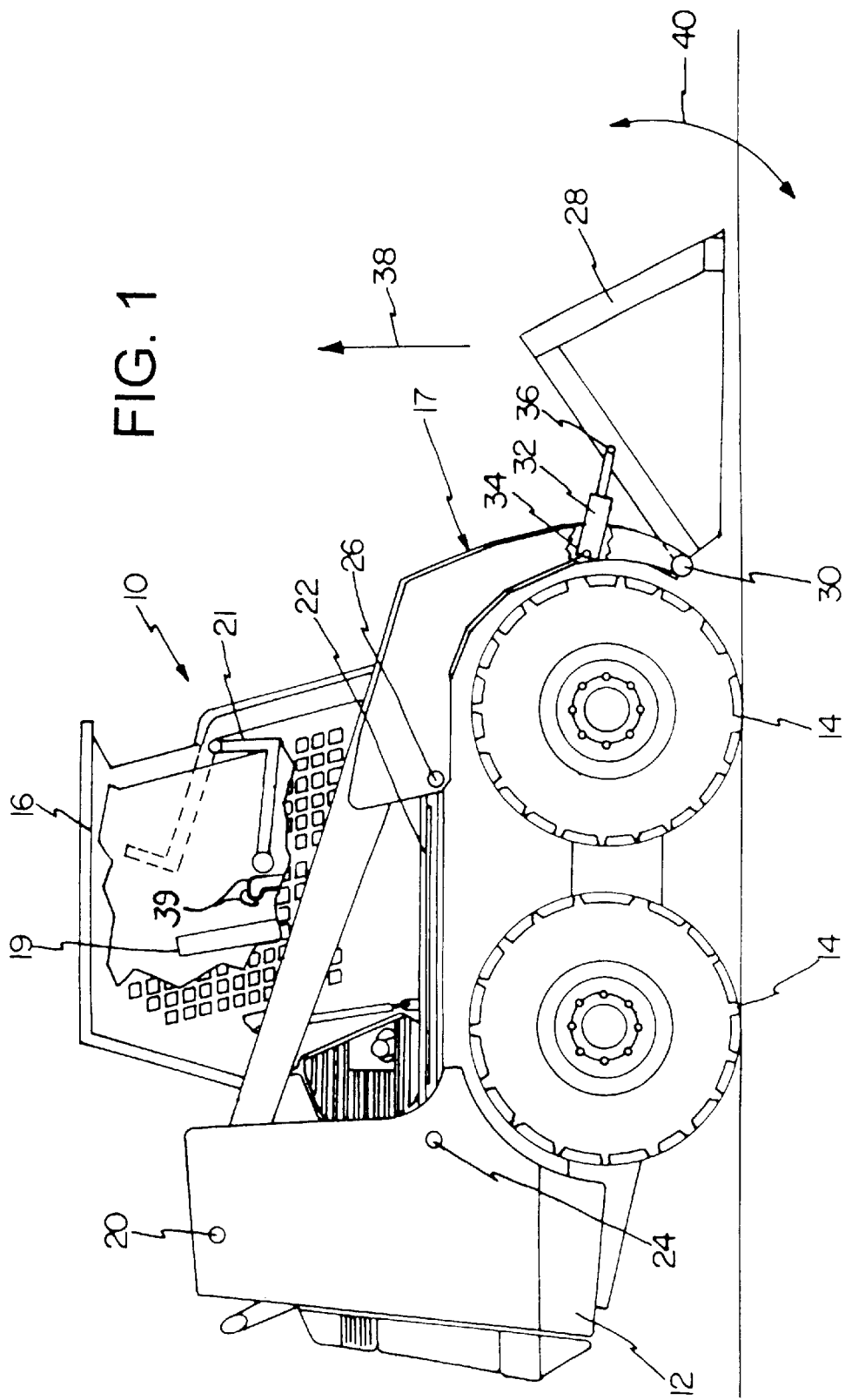
FIG. 1 is a side view of a skid steer loader in accordance with one aspect of the present invention.

FIG. 1 is a side elevational view of a skid steer loader 10 of the present invention. Skid steer loader 10 includes a frame 12 supported by wheels 14. Frame 12 also supports a cab 16 which defines an operator compartment and which substantially encloses a seat 19 on which an operator sits to control skid steer loader 10. Cab 16 can take any shape desired and is illustrated with the shape shown for illustrative purposes only. A seat bar 21 is pivotally coupled to a portion of cab 16. When the operator occupies seat 19, the operator then pivots seat bar 21 from the raised position (shown in phantom in FIG. 1) to the lowered position shown in FIG. 1. It should also be noted that seat bar 21 can be a rear pivot seat bar or can take substantially any other form.

A lift arm 17 is coupled to frame 12 at pivot points 20 (only one of which is shown in FIG. 1, the other being identically disposed on the opposite side of loader 10). A pair of hydraulic cylinders 22 (only one of which is shown in FIG. 1) are pivotally coupled to frame 12 at pivot points 24 and to lift arm 17 at pivot points 26. Lift arm 17 is also coupled to a working tool which, in this preferred embodiment, is a bucket 28. Lift arm 17 is pivotally coupled to bucket 28 at pivot points 30. In addition, another hydraulic cylinder 32 is pivotally coupled to lift arm 17 at pivot point 34 and to bucket 28 at pivot point 36. While only one cylinder 32 is shown, it is to be understood that any desired number of cylinders could be used to work bucket 28 or any other suitable tool.

The operator residing in cab 16 can manipulate lift arm 17 and bucket 28 by selectively actuating hydraulic cylinders 22 and 32. By actuating hydraulic cylinders 22 and causing hydraulic cylinders 22 to increase in length, the operator moves lift arm 17, and consequently bucket 2E, generally vertically upward in the direction indicated by arrow 38. Conversely, when the operator actuates cylinder 22 causing it to decrease in length, bucket 28 moves generally vertically downward to the position shown in FIG. 1.

The operator can also manipulate bucket 28 by actuating cylinder 32. When the operator causes cylinder 32 to increase in length, bucket 28 tilts forward about pivot points 30. Conversely, when the operator causes cylinder 32 to decrease in length, bucket 28 tilts rearward about pivot points 30. The tilting is generally along an arcuate path indicated by arrow 40.

FIG. 1 also illustrates a plurality of hand controls, or hand grips 39 which reside within the operator compartment 16. Hand grips 39 preferably are provided with a number of actuators (such as push buttons, potentiometers, switches, etc.) which can be manipulated by the operator to accomplish certain functions. The operator-actuable inputs on hand grips 39 in one illustrative embodiment provide electrical signals to a control computer (described in greater detail later in the specification) which controls certain functions of loader 10 in response to the signals received.

In addition in one illustrative embodiment, one or more operator input and display panels (shown in FIG. 2) are provided in operator compartment 16. The operator input display panels provide a display for indicating certain items of information to the operator, and can also provide additional operator input devices, such as a membrane keypad, a touch sensitive screen, etc., through which the operator can provide inputs.

It should, however, be noted that inputs can be provided in a mechanical way as well. For instance, hand grips 38 can be coupled to levers which control valve spools or solenoids through mechanical linkages. Similarly, foot pedals can be provided in operator compartment 16 which also control valve spools or solenoids through mechanical linkages.

In addition, loader 10 illustratively has one or more auxiliary hydraulic couplings (not shown in FIG. 1) which can be provided with quick disconnect type fittings. Hydraulic pressure to the auxiliary couplings can also be controlled based on signals from one or more of the operator input devices within operator compartment 16.

Figure 2:
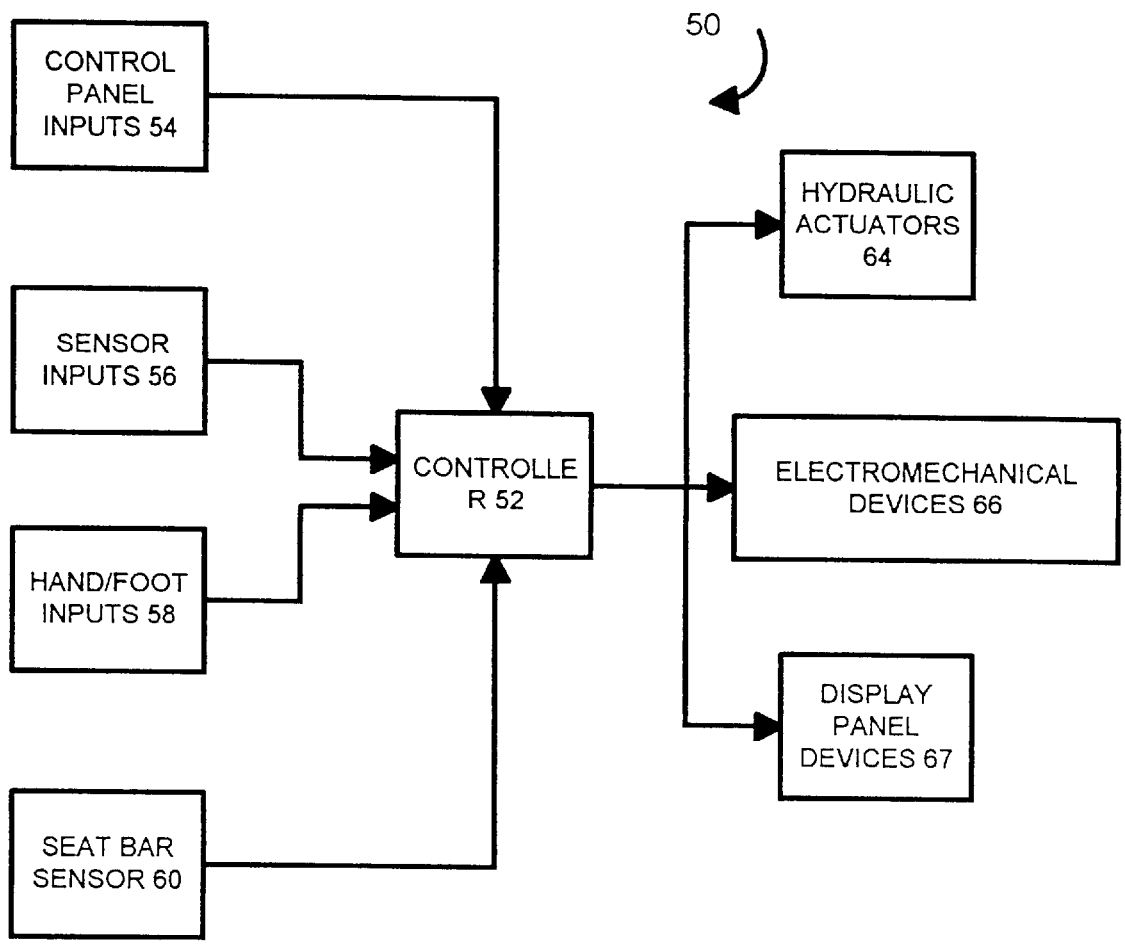
FIG. 2 is a block diagram of a control system in accordance with one aspect of the present invention.

FIG. 2 is a block diagram of one embodiment of a control system 50. System 50 includes controller 52, control panel inputs 54, sensor inputs 56, hand/foot inputs 58, sensor 60, hydraulic actuators 64, electro-mechanical solenoids 66, and display panel devices 67. Controller 52 is illustratively a digital computer, microprocessor, or microcontroller with associated memory which can be integrated or provided separately. Controller 52 also includes appropriate timing circuitry.

Control panel inputs 54 can include a wide variety of operator input devices (such as buttons, a keypad, etc.) used to control such features as headlights, interlock systems, ignition, the user interface, etc. This Information can be transmitted to controller 52 via direct digital inputs, a one-way serial stream or any number of bi-directional serial communication protocols. Similarly, the connection between control panel inputs 54 and controller 52 illustratively includes power and ground connections as well.

Sensor inputs 56 can also include a wide variety of analog or digital sensors or frequency inputs indicative of operating conditions or other sensed items, such as engine oil pressure sensor, fuel sensor, engine cooling sensor, air filter sensor (which indicates reduced air flow—thus indicating a clogged air filter), engine speed sensor, a hydraulic oil temperature sensor, a hydraulic oil charge pressure sensor, and/or a hydraulic oil filter pressure switch, etc.

Hand grip and foot pedal inputs 58 can also include a variety of input devices which form the operator actuable inputs within operator compartment 16. Such inputs can provide signals indicative of requested operation of the auxiliary hydraulic couplers (e.g., modulated control), requested detent, requested high speed or low speed operation in a multi-speed loader, and other requested functions (such as lift and tilt of the tool mounted to the loader, etc.).

Seat bar sensor 60 is illustratively coupled to seat bar 21. Seat bar sensor 60 illustratively provides a signal indicative of whether seat bar 21 is in the raised or lowered position illustrated in FIG. 1.

Hydraulic actuators 64 illustratively include the lift and tilt cylinders for use in manipulating tool 28 (shown in FIG. 1), a high flow valve for emitting high flow hydraulic fluid in response to a user input, a diverter valve for diverting hydraulic fluid to the auxiliary couplers in response to a user input, auxiliary relief valves, and a plurality of lockout valves for being actuated in response to operator inputs, or in response to certain sensed operating parameters. Of course, the hydraulic actuators are controlled by manipulating valve spools of valves connected between the specific actuator being controlled and a source of, or reservoir for, hydraulic fluid. Such valves include one or more primary valves controlling flow to primary hydraulic couplers and optionally one or more auxiliary valves for controlling flow to auxiliary hydraulic couplers. The valves can be controlled electronically, hydraulically or mechanically. Block 64 represents all of these elements.

Electromechanical solenoids 66 also include a wide variety of items. Some items are embodied as electrical relays which are controlled by energizing an electrical relay coil. Such electromechanical devices illustratively include a starter relay for energizing a starter, a switched power relay for providing battery power for switched power devices, a fuel shut-off relay for energizing a fuel shut-off valve, a traction lock relay for energizing a traction lock solenoid, a glow plug relay for energizing glow plugs, and light relays for controlling various lights (such as headlights, marker lights, etc.).

Figure 3:
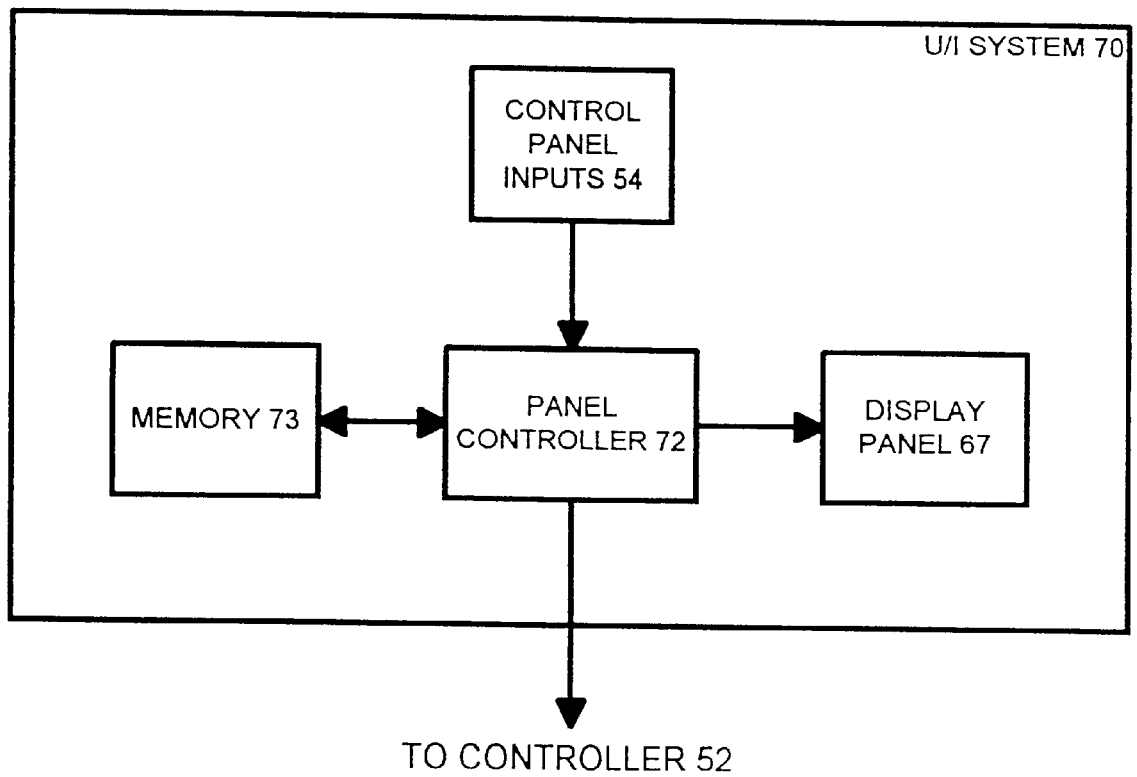
FIG. 3 is a more detailed block diagram of a user interface system in accordance with one aspect of the present invention.

Display panel devices 67 are illustratively devices which receive outputs from controller 52 (and illustratively through a user interface controller such as that shown in FIG. 3) and indicate information to the operator. Such devices can include, for example, indicator lights, an hour meter, actual or virtual gauges, a display screen, a CRT, a plasma display, LEDs, etc. Display panel devices 67 can be integrated with control panel inputs 54 as a unitary input and display panel (such as user interface system 70 shown in FIG. 3), or provided separately therefrom.

In operation, controller 52 receives a variety of inputs from the control panel inputs 54, the sensor inputs 56, the hand and foot actuable inputs 58, and seat bar sensor 60. In response to those inputs, controller 54 provides outputs to hydraulic actuators 64 electromechanical devices 66 and display panel devices 67 to control various functions on loader 10.

FIG. 3 is a more detailed block diagram of a user interface (U/I) system 70 which implements a portion of a user interface in accordance with one aspect of the present invention. In the embodiment illustrated in FIG. 3, U/I system 70 includes control panel inputs 54, display panel 67 and a panel controller 72 which is coupled to controller 52 (shown in FIG. 2) and memory 73. Panel controller 72, in one illustrative embodiment, is a digital computer, microcontroller or microprocessor with associated memory.

Display controller 72, in one embodiment, receives inputs from control panel inputs 54 and sends messages indicative of those inputs over a suitable communication link (such as a serial or parallel communication link) to controller 52. Controller 52 transmits messages back to panel controller 72 over the same or a different link. Based on the inputs received from control panel inputs 54 and controller 52, panel controller 72 accesses memory 73 for display information and renders a display on display panel 67.

Figure 4:
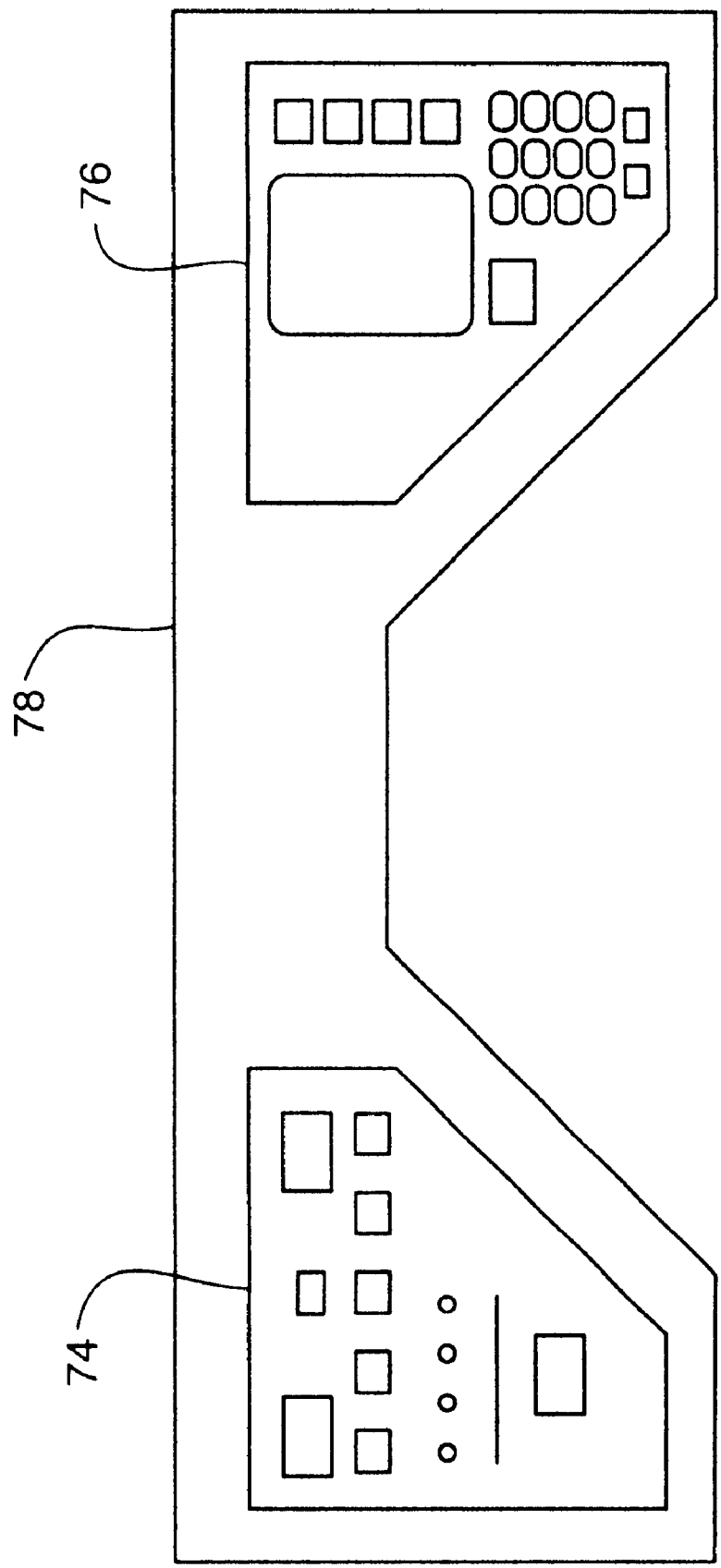
FIG. 4 is an illustration of a user interface system configuration in accordance with one aspect of the present invention.

FIG. 4 is one illustrative embodiment of U/I system 10 implemented on the dashboard (or control panel) of a power machine. U/I system 10 includes a first panel 74 and a second panel 76. Both panels 74 and 76 include user input devices, such as push buttons, keypads, etc. Also, both panels 74 and 76 include display elements, such as indicator lights, a display screen, etc. In one illustrative embodiments, one of panels 74 and 76 includes panel controller 72 integrally mounted thereon. The other of panels 74 and 76 is coupled to panel controller 72 through appropriate wiring, printed circuit traces, etc. Also, in one illustrative embodiment, panels 74 and 76 are removable and replaceable by unfastening screws or mounting bolts which are used to secure panels 74 and 76 within apertures preformed in dashboard 78.

Figure 5A:
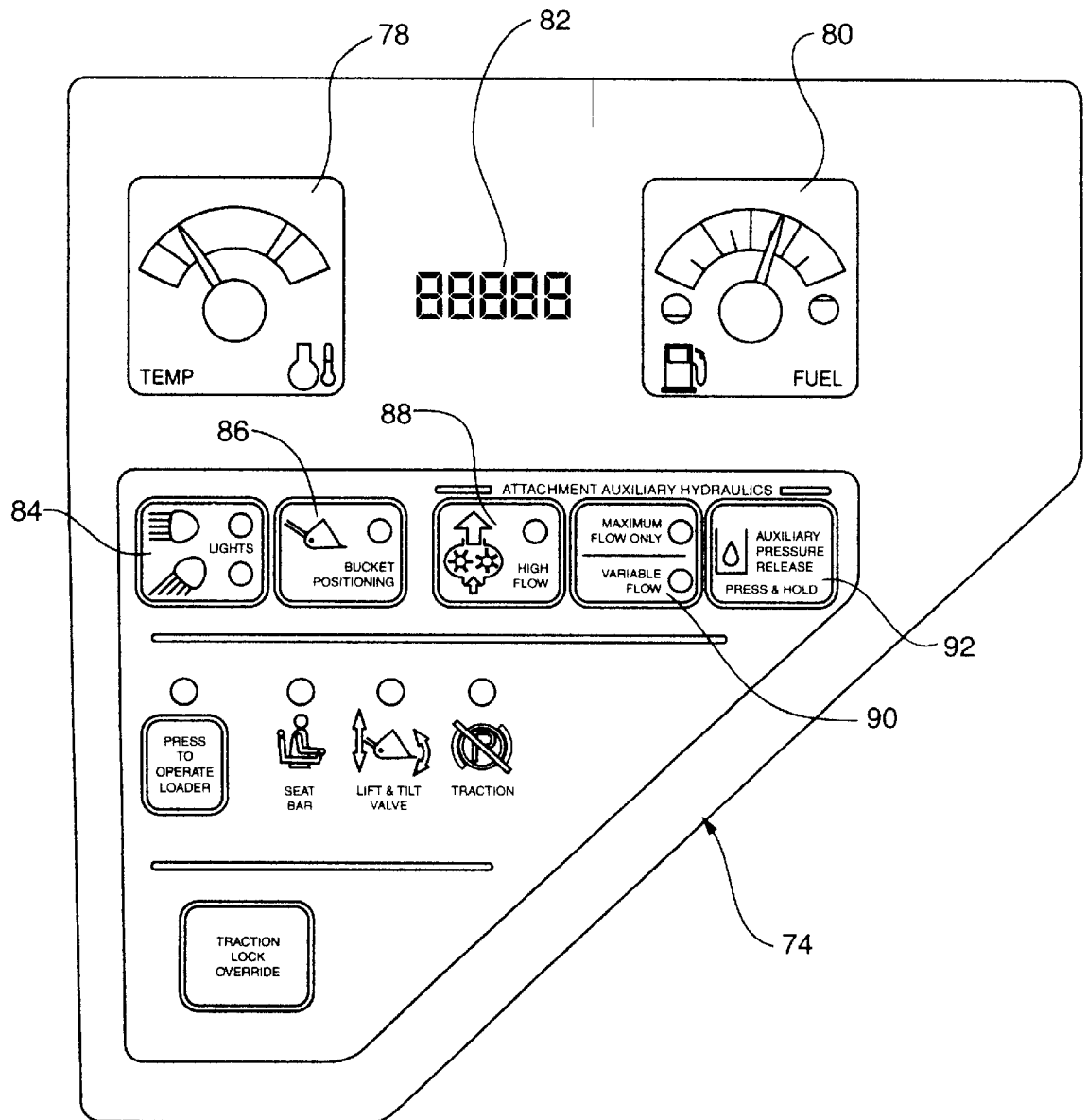
FIGS. 5A–5C are embodiments of control/display panels in accordance with various aspects of the present invention.
Figure 5B:
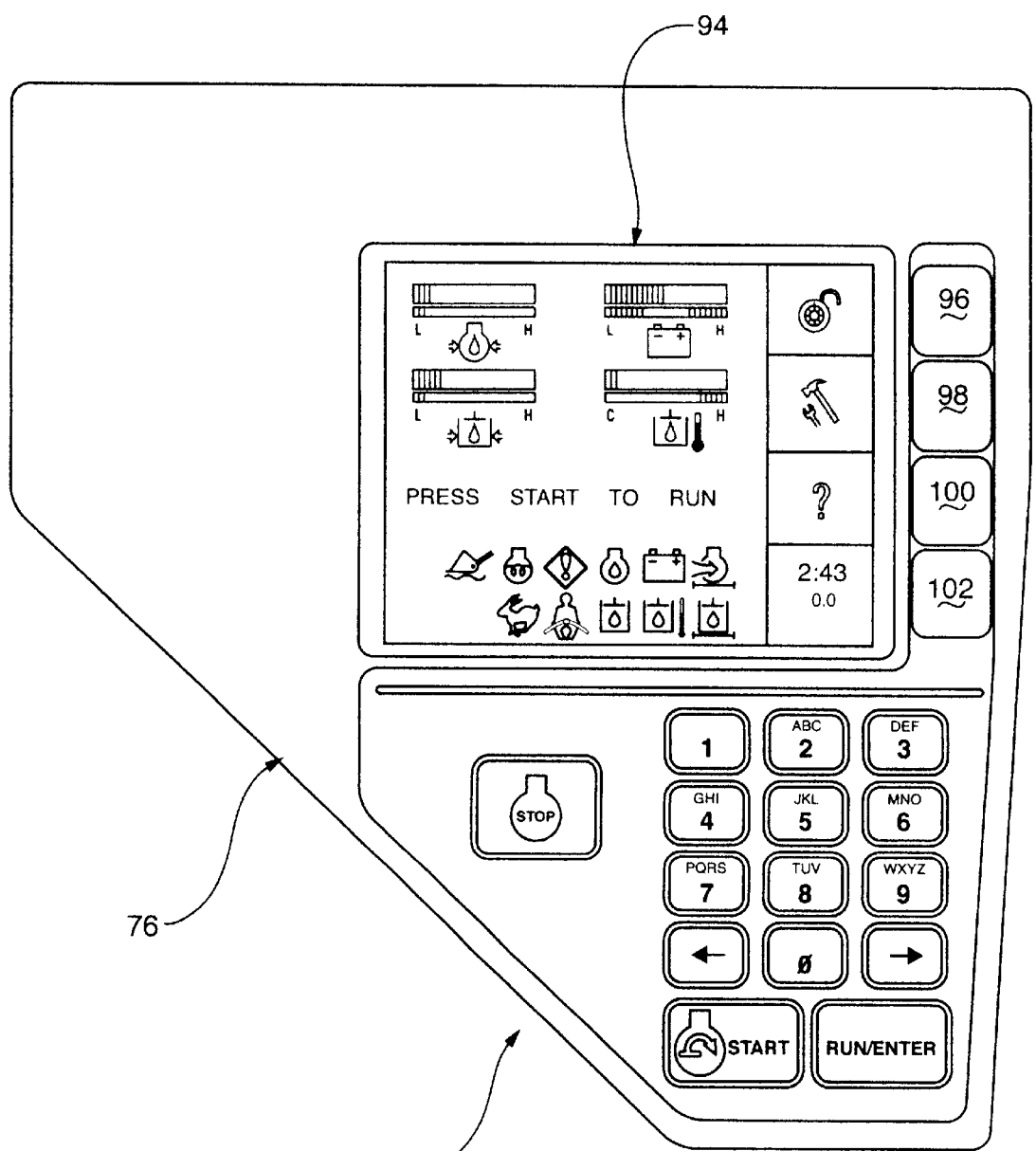
Figure 5C:
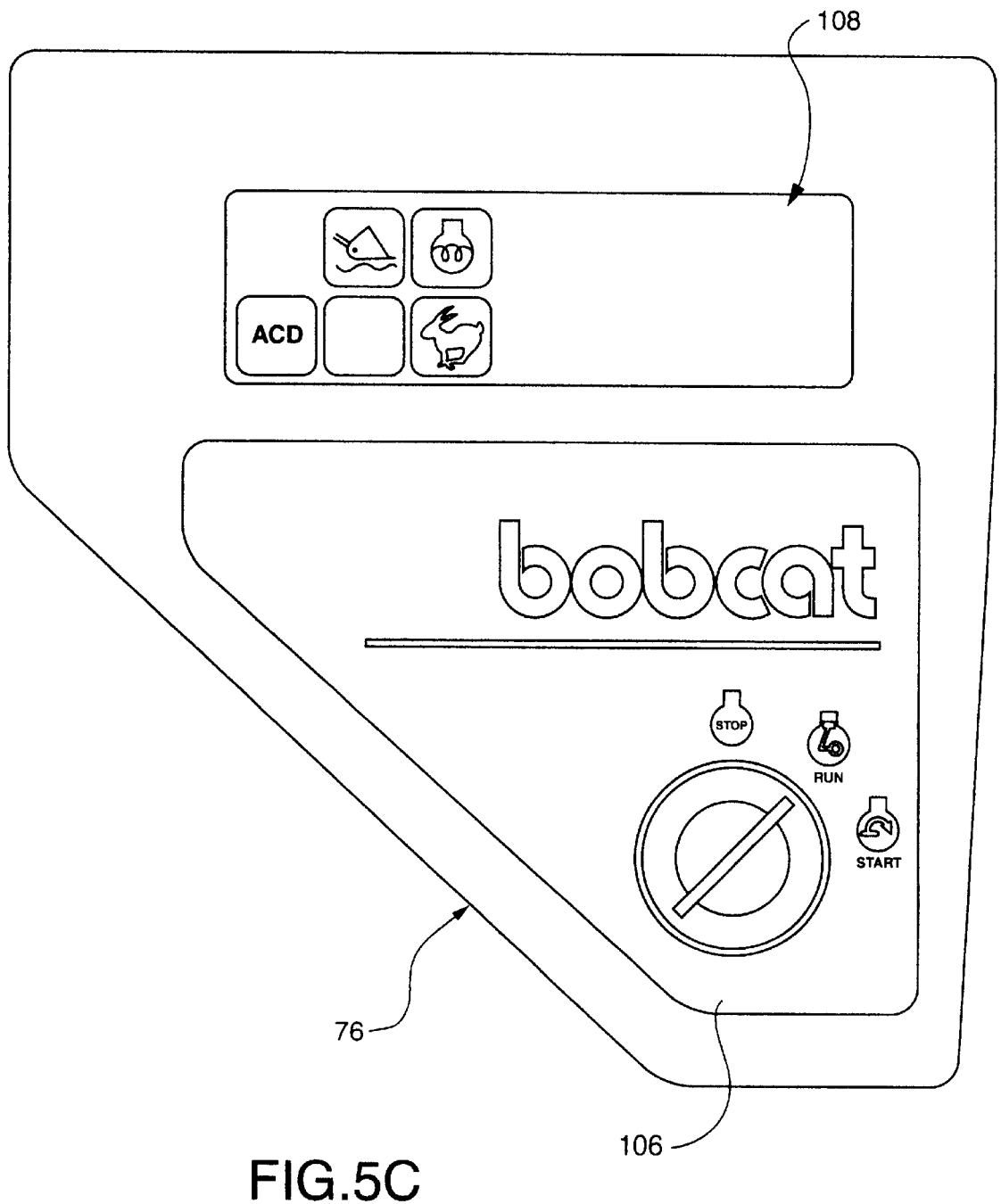

FIGS. 5A–5C illustrate a number of different embodiments of panels 74 and 76, in greater detail. FIG. 5A shows one illustrative embodiment of panel 74. Panel 74 includes a temperature gauge 78, fuel gauge 80, and hour meter 82. Gauges 78 and 80 are illustratively stepper motor driven gauges which are configurable to various machine models. This allows the gauges to have warning and shutdown ranges (described in greater detail below) which correspond to the particular machine on which the gauges are implemented.

Hour meter 82 is illustratively an LED or LCD display which displays engine hours in a normal mode. In a diagnostics mode, hour meter 82 can be controlled to display a numerical code which corresponds to a warning or diagnostic message. If multiple warning or diagnostic messages are to be displayed, hour meter 82 continuously scrolls through all active warning or diagnostic messages. Such warning and diagnostic messages are described in greater detail below.

In one illustrative embodiment, hour meter 82 is placed in the diagnostics mode by pressing and holding light switch 84. In a normal operating mode, light switch 84 is used to turn on marker lights, head lights, work lights, etc. which are equipped on the loader. When switch 34 is used to turn on the lights, it also turns on back lighting for the gauges 78 and 80 and for hour meter 82. However, when held for two seconds, the diagnostics mode is entered as described above with respect to hour meter 82. By holding light switch 84 for another two second period, the diagnostics mode is exited, and the light switch can be used as normal.

Light switch 84 is also optionally provided with a pair of indicator lights which indicate that the road lights, front head lights, turn lights, or marker lights are on, and which also indicate that the rear work lights are on.

Bucket positioning switch 86 can be depressed to turn on or off a bucket positioning function. That function is used to maintain certain bucket positioning, which does not form part of the present invention.

Panel 74 also includes a plurality of attachment auxiliary hydraulic switches 88, 90 and 92. Switch 88 turns on or off the high flow function in a toggle-type manner. The high flow function is described in greater detail in the above-referenced patent application which is hereby incorporated by reference. Briefly, the high flow function provides increased hydraulic flow to preselected features.

Switch 90 switches the control system between an on/off hydraulic operational mode and a pulse width modulated, or proportional, operational mode in a toggle-type fashion.

Switch 92 is a hydraulic pressure release button. When the button is pushed and held for a short period such as 0.5 seconds, or so, the fuel solenoid is released to kill the engine, and the auxiliary hydraulic pressure is released.

The remainder of the indicator lights and inputs on panel 74 are provided in conjunction with interlock functionality, and which do not form part of the present invention.

FIG. 5B illustrates one embodiment of panel 76. Panel 76 is provided with, illustratively, an LCD display screen 94, a plurality of buttons 96, 98, 100 and 102, which are located adjacent display screen 94, and a keypad 104 which includes a stop key, a start key, a run/enter key, and an alpha-numeric keypad.

In the embodiment illustrated, display screen 94 displays a plurality of virtual gauges, such as engine oil pressure, hydraulic charge oil pressure, battery voltage and hydraulic oil temperature. Along the right side of the screen, adjacent buttons 96–102, display screen 94 also displays a plurality of user prompts which correspond to the buttons 96–102. This is described in greater detail below. In addition, display screen 94 can display any one of a wide variety of other messages or indicator symbols, such as a symbol indicating that glow plugs are currently firing or contain an error, a general warning symbol, an engine oil pressure warning condition, a hydraulic oil temperature error or warning condition, an air filter error or warning condition (i.e., such as when the air filter is plugged), a two speed indicator, a fasten seat belt indicator, a hydraulic charge pressure error or warning condition indicator, a system voltage error or warning condition, a hydraulic filter plugged or disconnected condition, fuel level error or warning condition, and engine coolant error or warning condition.

Display screen 94, as will be described below, provides an interface for virtual gauges, a security system, function monitoring, trouble shooting, help screens, and other options. The four keys 96–102 to the right of screen 94 are used to access menu driven commands.

FIG. SC is another embodiment of display panel 76 in accordance with another embodiment of the present invention. Display panel 76 as illustrated in FIG. 5C simply includes a keyswitch input 106 and a visual display panel 108. Keyswitch 106 allows the user to turn the keyswitch from a stop to a start or run position and back. Display panel 108 contains a plurality of error or warning condition symbols which are lighted, blinking, or otherwise manipulated to indicate an error or warning condition.

Functionality of U/I System 70

The remaining functionality of U/I system 70 will be described with respect to different user interface displays which are provided on display screen 94 illustrated in FIG. 5B. In one illustrative embodiment, controller 72 obtains bit map display information from memory 73 based on user inputs and inputs from controller 52 and renders a bit mapped image on display screen 94. While the user interface displays described hereafter have a specific arrangement of words and figures on display screen 94, it will be noted that such arrangement is for illustratively purposes only.

a. Power-Up and Language Selection

Figure 6A:
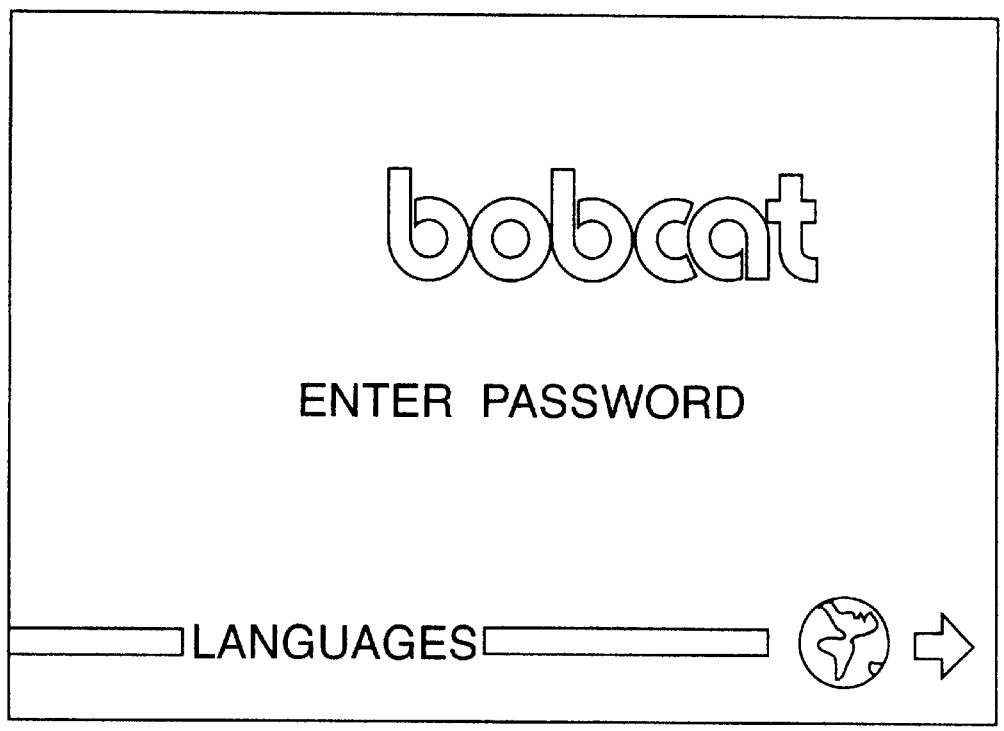
FIGS. 6A–6H illustrate a user interface for implementing password and language functionality.
Figure 6B:
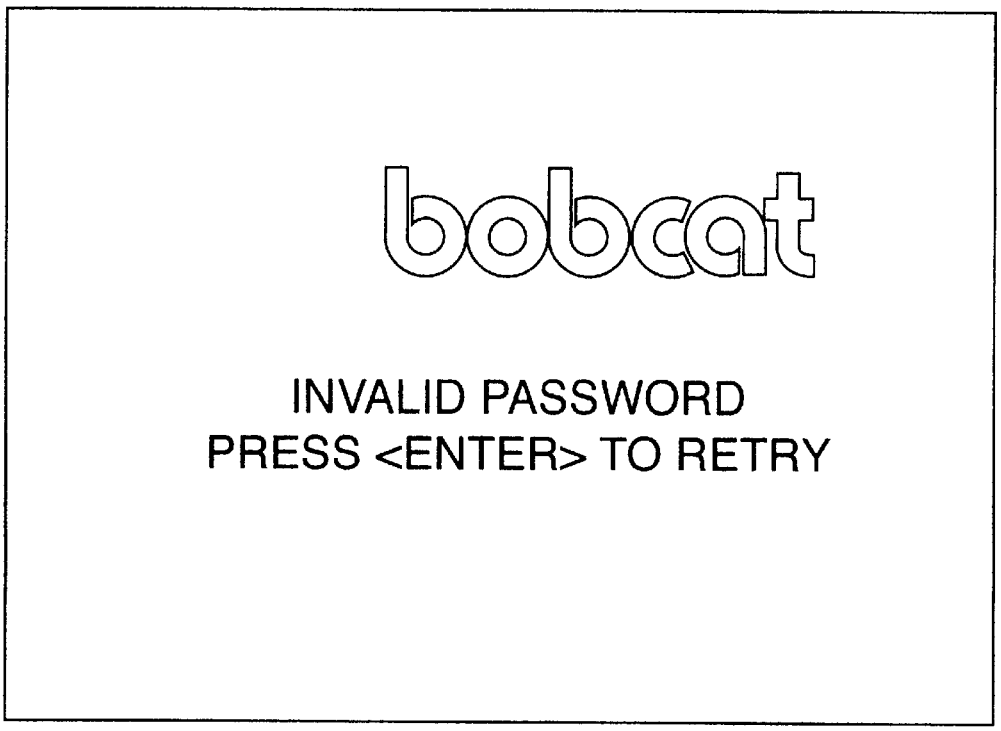

As soon as system 70 is powered up (such as by the user touching one of the keys on one of the control panels), the screen illustrated in FIG. 6A is displayed. This allows the user to either enter a password or change languages. The password functionality, during which a password is entered and checked against the saved password, is described in greater detail in the above-referenced patent application. Briefly, if an invalid password is entered, another screen is displayed, such as that shown in FIG. 6B which indicates that the password is invalid and that the user can press the enter button to re-enter the password. Once the proper password is entered, processing is allowed to continue.

The screen in FIG. 6A also allows the user to change languages. By pressing button 102, system 70 will display a language selection screen, such as that indicated by FIG. 6C. This allows the user to simply enter a number corresponding to the desired language on the keypad, press the run/enter key, and switch control to the selected language. FIGS. 6D–6H illustrate the enter password screen (shown in English in FIG. 6A) in a plurality of different illustrative languages.

b. Virtual Gauges

Figure 7A:
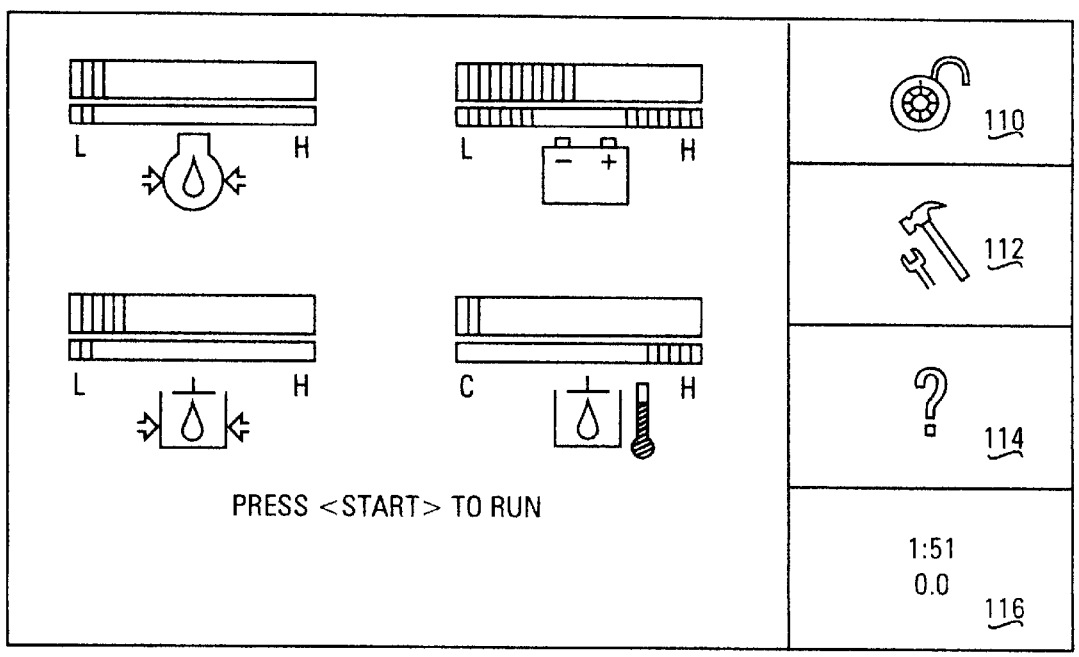
FIGS. 7A–7C illustrate a user interface to implement utilities selection.

Assuming that the correct password is entered in screen 6A, system 70 displays a start screen such as that illustrated in FIG. 7A. As shown in FIG. 7A, a plurality of virtual gauges (engine oil pressure, battery voltage, charge pressure and charge oil temperature) are all displayed, along with a plurality of button prompts 110, 112, 114 and 116. Similarly, a message such as "press start to run" is displayed. In response to this screen, the user can either depress one of buttons 96–102 (which are located adjacent button prompts 110–116) for further information or simply press the start button on panel 76 to start the loader. If the user chooses to start the loader, system 70 displays a screen such as that shown in FIG. 72. The screen shown in FIG. 7B is similar to that shown in FIG. 7A, except that the "press start to run" message has been replaced by an RPM indicator which indicates the current engine revolutions per minute.

Figure 7B:
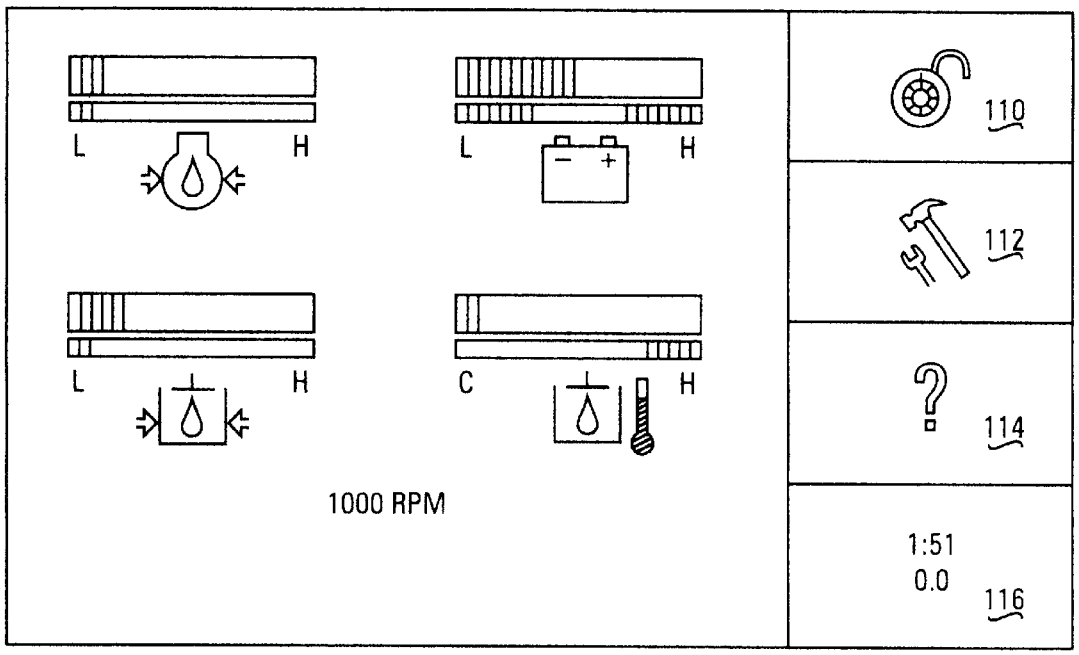

It should be noted that the virtual gauges in FIGS. 7A and 7B are all frequently updated (such as every second, or every two seconds) such that the user can observe these operating conditions in substantially real time.

From the screens illustrated in either FIG. 7A or FIG. 7B, the user can depress the buttons associated with any of the button prompts 110–116, to obtain more information.

c. Lock/Unlock

In one illustrative embodiment, button prompt 110 leads the user to more information regarding locking or unlocking the control system using passwords. If the user depresses button 110, the user can toggle between a locked and unlocked state. When in the locked state, the padlock on the user prompt is displayed locked. This requires the user to re-enter a password each time the control system is powered up. When the system is in the unlocked state (and the padlock is displayed in the unlocked state shown in FIG. 7B), the user can simply enter the loader, power-up the control system and press the run/enter button to start the loader, without reentering a password.

d. Utilities—passwords

Figure 7C:
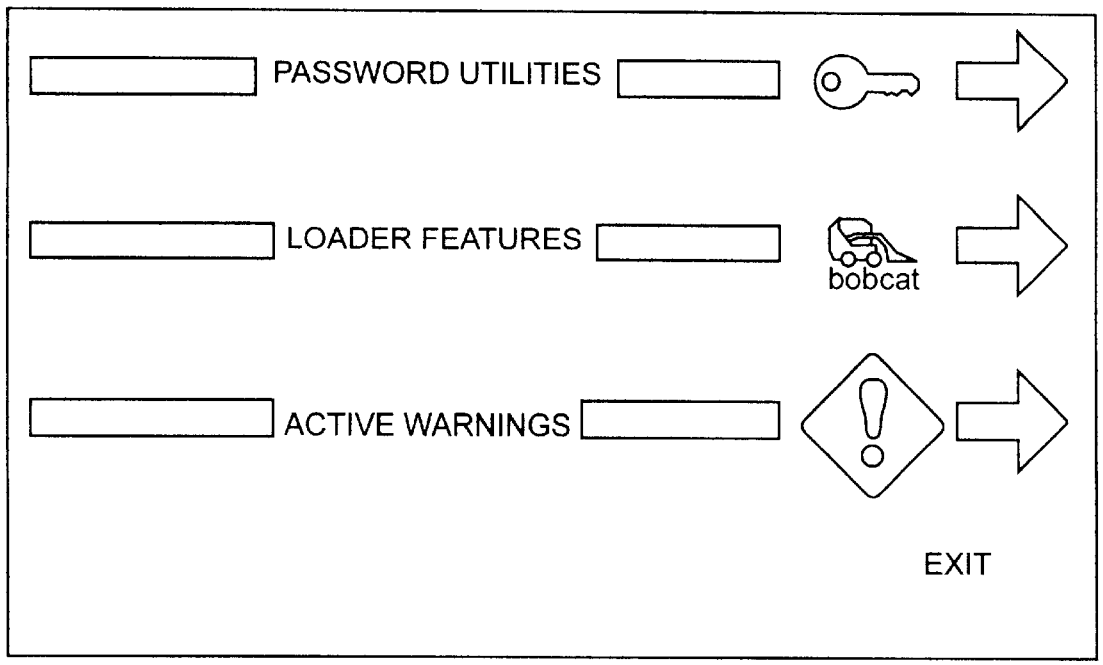

From screens 7A or 7B, if the user depresses the button associated with prompt 112, system 70 displays a screen, such as that illustrated in FIG. 7C, which allows the user to obtain access to certain utilities in the control system. The utilities illustrated in FIG. 7C include password utilities, loader features and active warnings.

Figure 8A:
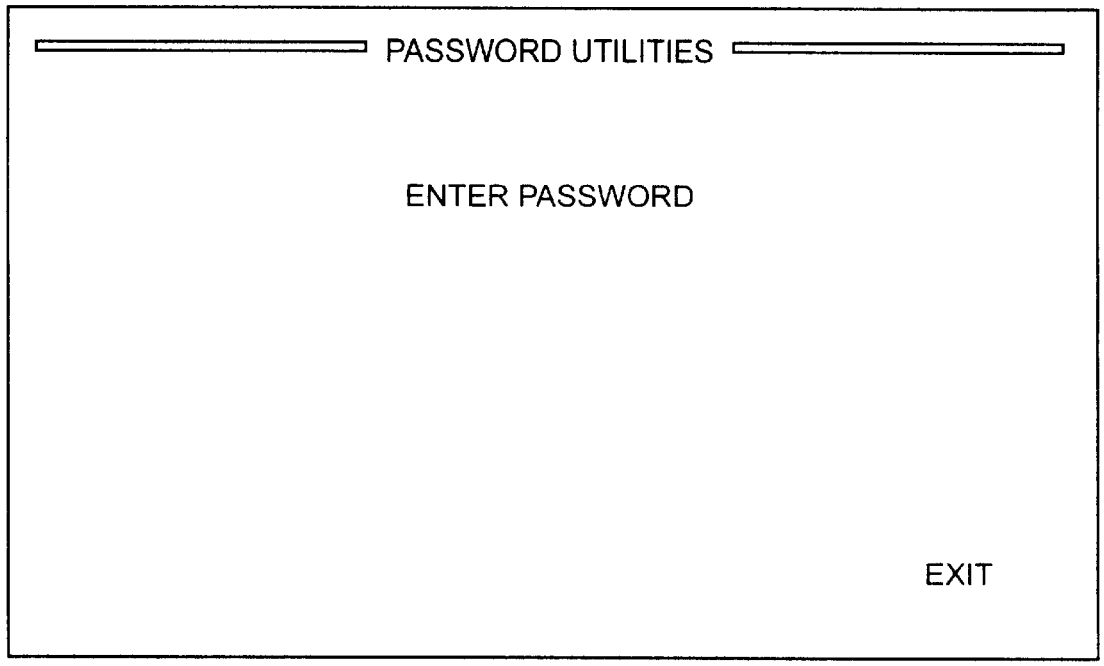
FIGS. 8A–8J show a user interface illustrating password functionality.
Figure 8B:
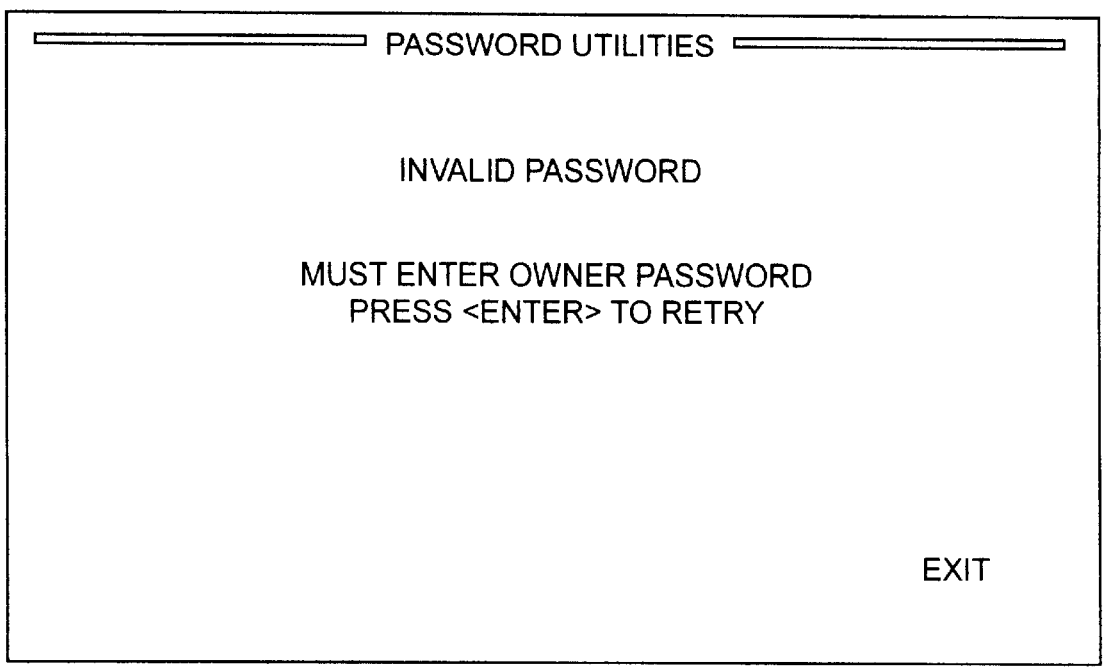

From the screen shown in FIG. 7C, if the user depresses the button associated with the password utilities prompt, system 70 displays a screen, such as that illustrated in FIG. 8A. Before the user can access password utilities, the user must enter a valid higher level password, such as those indicated in the above-referenced co-pending patent application. The user then depresses the enter key. If the entered password was incorrect, a screen is displayed such as that illustrated in FIG. 8B which indicates that the user must enter an owner password and allows the user to retry.

Figure 8C:
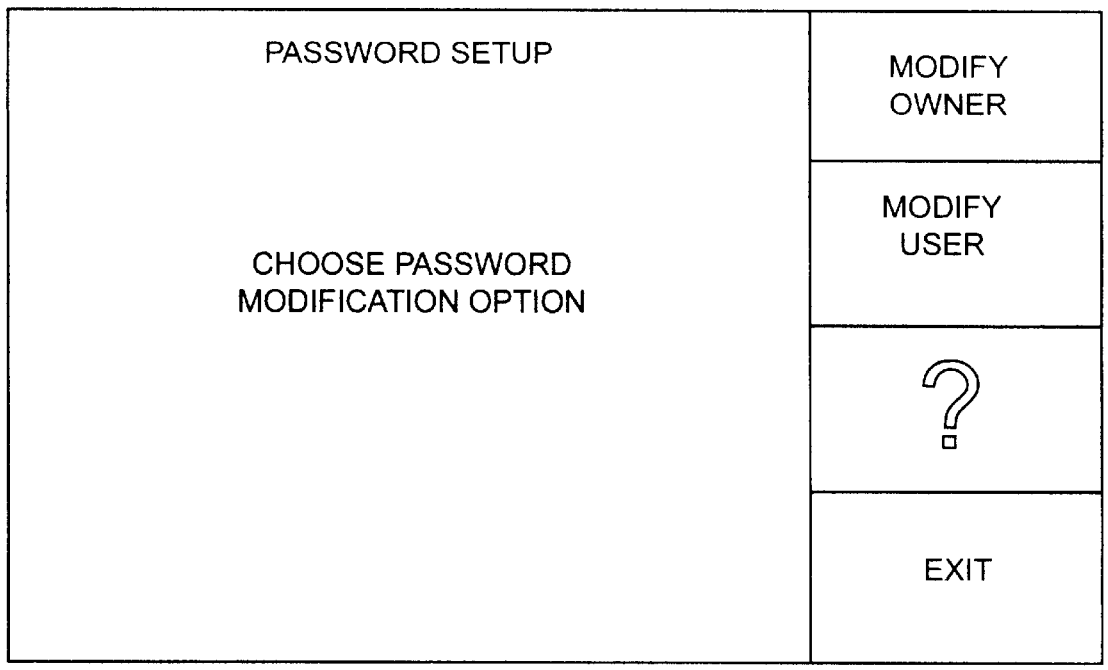
Figure 8D:
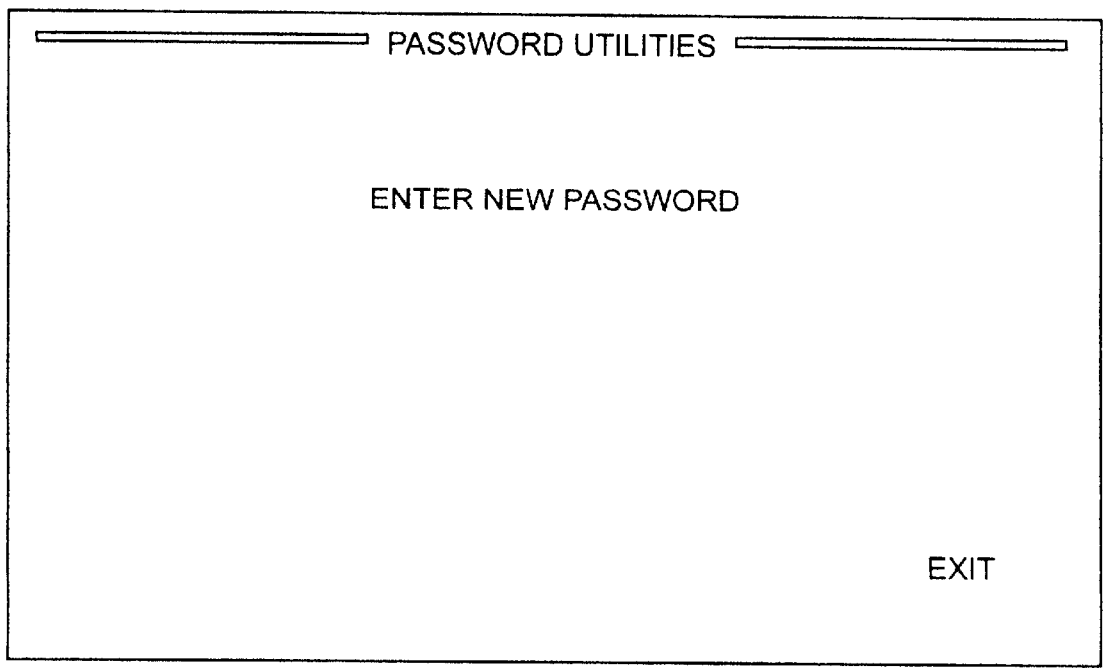
Figure 8E:
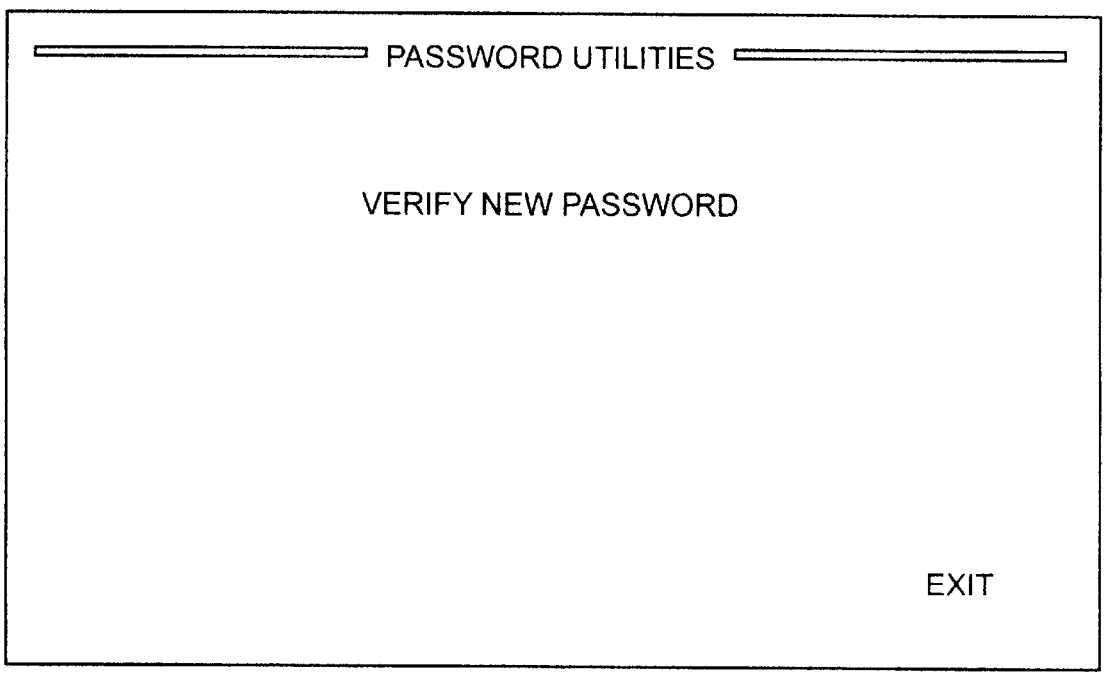
Figure 8F:
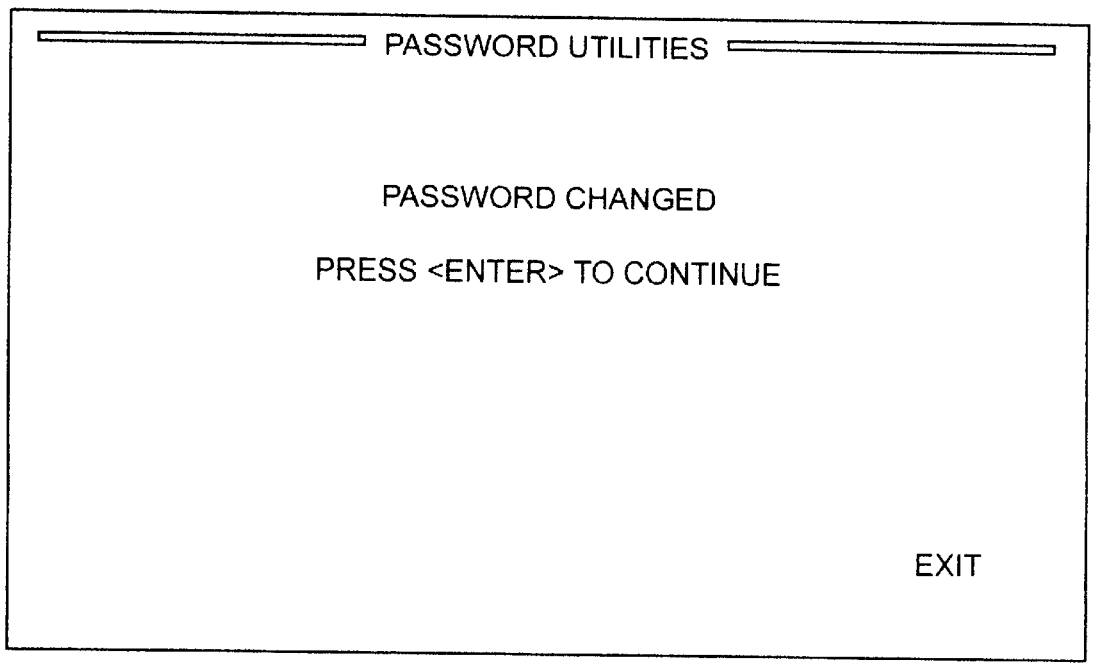
Figure 8G:
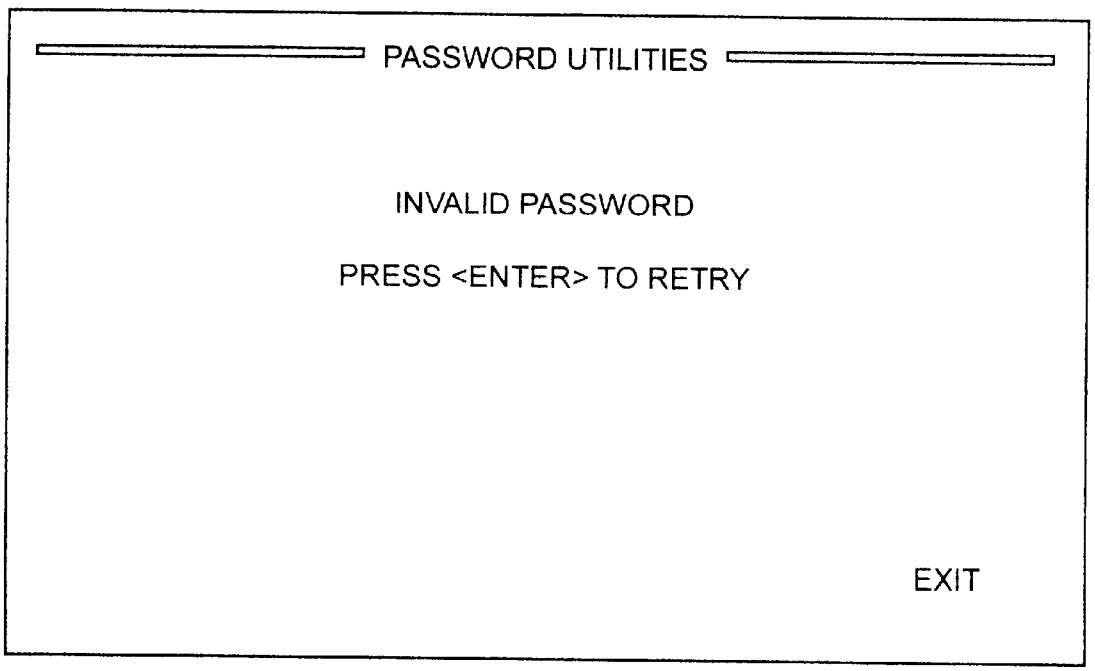

If the password entered at the screen illustrated in FIG. 8A was correct, system 70 displays a screen such as that illustrated by FIG. 8C which allows the user to choose a password modification option including modifying an owner password and modifying a user password. If the owner password is to be modified, system 70 displays a screen such as that indicated in FIG. 8D. The user is simply prompted for the new owner password. Once that password is entered and the user has depressed the run/enter key, system 70 asks the user to verify the password by displaying the screen such as that illustrated in FIG. 8E. The user then re-enters the password and presses the run/enter key. System 70 then displays a screen such as that illustrated in FIG. 8F which indicates that the password has been changed. If the user presses either the exit key or the enter key, control reverts back to the screen illustrated by FIG. 8C. If the opera-or enters the incorrect password at screen 8E, and thus fails to verify the password, system 70 displays a screen such as that illustrated by FIG. 8G which indicates that the re-entered password was incorrect.

Figure 8H:
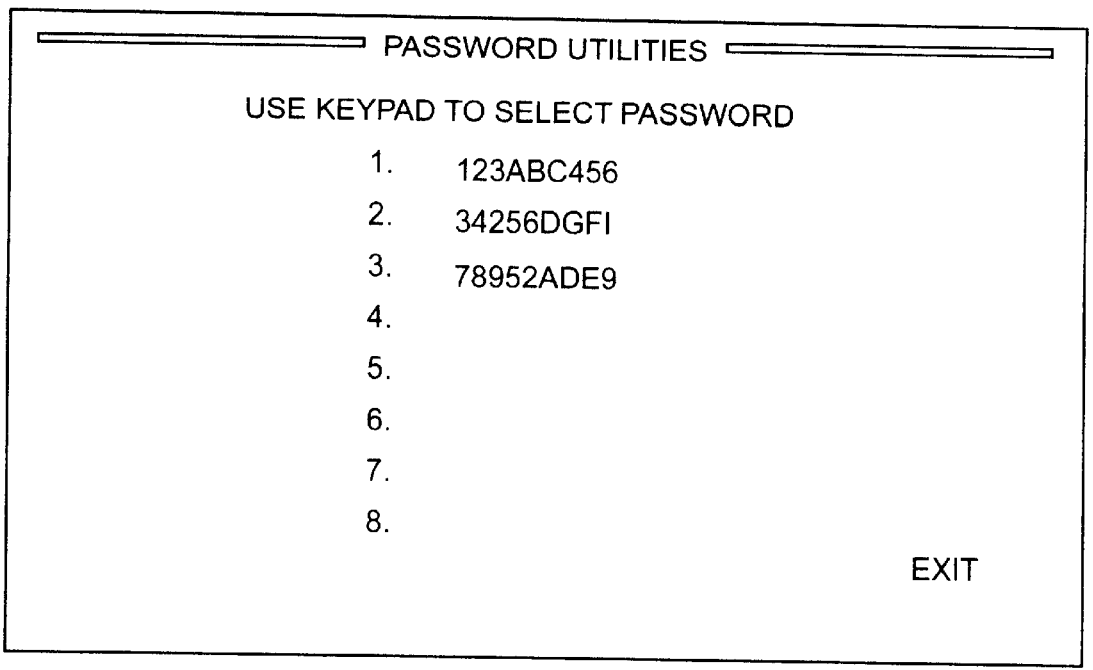

If, at the screen illustrated by FIG. 8C, the user selects the modify user password option, system 70 displays a screen such as that indicated by FIG. 8H. In the illustrated embodiment, system 70 accesses a password memory (which may be included in memory 73 or memory associated with controller 52) and displays the various user passwords which can be changed. The user can then simply select. one of the passwords by entering the associated numerical indicator on the keypad and pressing the run/enter key.

Figure 8I:
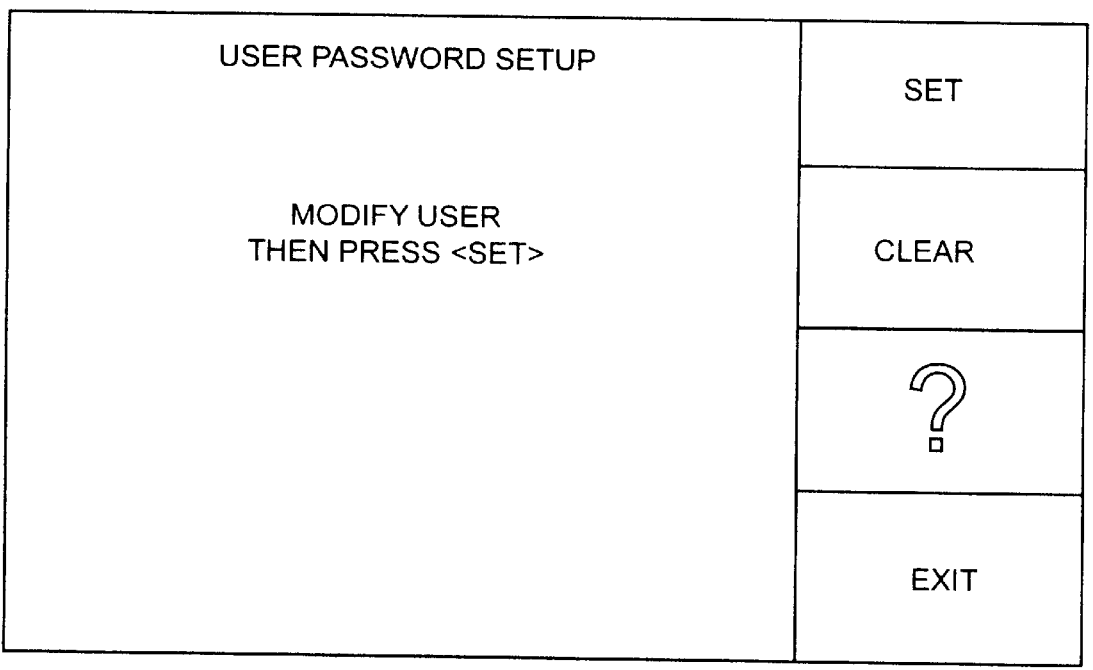
Figure 8J:
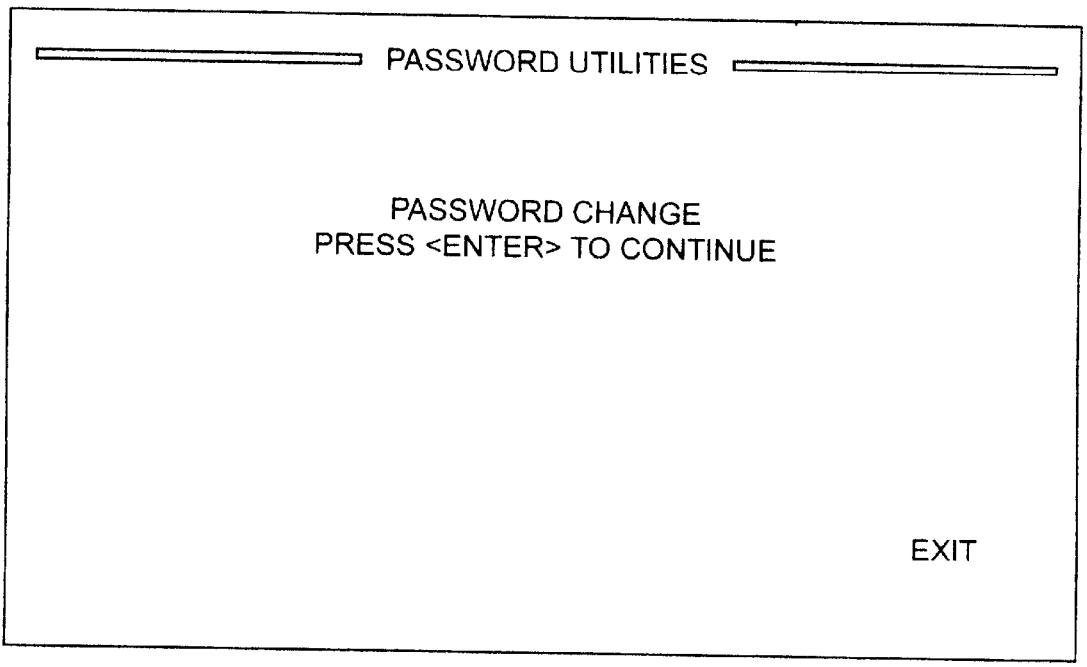

System 70 then displays a display such as that indicated in FIG. 8I. That screen prompts the user to either change the selected user password (i.e., set a new password) or delete the selected user password (i.e., clear the password). If the user desires to change the password, the user simply enters the new password and presses "set". System 70 can then display a screen such as that illustrated in FIG. 8J indicating that the password has been changed. Alternatively, system 70 can simply revert back to the screen shown in FIG. 8H with the modified or new password displayed. In either case, control then reverts back to the screen illustrated in FIG. 8H. If the user clears the password (by pressing "clear"), system 70 reverts back to the screen shown in FIG. 8H showing that the password is simply deleted from the list.

e. Utilities—loader features

Figure 9A:
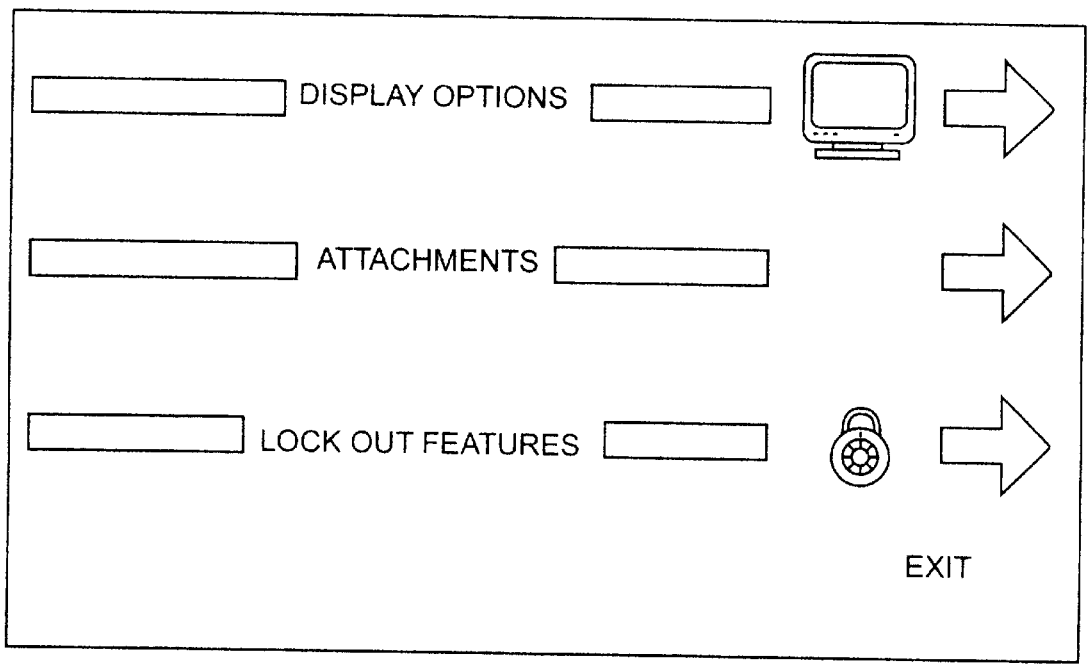
FIGS. 9A–9F illustrate a user interface to provide manipulation of the display.

Referring again to the display illustrated in FIG. 7C, if the user now selects the button designated as loader features, and the engine is not running, system 70 displays a screen such as that illustrated in FIG. 9A. This allows the user to manipulate, or gain access to, more information regarding display options, attachments, and lockout features. If the user chooses the display options button, system 70 displays a screen such as that illustrated in FIG. 9B. This allows the user to select the clock, to adjust the contrast, or to change languages.

Figure 9B:
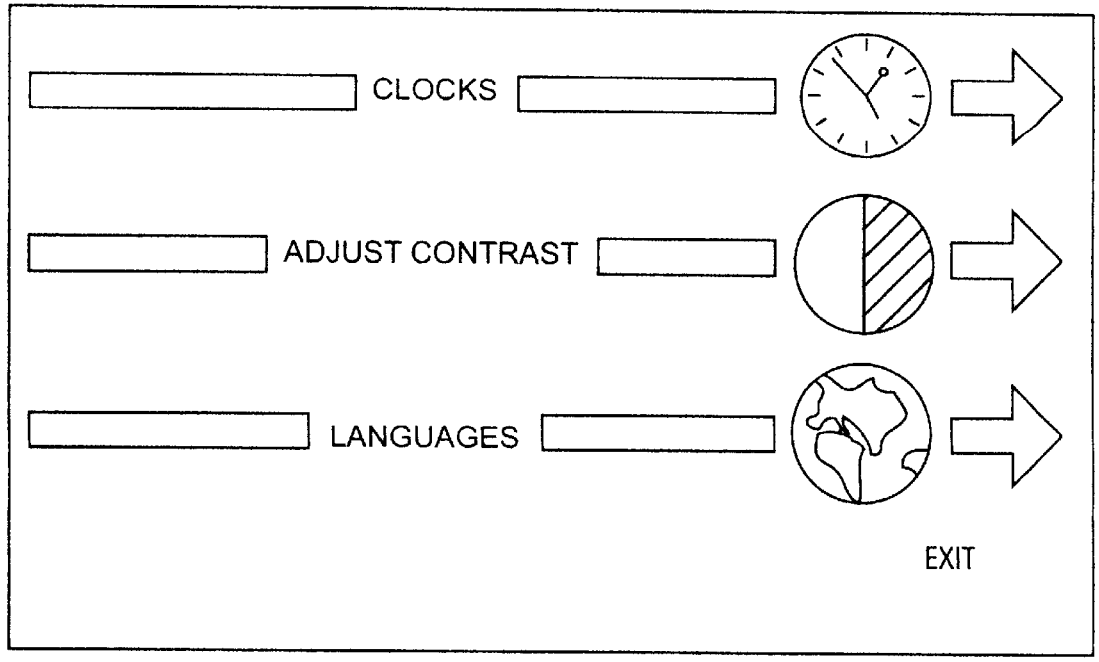
Figure 9C:
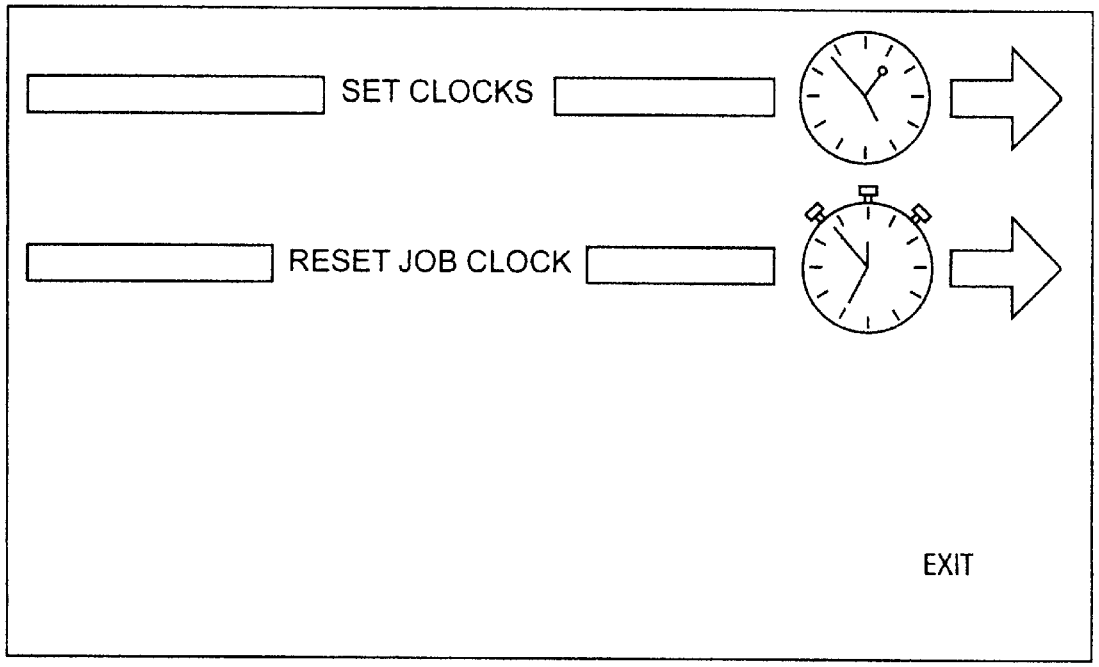
Figure 9D:
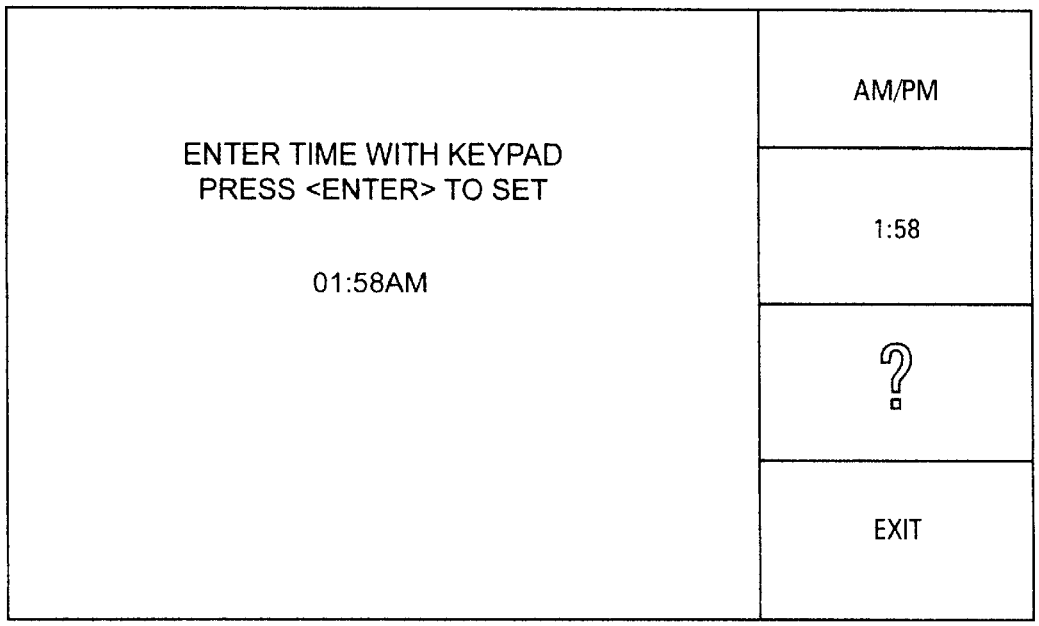
Figure 9E:
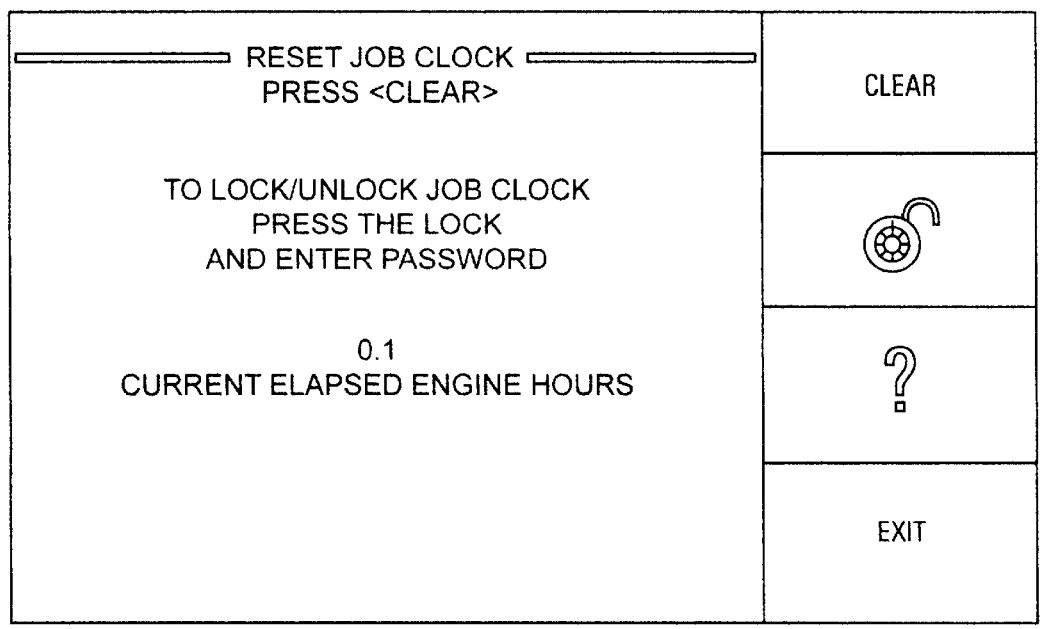

If the user chooses to adjust the clock, system 70 displays a screen such as that illustrated in FIG. 9C. This allows the user to either set the system clock or reset the jot clock. If the user elects to set the system clock, system 70 displays a screen such as that illustrated in FIG. 9D. This allows the user to enter the correct time through the alpha-numeric keypad, and press the run/enter key to set the time. Similarly, the user can make an am/pm designation. If, at the screen shown in FIG. 9C, the user elects to reset the job clock, system 70 displays a screen such as that illustrated in FIG. 9E which prompts the user through the desired operation. It is worth noting that, in one illustrative embodiment, the job clock can be locked such that it is under password control. In that case, if a renting operation, for example, rents a power machine by the hour, the user cannot manipulate the job clock without knowing the appropriate password.

Figure 9F:
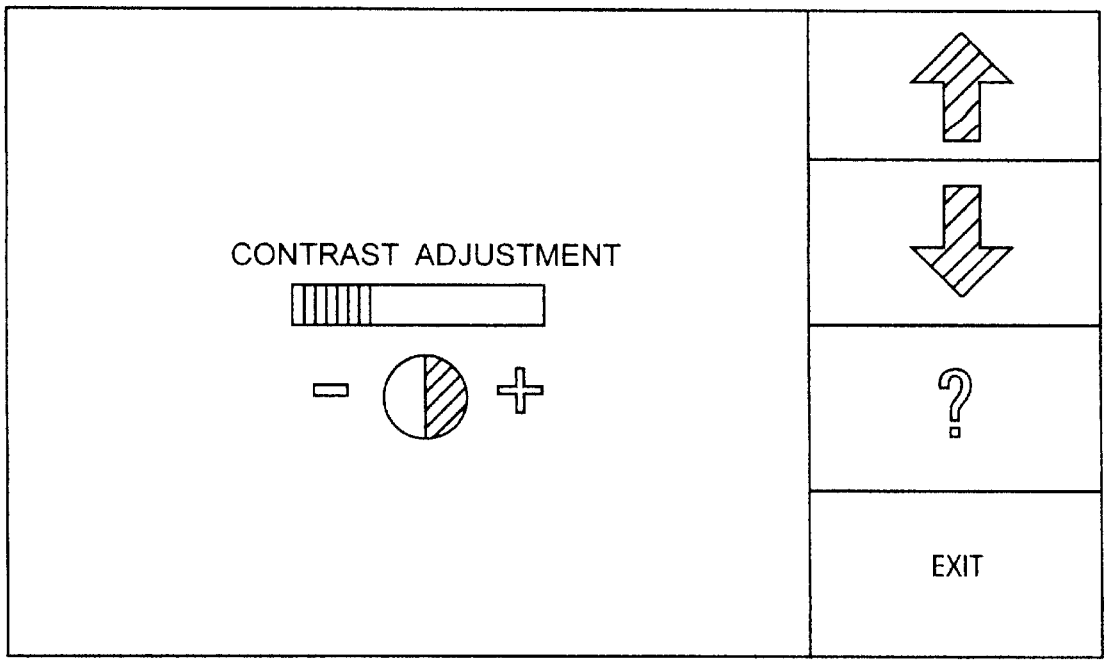

Referring again to the screen shown in FIG. 9B, the operator elects to adjust the contrast by depressing the button adjacent the adjust contrast prompt, system 70 displays a screen such as that illustrated in FIG. 9F. This allows the user to increase or decrease contrast, as desired.

Figure 6C:
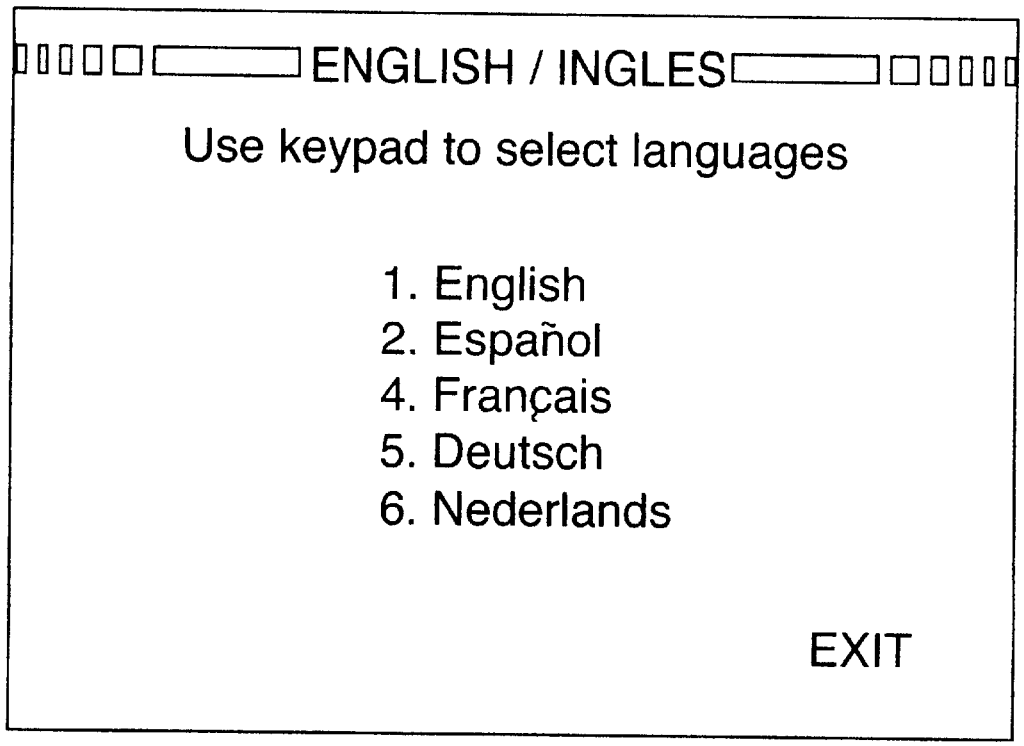
Figure 6D:
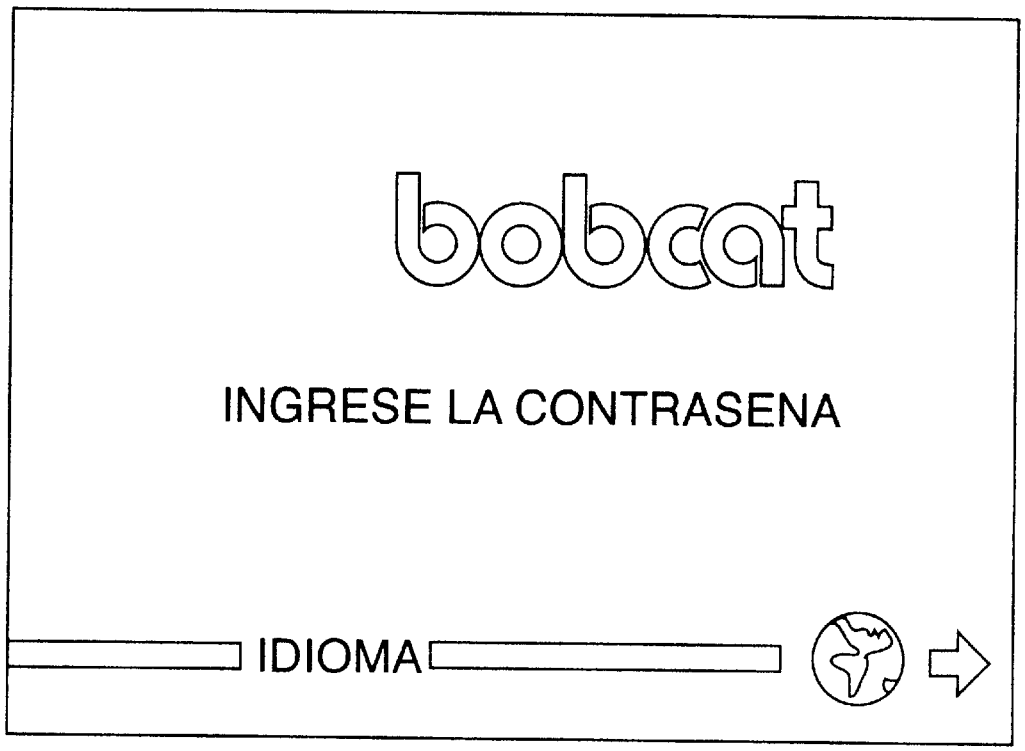
Figure 6E:
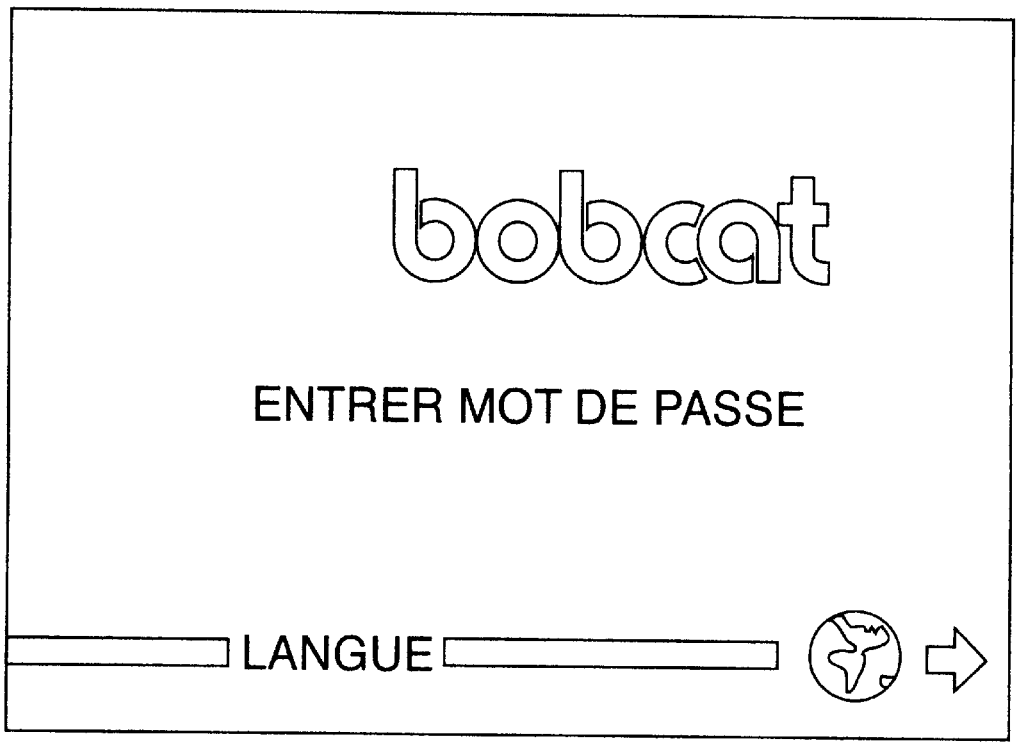
Figure 6F:
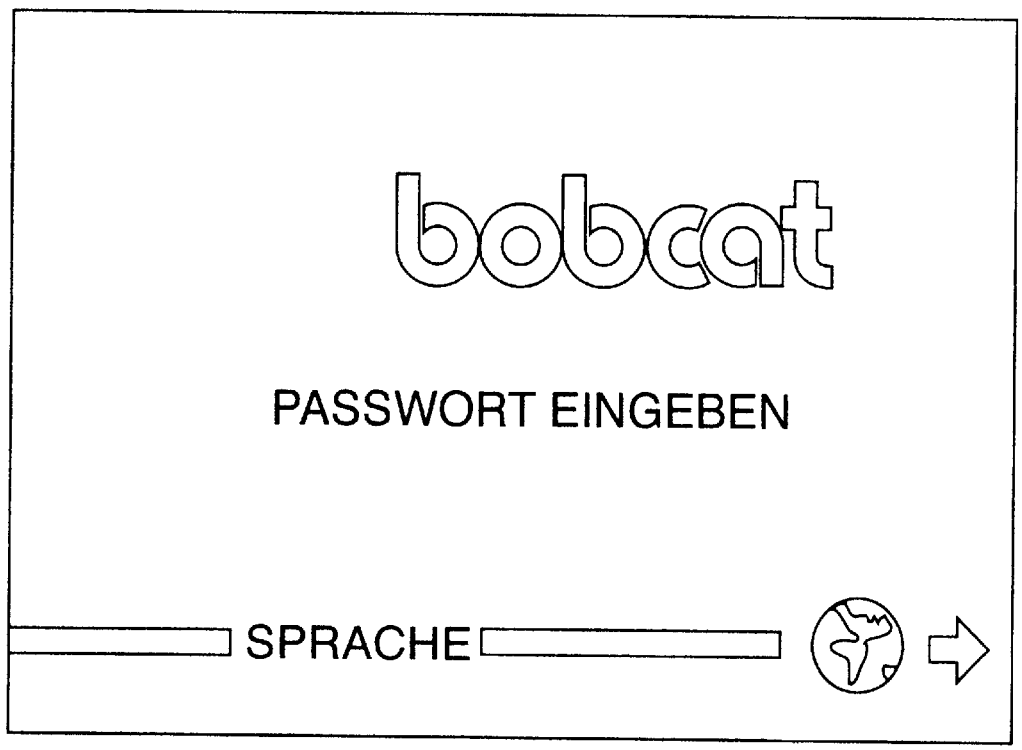
Figure 6G:
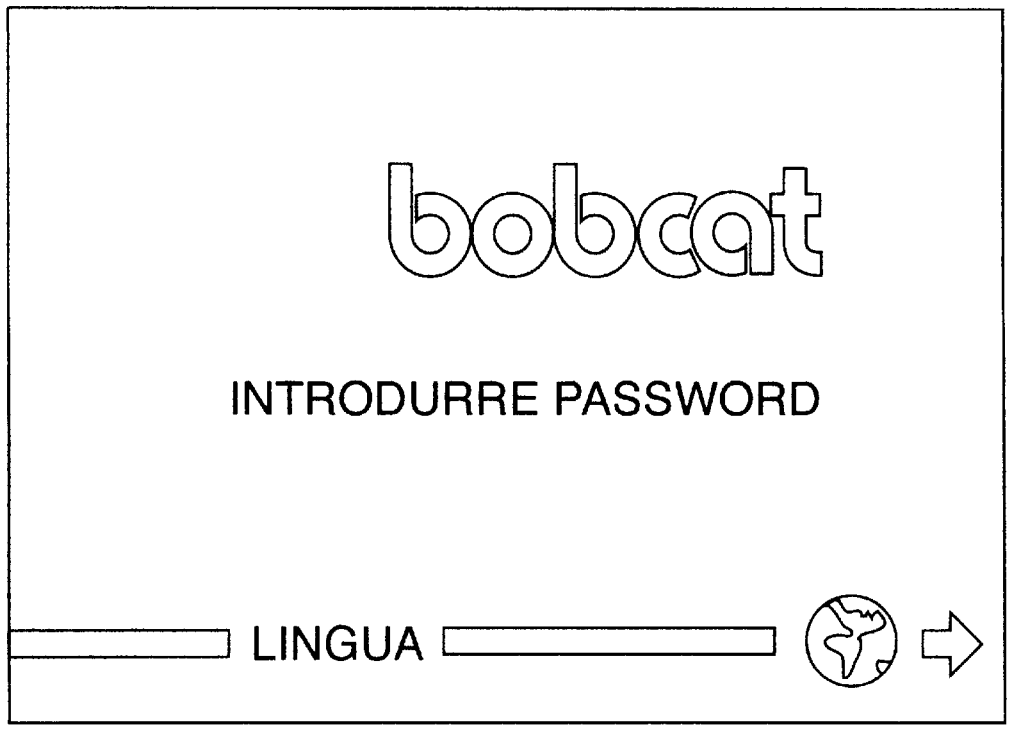
Figure 6H:
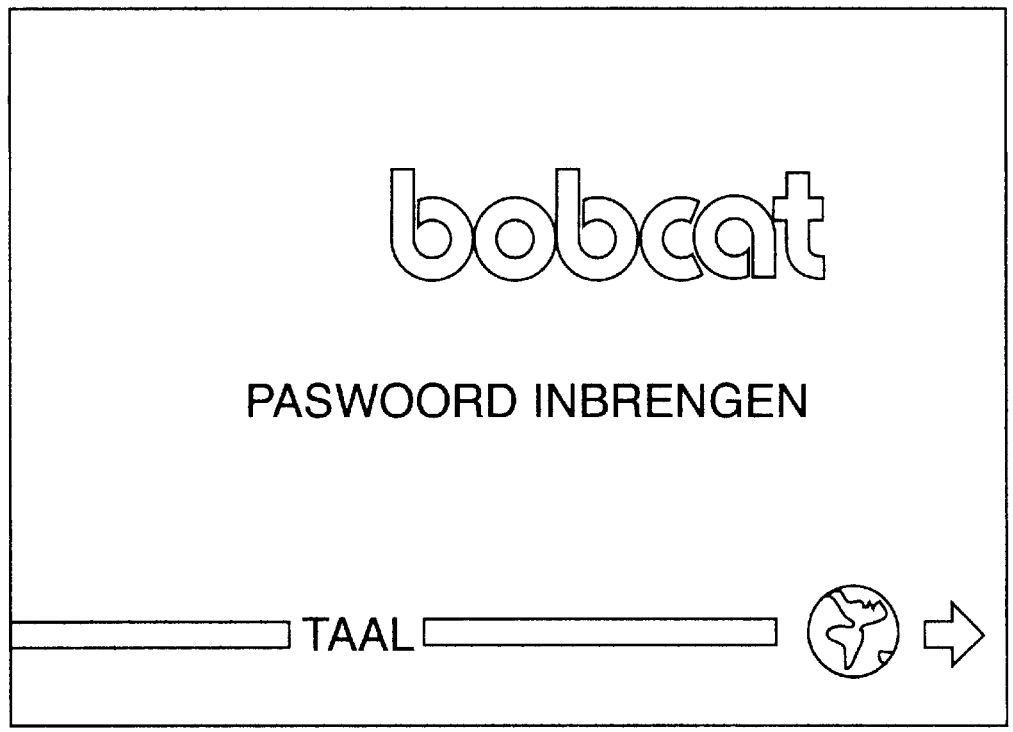

From the screen illustrated in FIG. 9B, if the user elects to change languages, as discussed with respect to FIG. 6C, the user simply selects the desired language.

At the screen illustrated in FIG. 9A, if the user selects the button associated with attachments, one of two different things can occur. In one embodiment, panel controller 72 sends a message to controller 52 which causes controller 52 to poll the attachments attached to the power machine in which controller 52 is mounted to determine which attachments are available. In that case, controller 52 then displays appropriate tutorial-type help screens which describe the operation of those attachments.

Figure 10A:
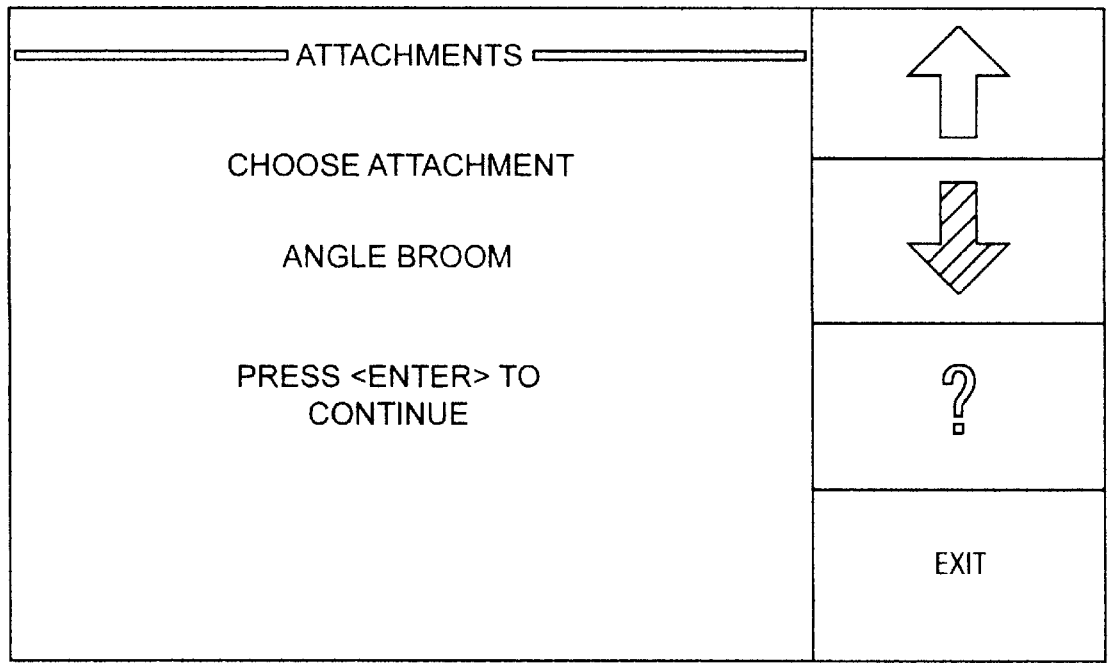
FIGS. 10A–10T illustrate tutorial-type user interface information relating to attachments.

However, when controller 52 is unable to determine the type of attachments then attached to the power machine, the user can manually select such an attachment. In that embodiment, system 70 displays a screen such as that illustrated in FIG. 10A. This screen instructs the user to choose an attachment and also displays a choice. The choice displayed in FIG. 10A is an angle broom.

Upward and downward arrows are provided adjacent the buttons on the right side of the display screen to indicate that the user can scroll upwardly or downwardly through the list of available attachments. The darkened downward arrow indicates that the user can scroll downwardly through the list, while the empty upward arrow indicates that screen 10A is the top of the list. The user can scroll through the list until the user reaches the desired attachment. The user them simply depresses the run/enter key to obtain the tutorial information.

Figure 10B:
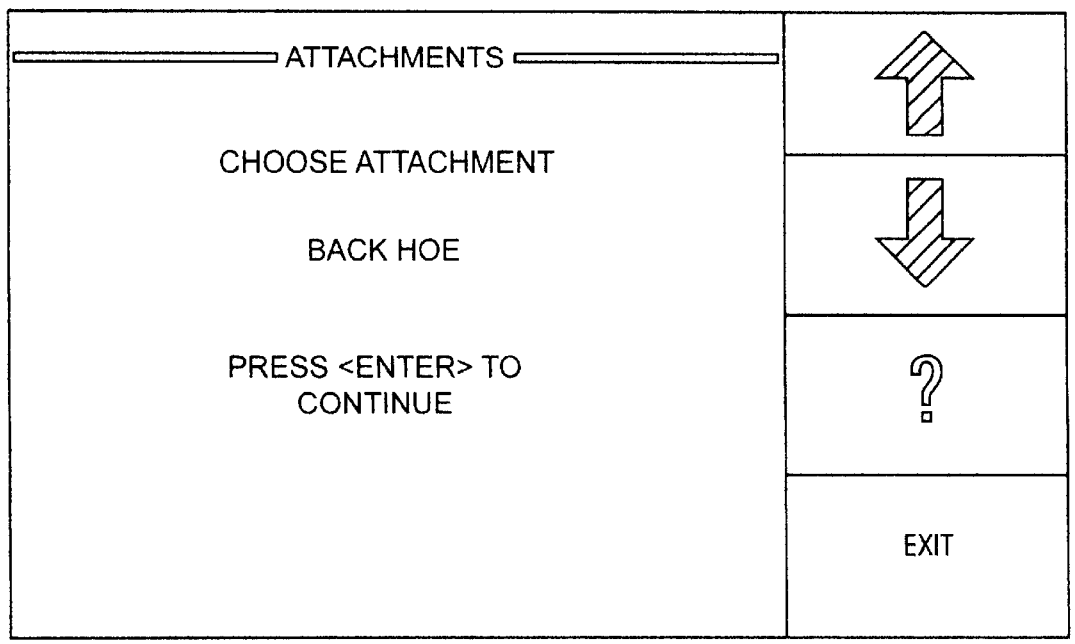
Figure 10C:
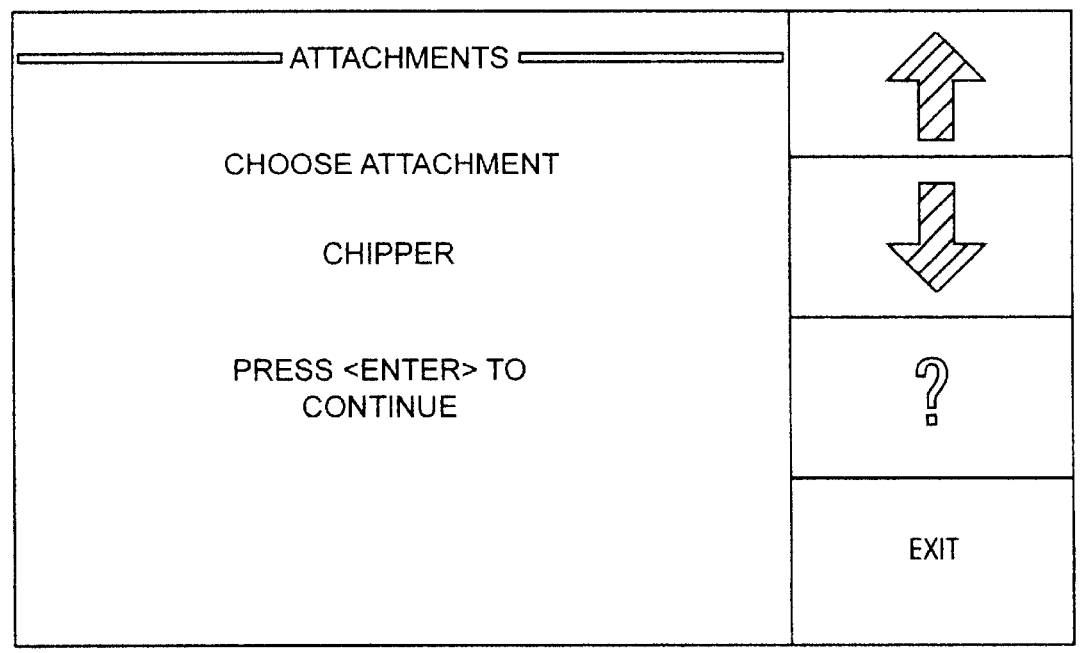
Figure 10D:
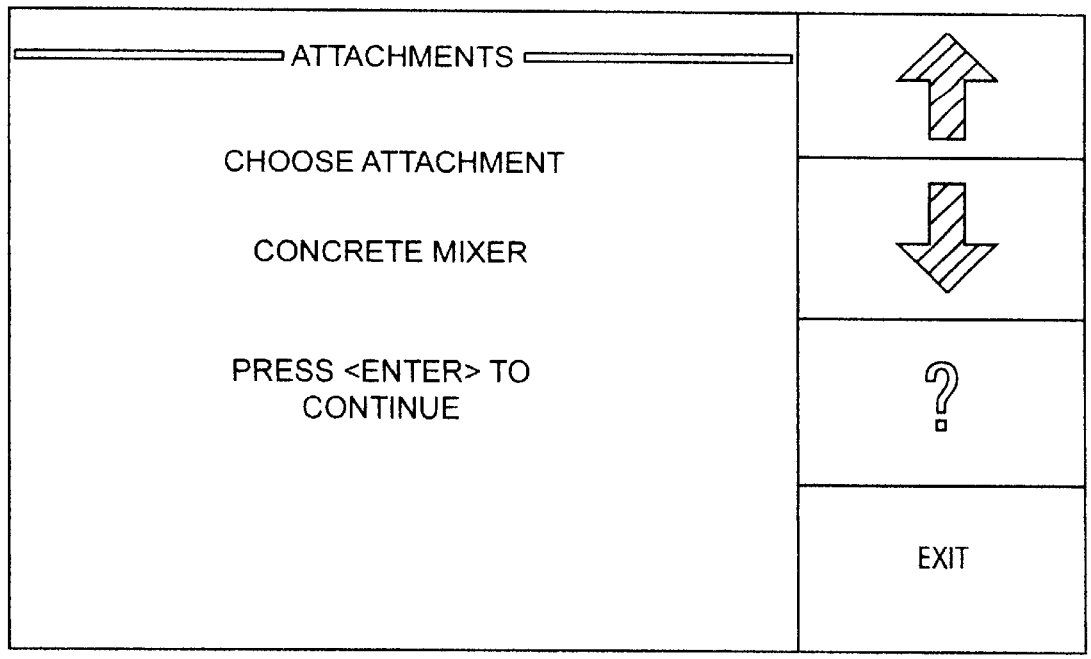
Figure 10E:
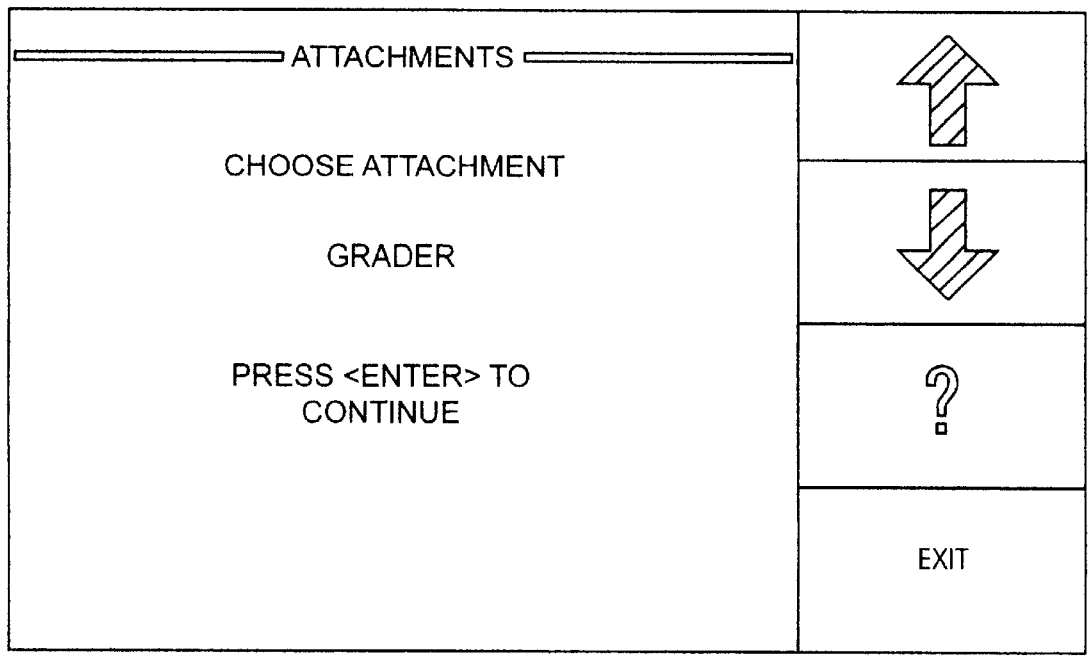
Figure 10F:
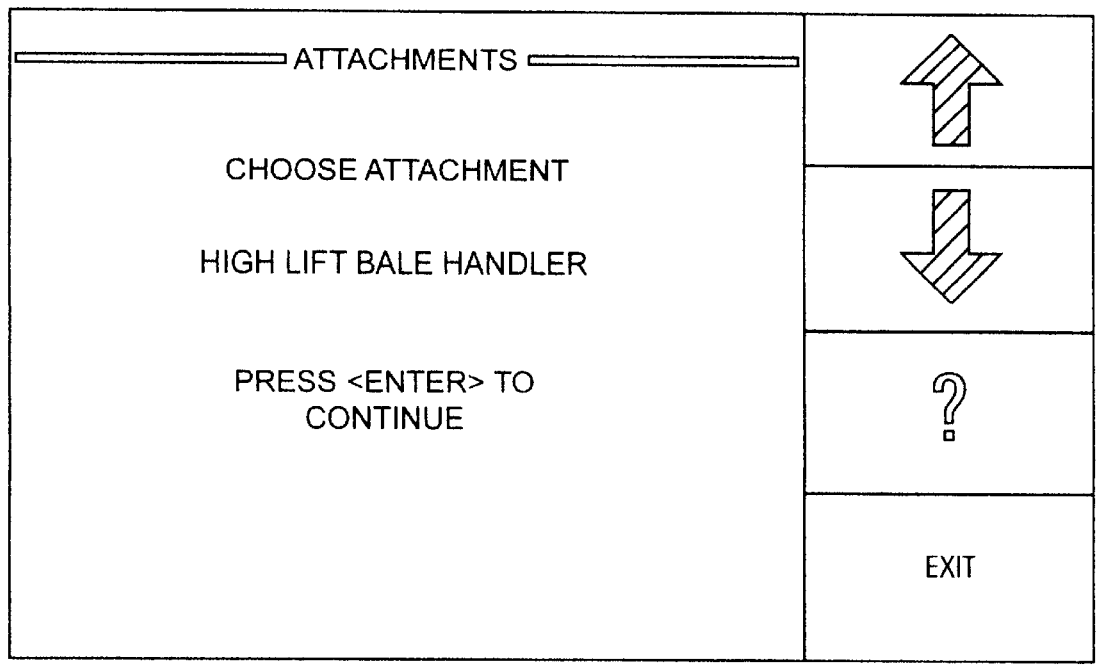
Figure 10G:
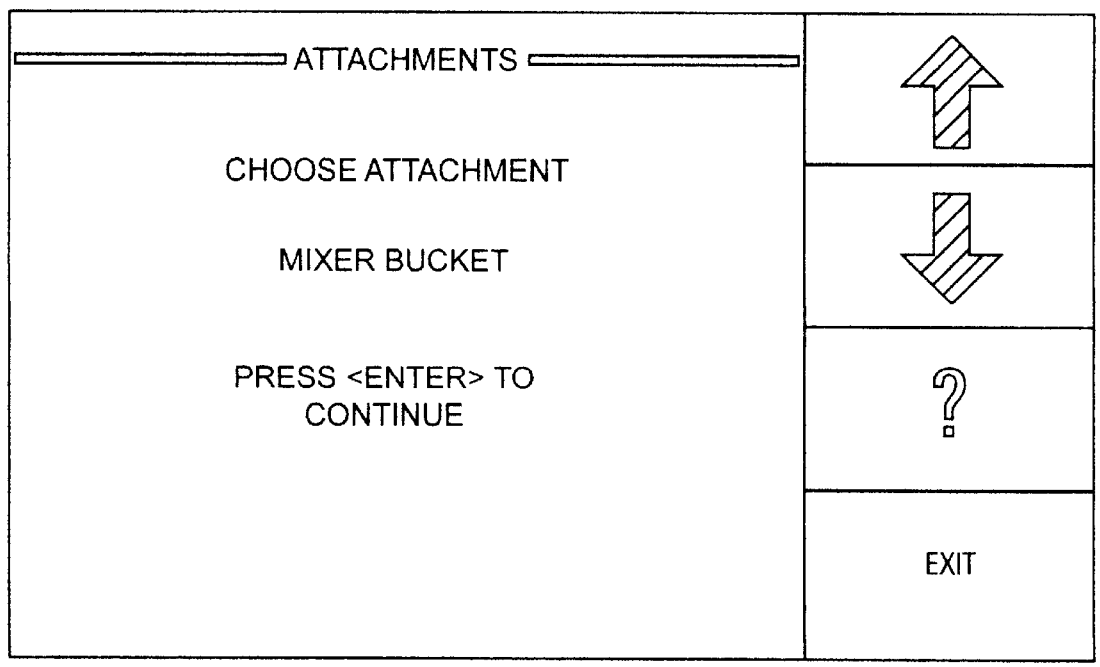
Figure 10H:
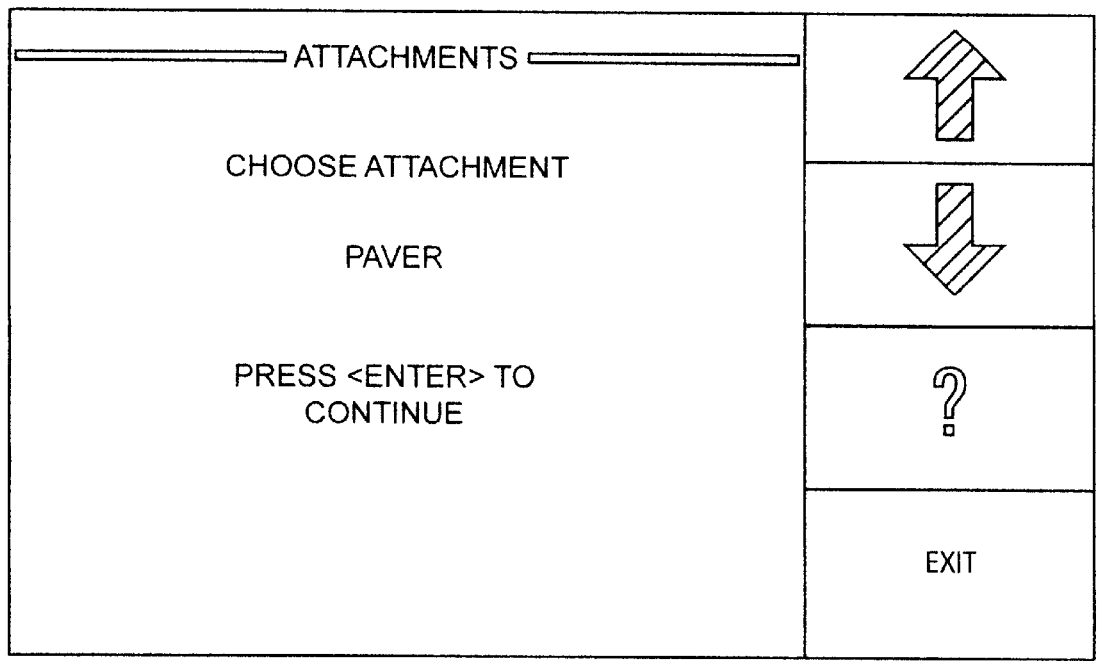
Figure 10I:
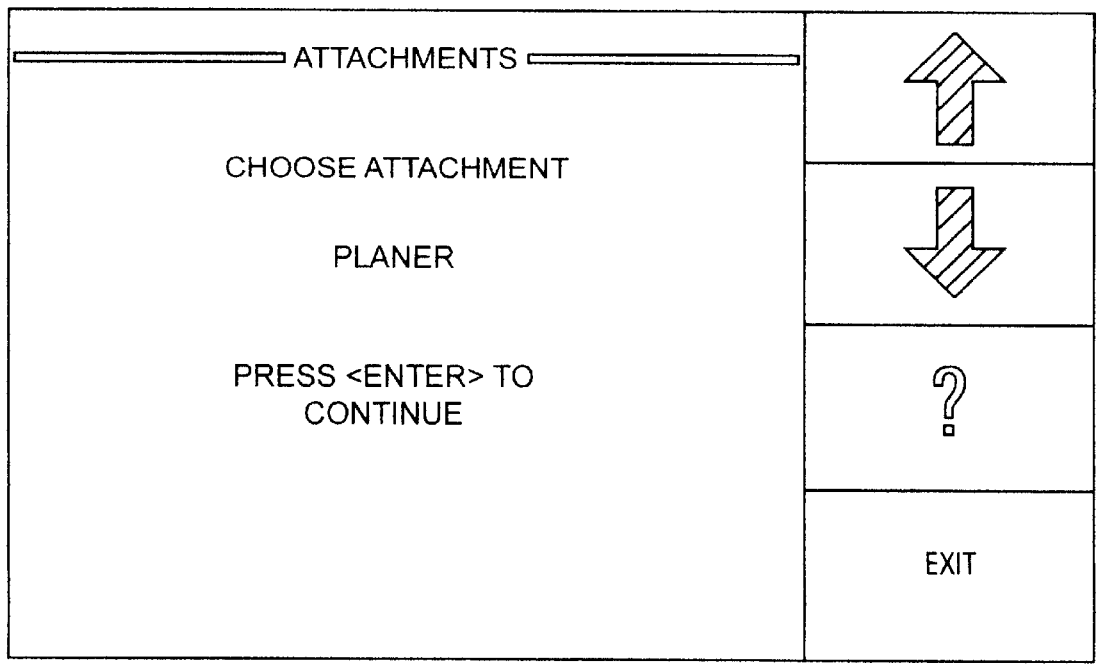
Figure 10J:
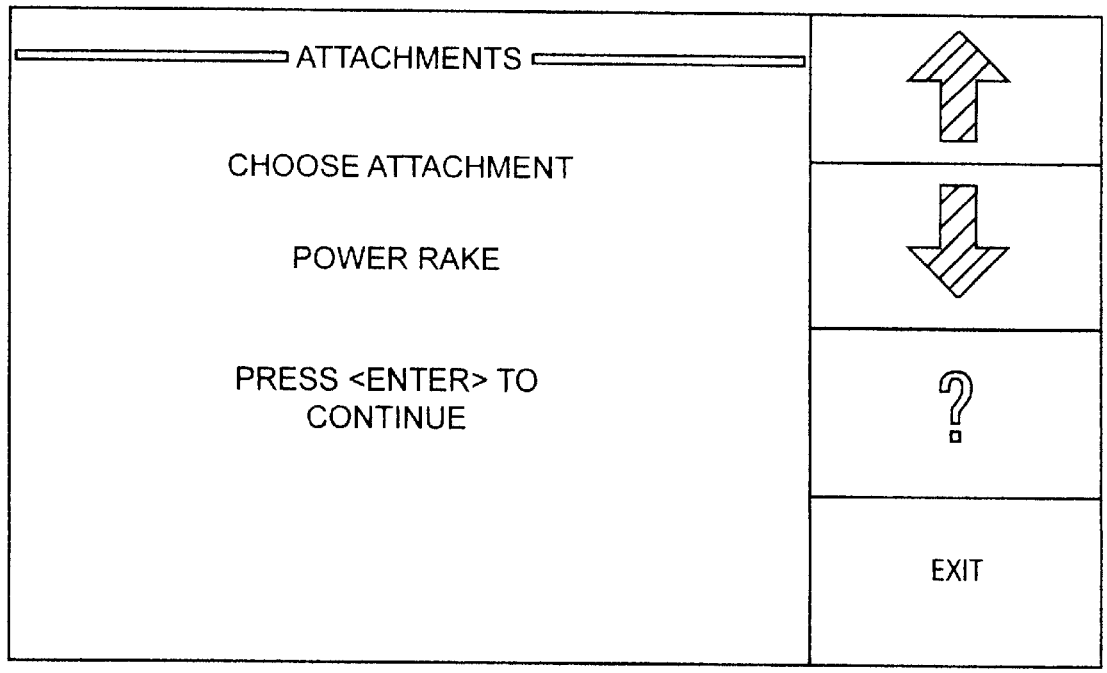
Figure 10K:
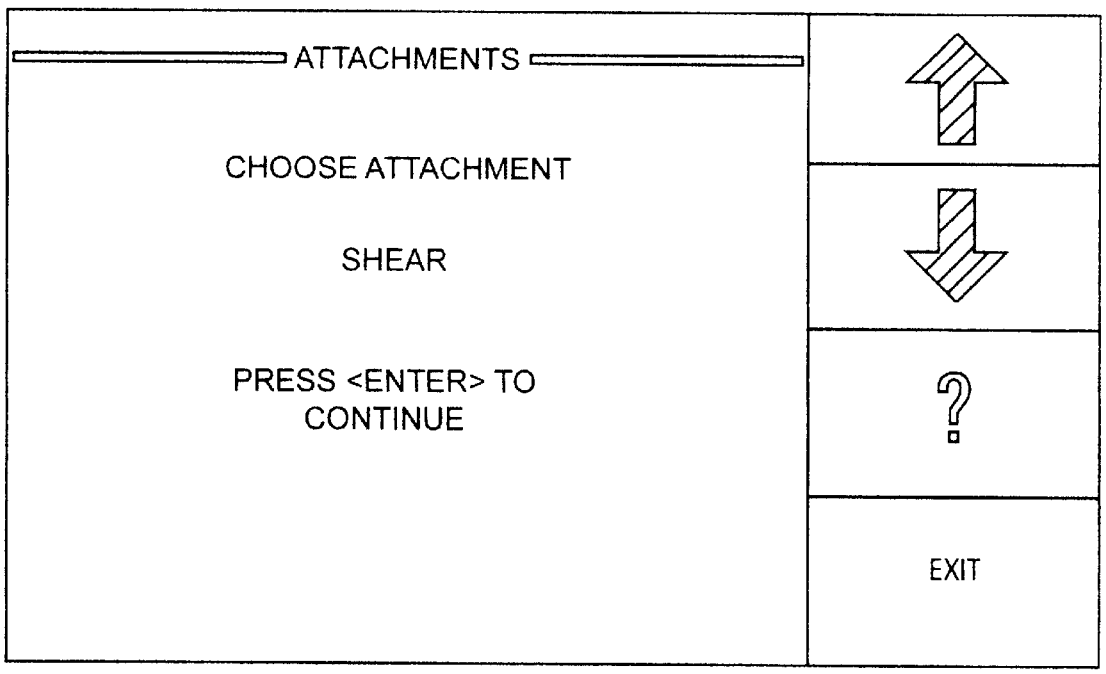
Figure 10L:
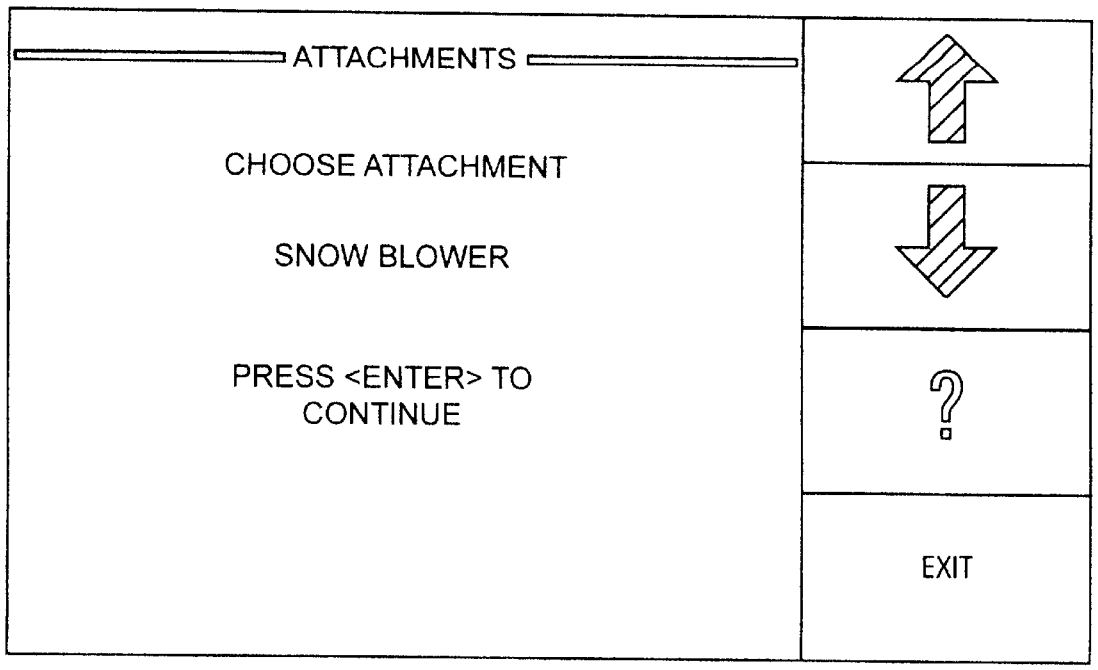
Figure 10M:
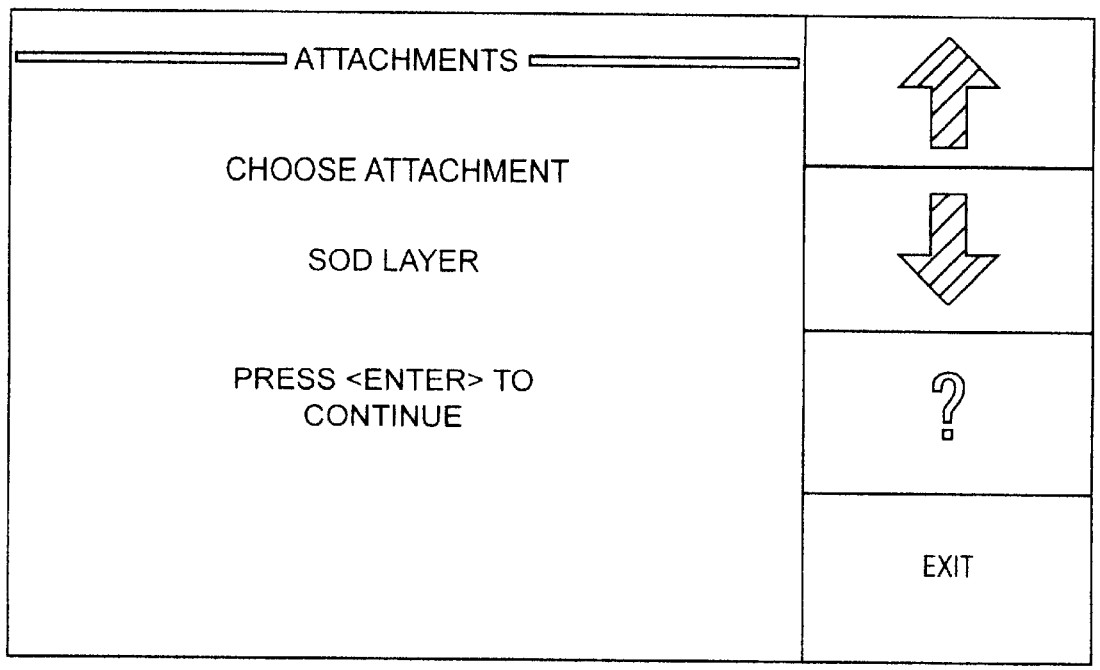
Figure 10N:
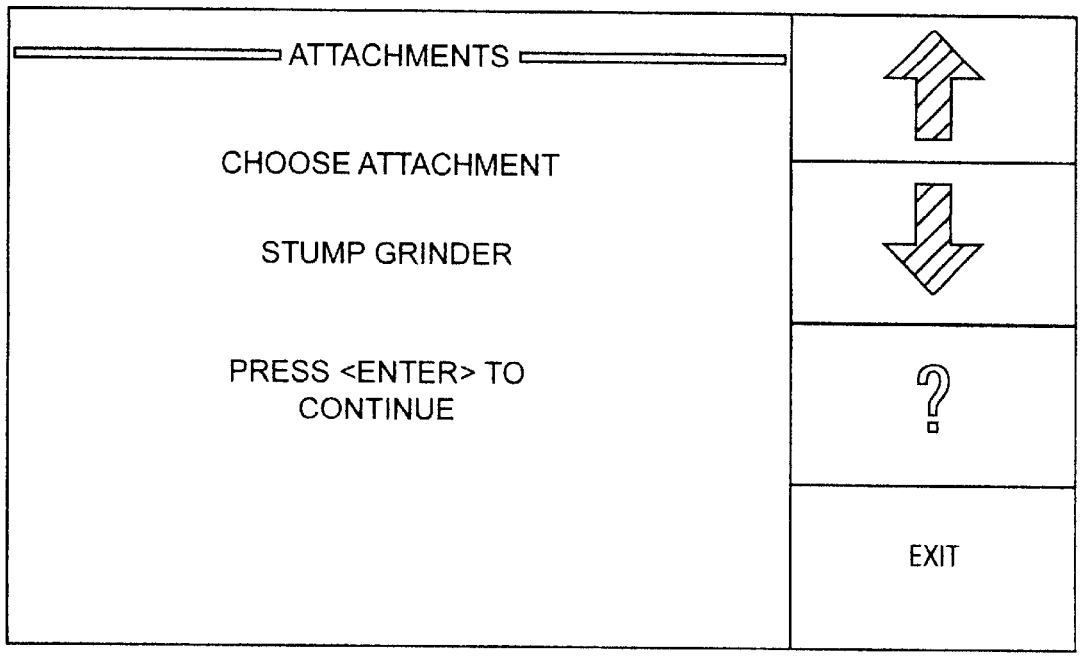
Figure 10O:
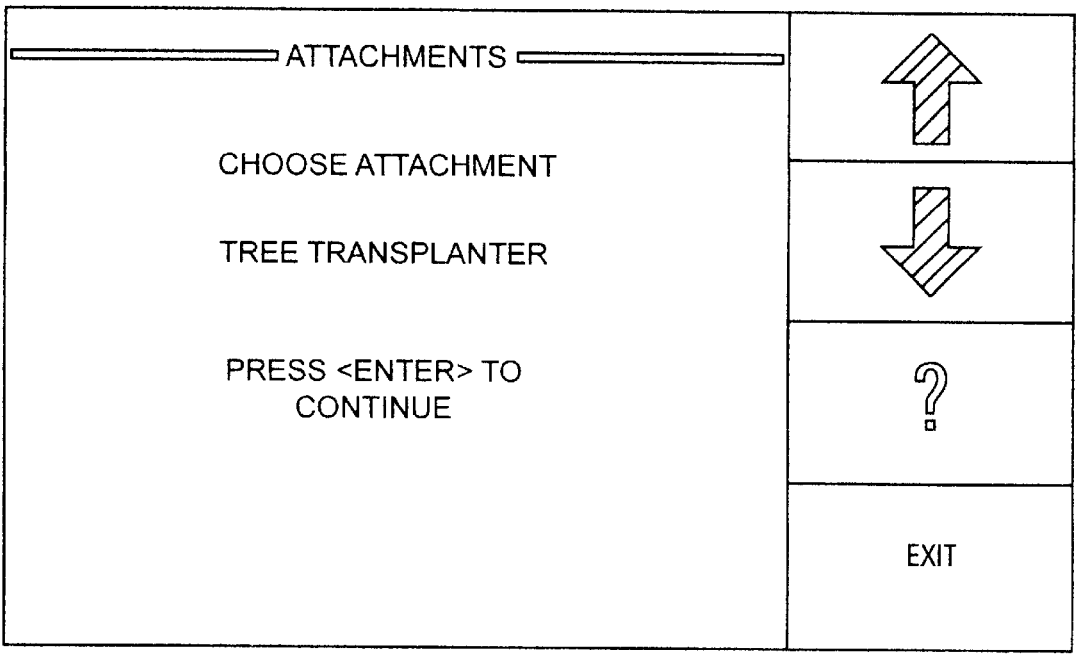
Figure 10P:
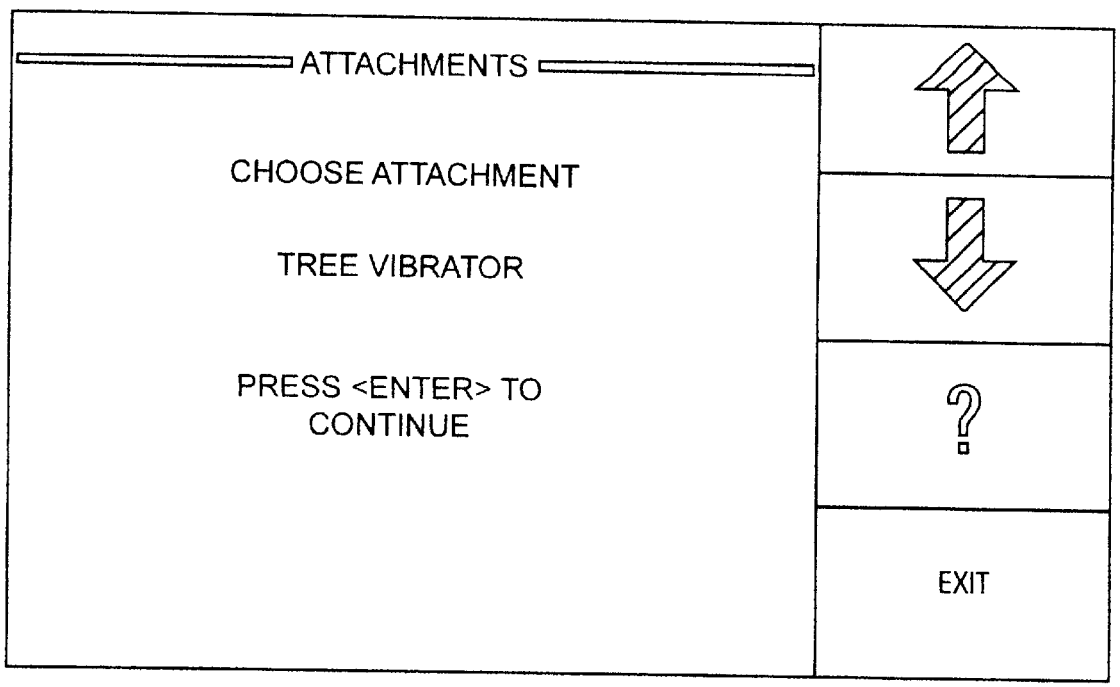
Figure 10Q:
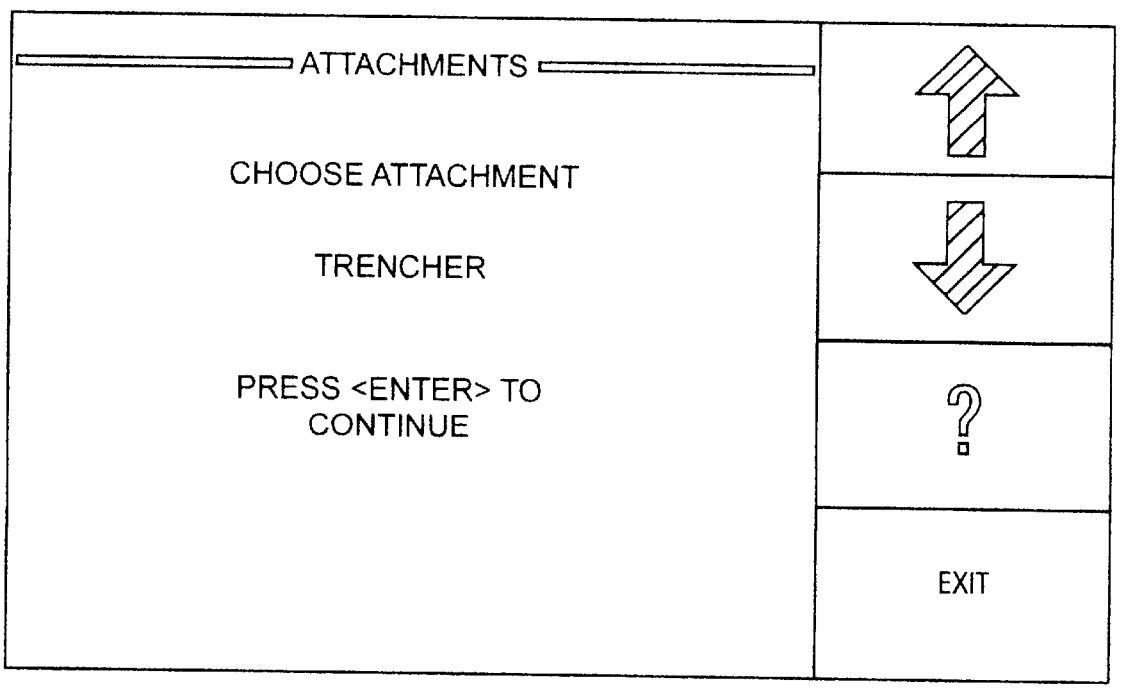
Figure 10R:
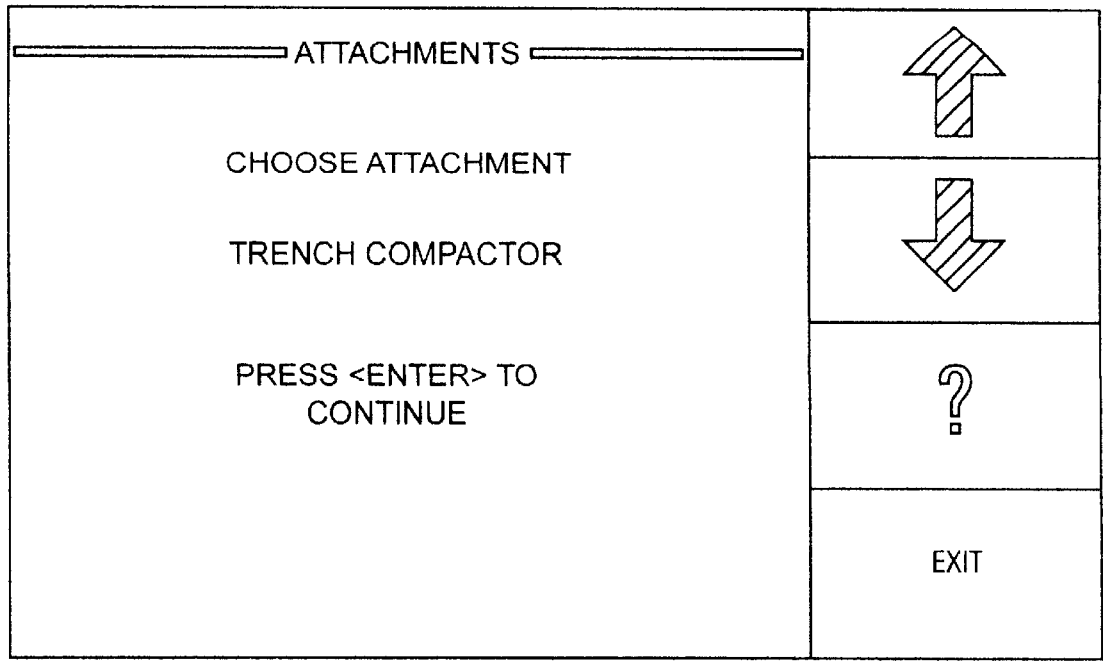
Figure 10S:
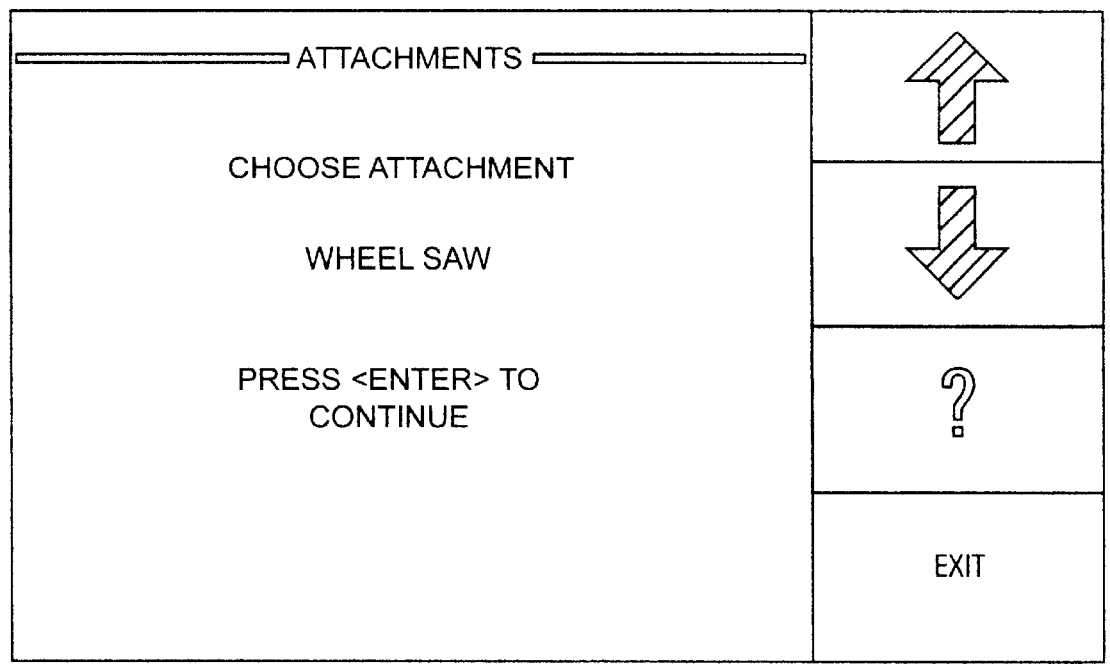
Figure 10T:
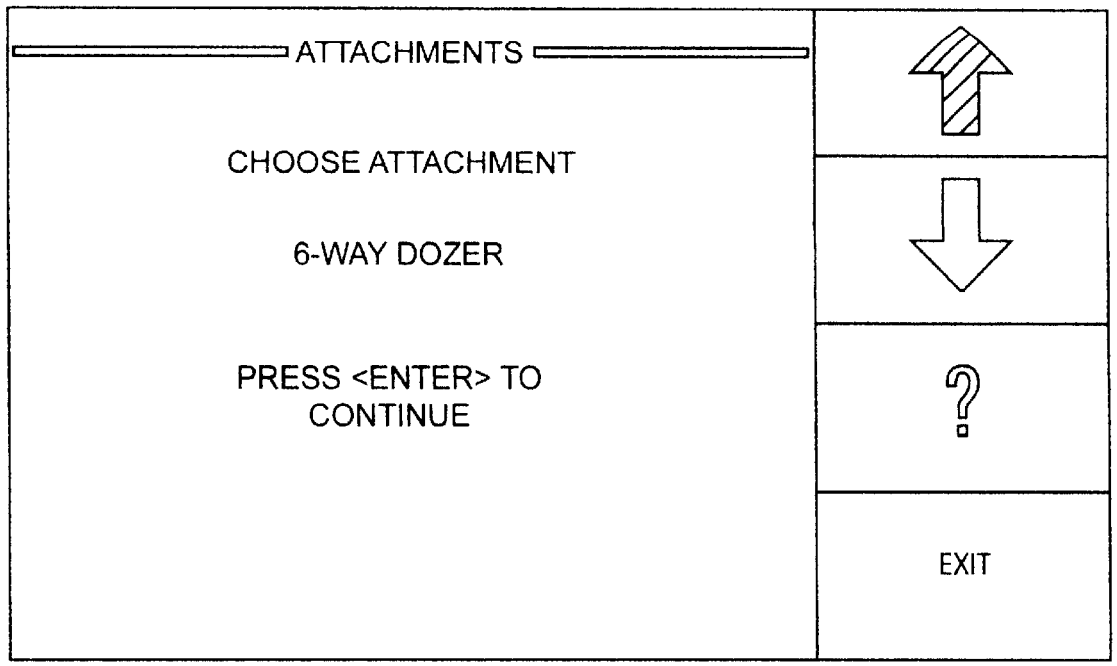

For example, from screen 10A, the user may scroll downwardly by depressing the button associated with the downward arrow once. System 70 then displays a screen such as that indicated in FIG. 10B in which the attachment option displays a backhoe. If the user continues to press the downward arrow, the user continues to advance downwardly through the list of attachments, such as through the screen illustrated in FIG. 10C which displays a chipper attachment as an option. FIGS. 10D–10T illustrate screens which provide additional attachment options which can be selected by the user.

Once the user finds the desired attachment in the list, the user presses the run/enter key. For example, the user wishes to obtain information regarding the operation of a stump grinder. Once the user has advanced through the list of attachments to FIG. 10N, the user simply presses the run/enter key. System 70 then displays a screen such as that illustrated in FIG. 11A. In the illustrative embodiment, it turns out that there are more than one model of stump grinders which can be used with the present power machine. Therefore, the user is asked to confirm that the stump grinder is an SG-25 stump grinder. If not, the user depresses the downward pointing arrow and is presented with the screen such as that illustrated in FIG. 11B. The user can then choose another model of stump grinder. Of course, if there are additional models of stump grinders, the user will be allowed to scroll through those additional models.

Figure 11A:
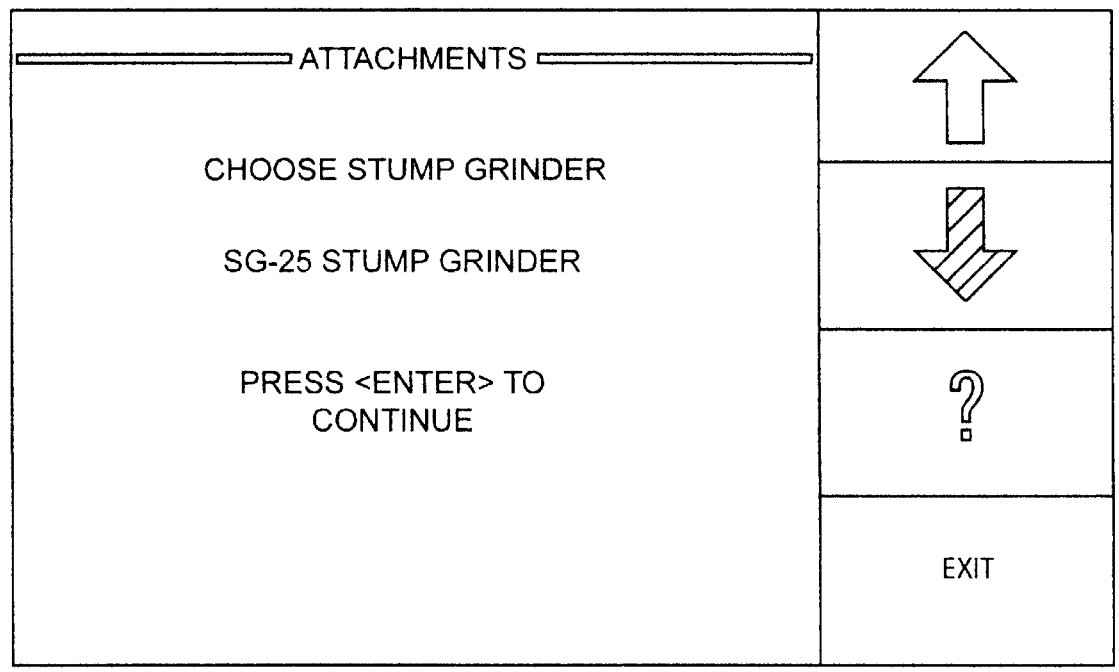
FIGS. 11A–11F illustrate a particular attachment tutorial for purposes of example.
Figure 11B:
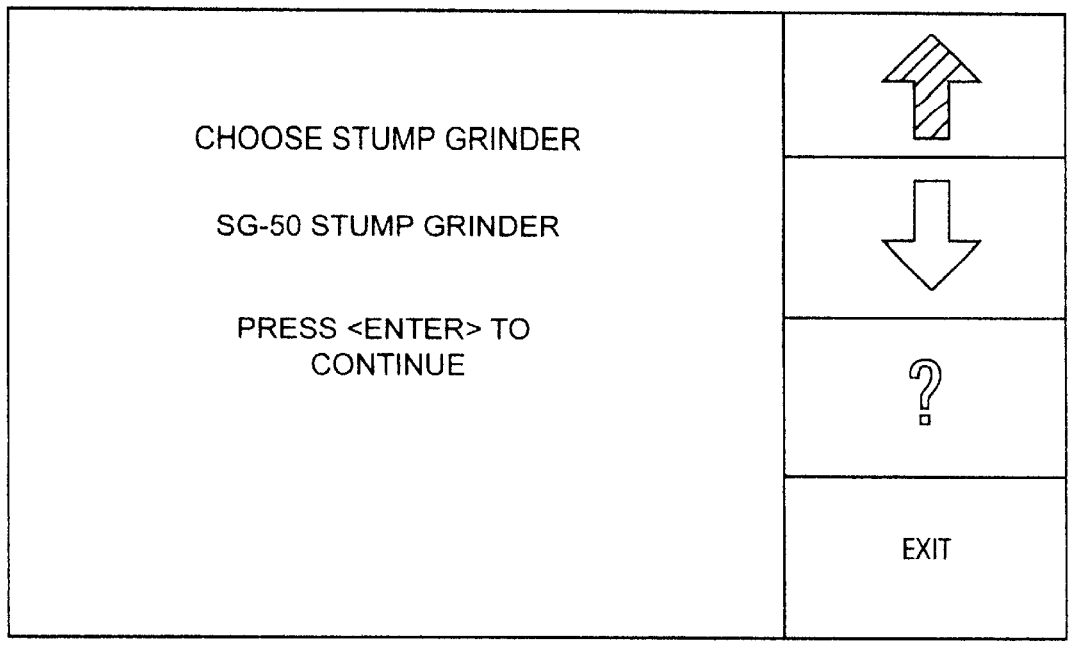
Figure 11C:
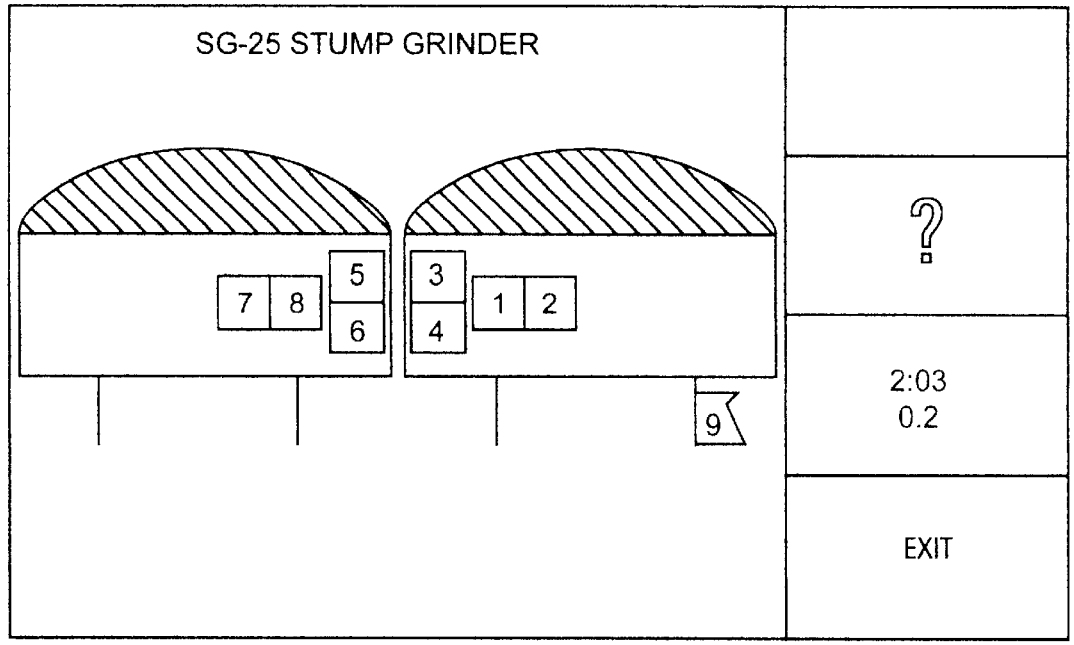

However, assuming that at the screen illustrated in FIG. 11A, the user chooses the SG-25 stump grinder by pressing the run/enter key, system 70 displays a screen such as that illustrated in FIG. 11C. The screen in FIG. 11C shows an illustration of the hand grips, or handles, or other operator actuable inputs within the operator compartment of the loader, and places a number on each operator actuable input device. The user can then be provided with tutorial-type information indicating what happens to the selected attachment when the user depresses one of the operator actuable inputs.

Figure 11D:
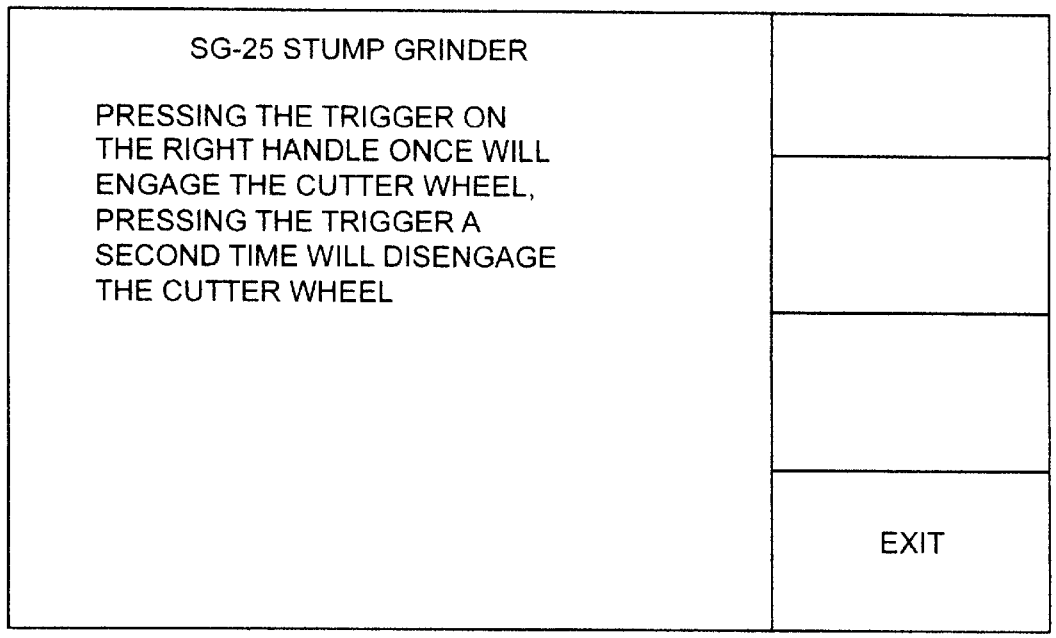

For example, if the user presses a 9 from the screen illustrated in FIG. 11C system 70 provides a screen such as that indicated in FIG. 11D. This screen tells the user what will happen to the stump grinder if the user presses the trigger on the right handle once, and what will happen if the user presses the trigger a second time.

Figure 11E:
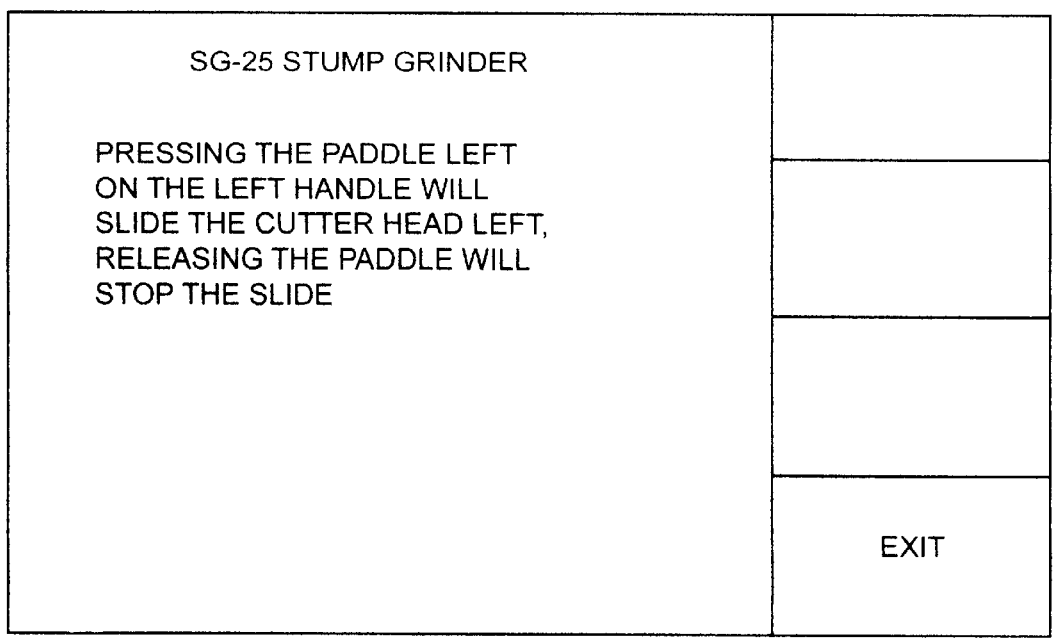

Similarly, if, at the screen illustrated in FIG. 11C, the user enters the number associated with the paddle on the left handle, the user is provided with a screen such as that shown in FIG. 11E. This tells the user what will happen to the stump grinder if the user presses the paddle left on the left handle and if the user releases the paddle.

Figure 11F:
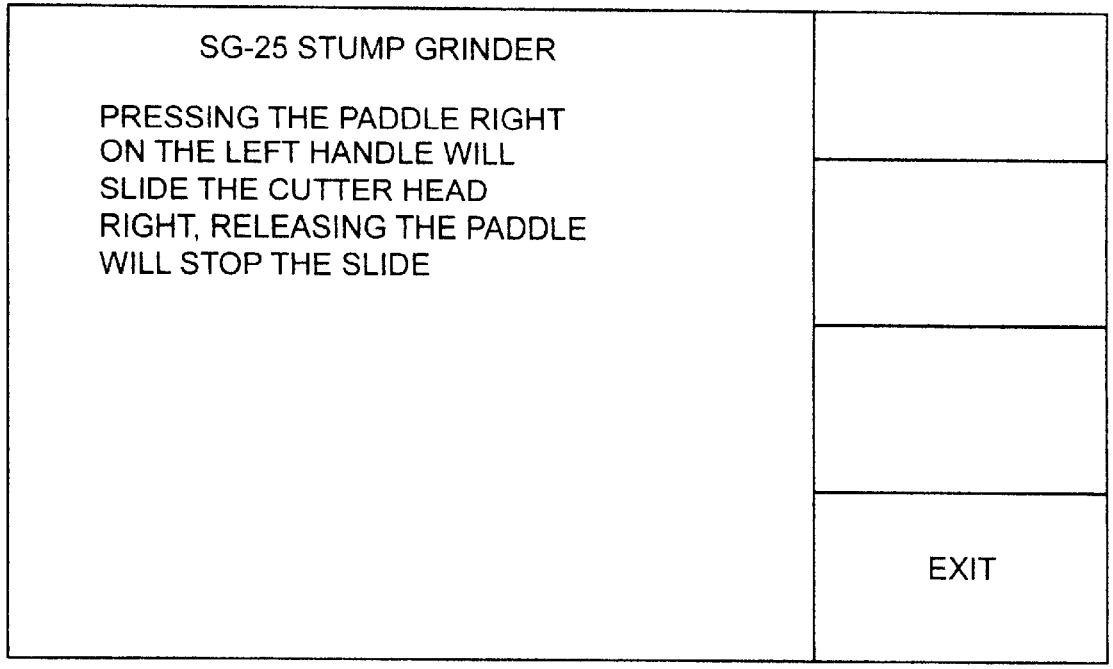

Another tutorial-type screen is illustrated in FIG. 11F which indicates what will happen if the user presses the paddle on the left handle right, or releases the paddle. Similar model selection and tutorial-type information screens are illustratively provided for all attachments which can be attached to the power machine. However, for the sake of brevity, all such screens will not be discussed here. The stump grinder attachment screens are discussed for the purpose of illustration only.

Figure 12A:
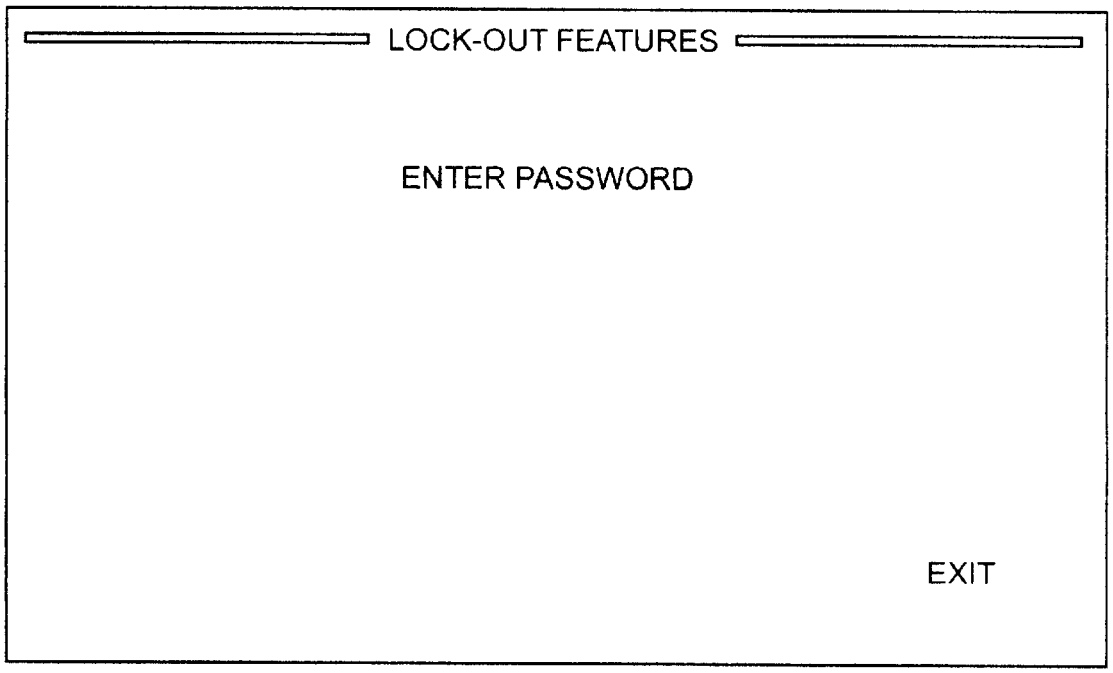
FIGS. 12A–12C illustrate lockout features.
Figure 12B:
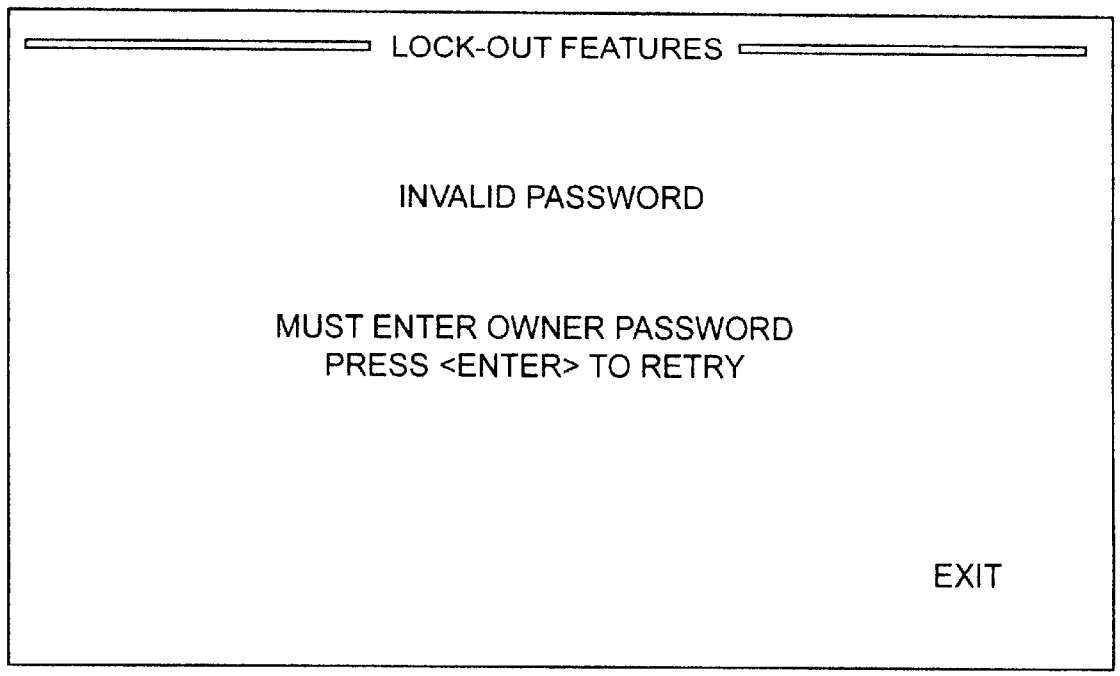

From the screen illustrated in FIG. 9A, if the user selects the button associated with lockout features, the user is asked for a password, such as by having system 70 display a screen such as that illustrated in FIG. 12A. The user then enters the password and depresses the run/enter key. If the password is invalid, a display screen such as that illustrated in FIG. 12B is provided. The user is allowed to retry the password.

Figure 12C:
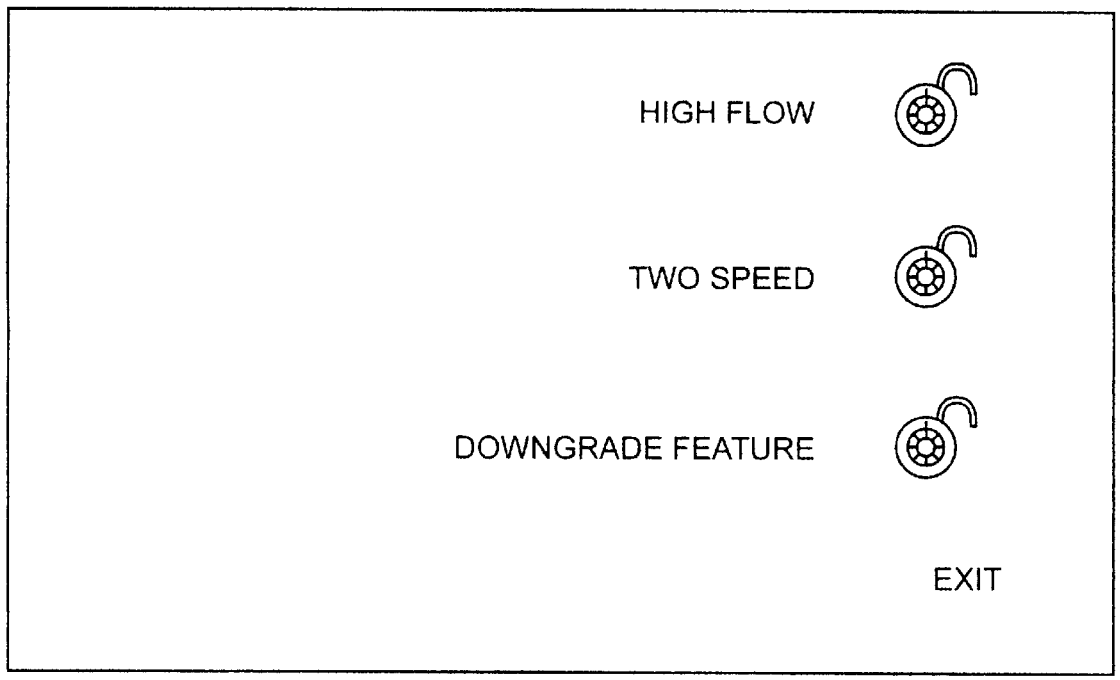

If the password is valid, the user is provided with an opportunity to change certain features which are under password control. This opportunity is provided such as by system 70 displaying a screen such as that shown in FIG. 12C. In the illustrative embodiment shown in FIG. 12C, the user can lock or unlock the high flow functionality, the two-speed functionality, or the down grade feature functionality, all of which are described in greater detail in the above-referenced co-pending application. Briefly, the high flow functionality allows the user to engage a high flow mechanism to provide desired additional hydraulic fluid flow. The two-speed functionality allows the user to switch between a higher and Lower (or faster and slower) speed of operation. The down grade feature allows the user to down grade panel 76 from a computer controlled panel to a key-actuated panel.

Figures 13A, 13B:
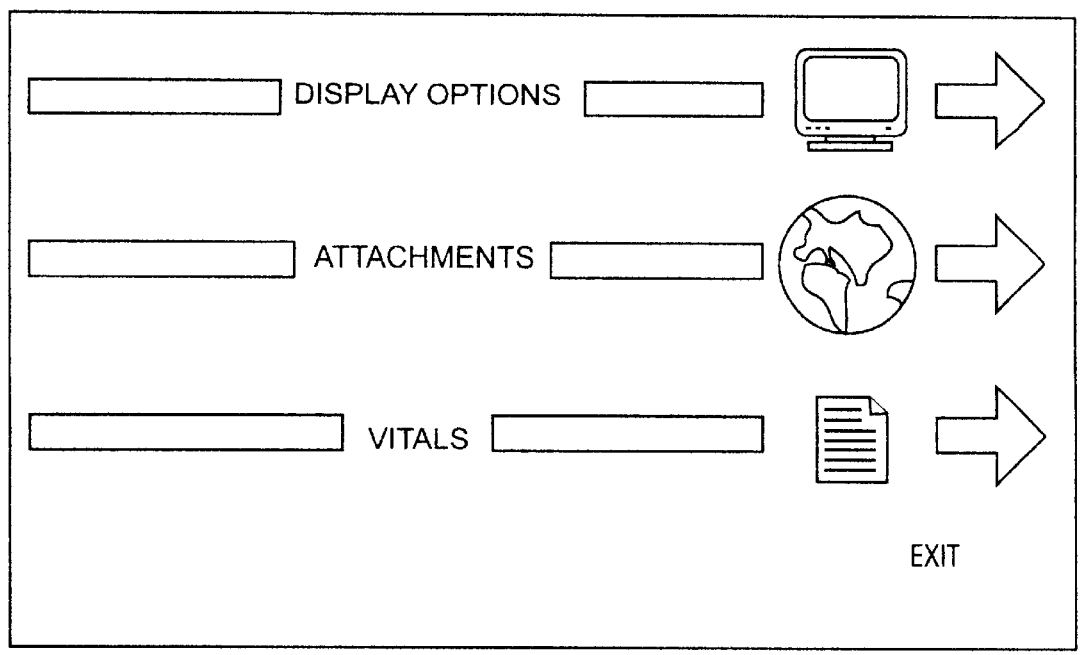
FIGS. 13A–13C illustrate a vital parameter display.
Figures 13C, 14A:
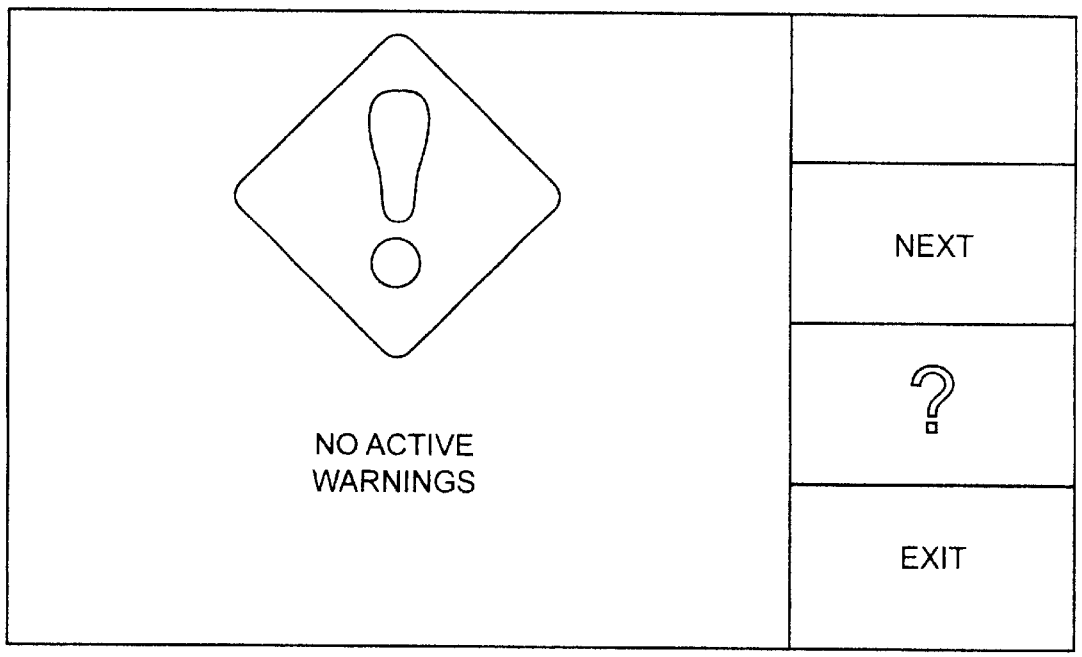
FIGS. 14A–14X illustrate exemplary active warnings of the user interface.

If, at FIG. 7C, the user has chosen the loader features option, and the motor is currently running, the screen illustrated in FIG. 13A is displayed by system 70. It will be noted that the display options and attachment features are identical to those illustrated with respect to FIG. 9A. However, if the engine is running, the user is not provided with the lockout features option shown in FIG. 9A, but is instead provided with the vitals feature option shown in FIG. 13A. If the user depresses the button associated with the vitals prompt, system 70 displays a screen, such as that illustrated in FIG. 13B. This provides an alpha-numeric readout of the vital functions (such as oil pressure, coolant pressure, charge pressure, oil temperature, system voltage and engine speed). The operator can switch between metric and English units by depressing the button associated with the M/E prompt in FIG. 13B. The screen display then switches between that illustrated in FIG. 13B and that illustrated in FIG. 13C.

f. Diagnostics Mode

At the screen illustrated in FIG. 7C, the user can also enter a diagnostics mode by selecting the button associated with the active warnings prompt. This allows the user to view any active warnings currently sensed by the control system. Warnings are given when conditions are present which, if they persist, would be undesirable. If no warnings are currently being sensed, system 70 displays a screen, such as that shown in FIG. 14A. This simply is a message indicating that no active warnings are present.

Figure 14B:
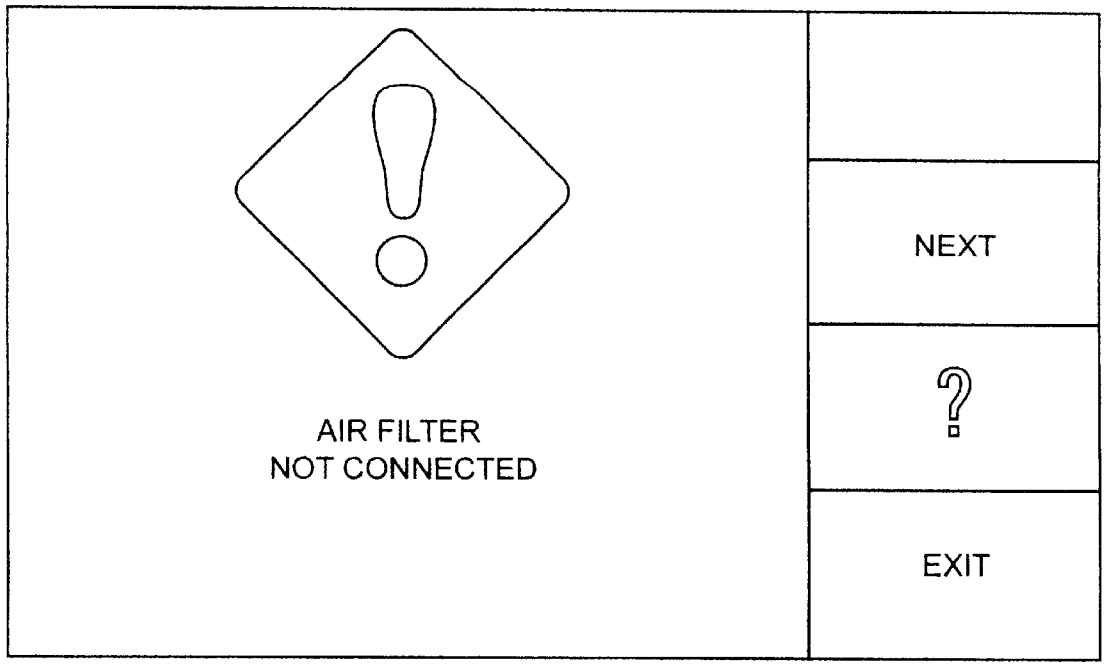
Figure 14C:
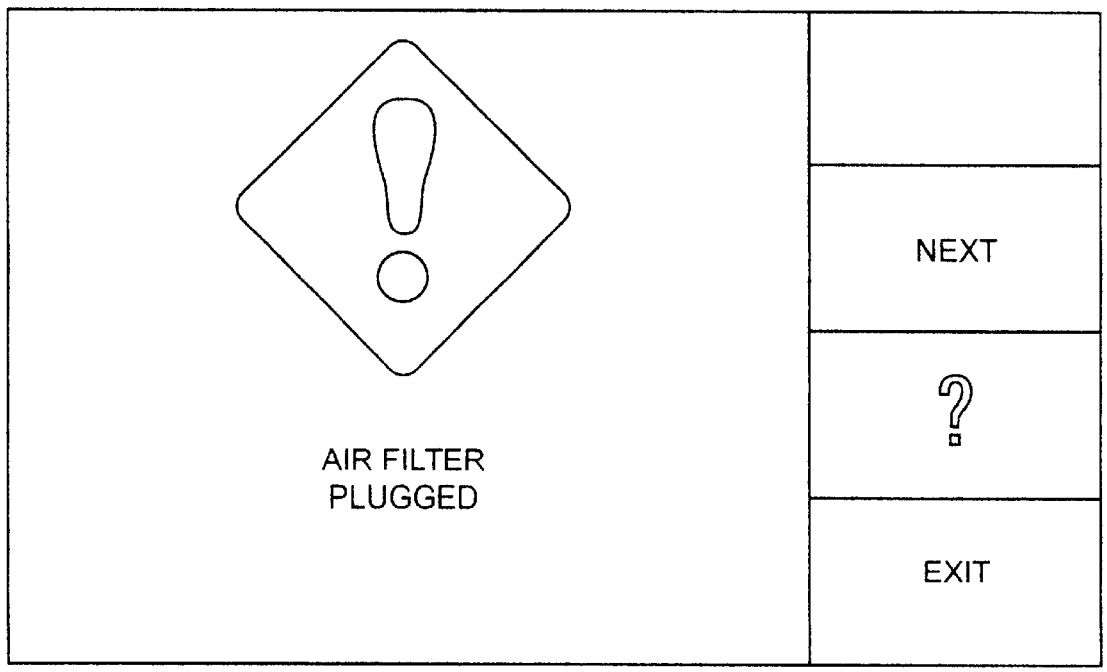

However, if active warnings are present, system 70 displays a screen indicating a first of the active warnings, such as that illustrated in FIG. 14B. It can be seen that the display in FIG. 14B displays a message related to the air filter. The format used in displaying the warning messages, in one illustrative embodiment, indicates the device for which the warning has been issued, and the nature of the warning. Therefore, as shown in FIG. 14B, the message indicates that the error is occurring with the air filter, and also indicates that the error is that the air filter is not connected. The operator can then simply depress the button associated with the "next" prompt to look at the next active warning, and a new screen is displayed such as that illustrated in FIG. 14C which indicates that the air filter is plugged.

Figure 14D:
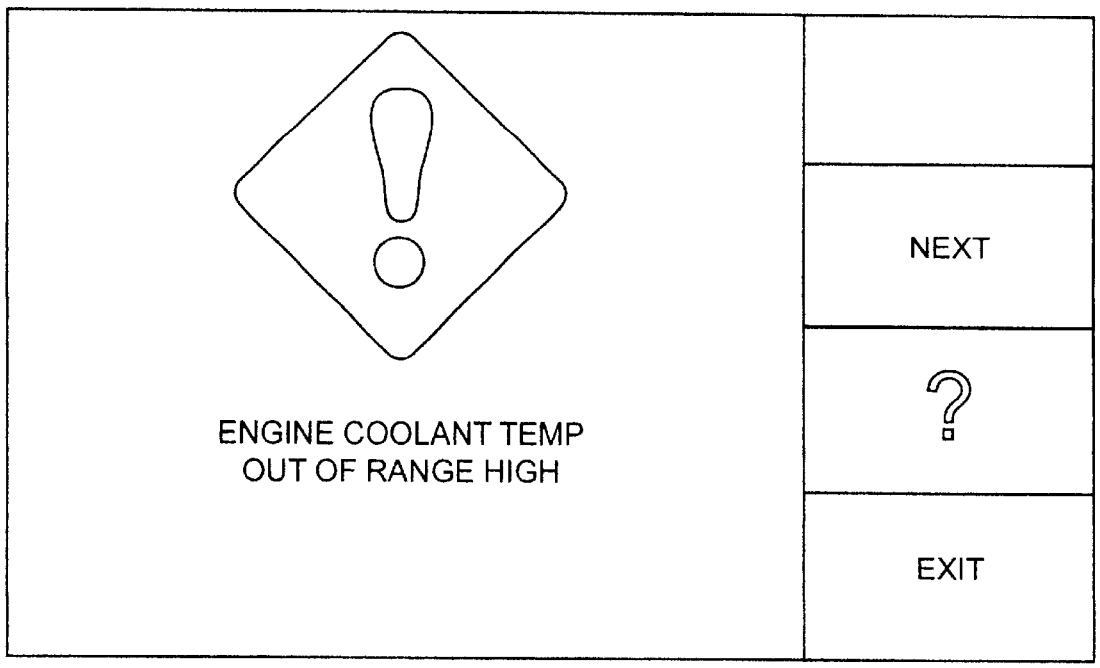
Figure 14E:
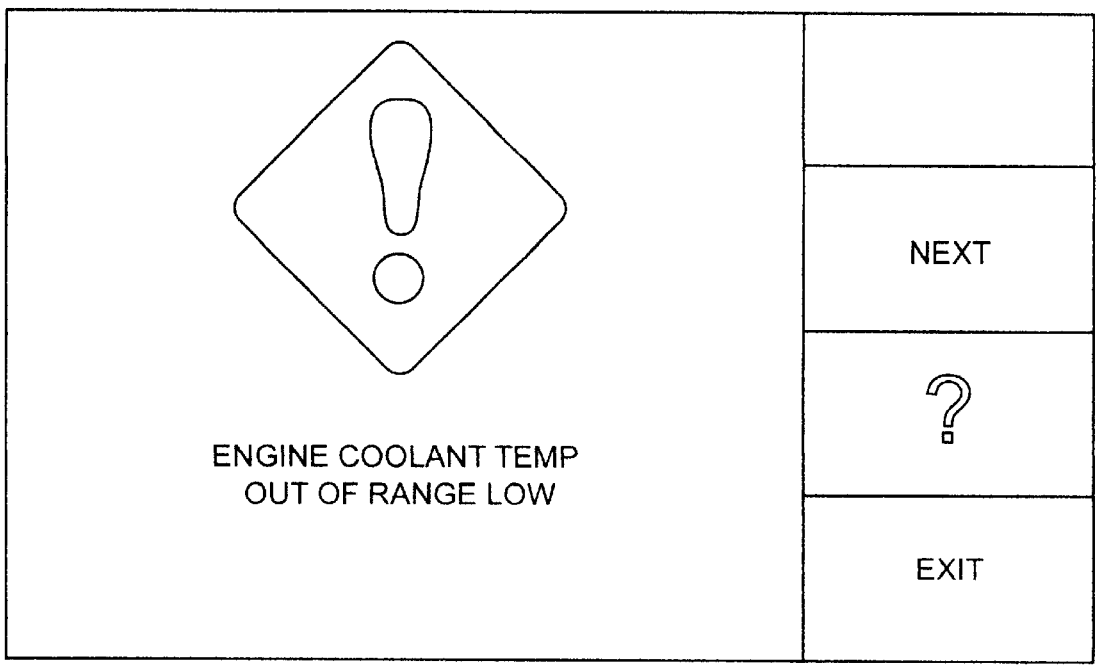
Figure 14F:
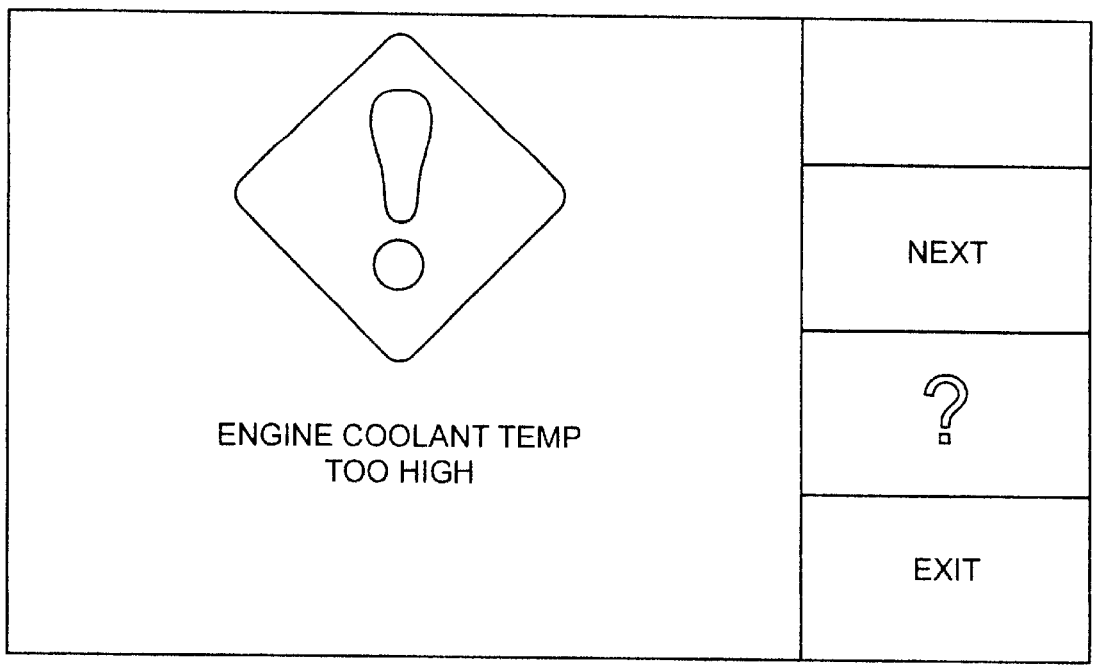
Figure 14G:
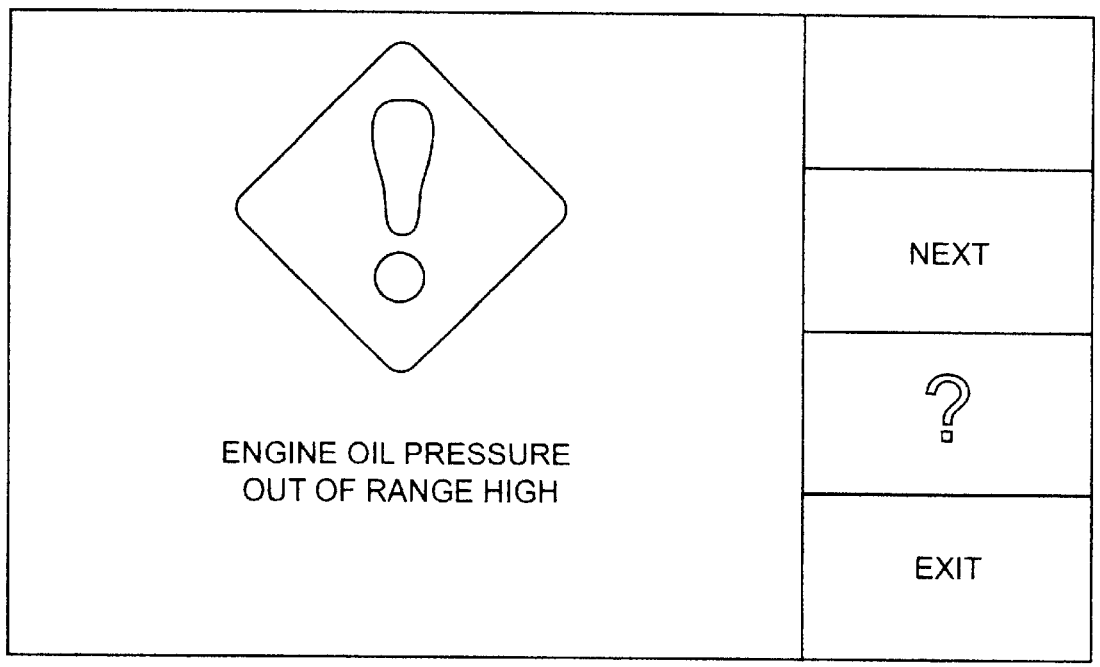
Figure 14H:
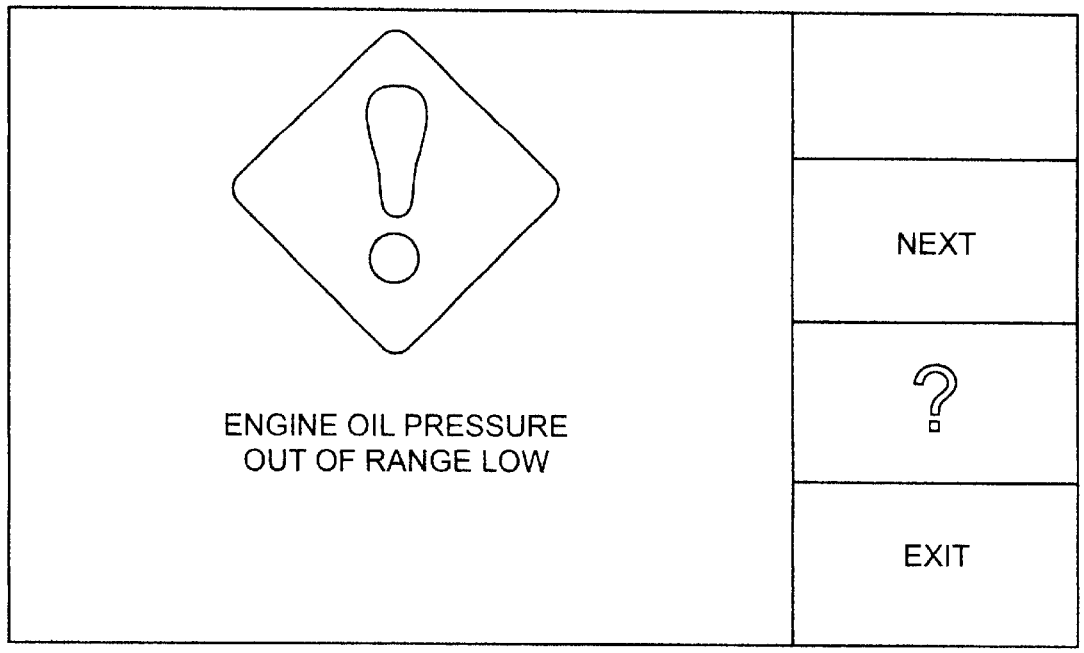
Figure 14I:
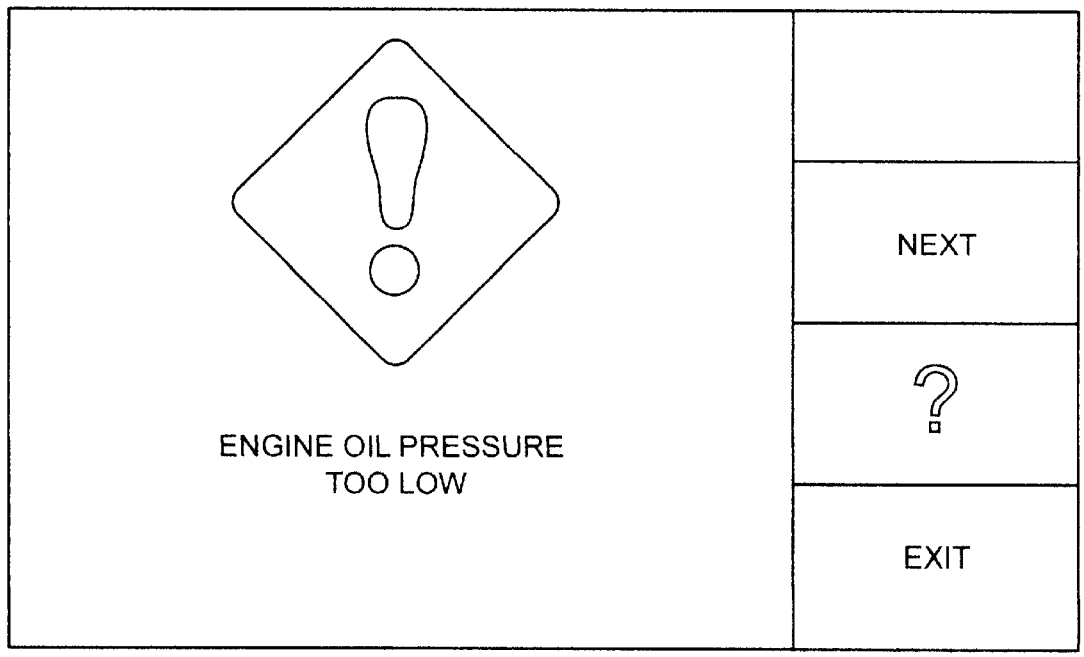
Figure 14J:
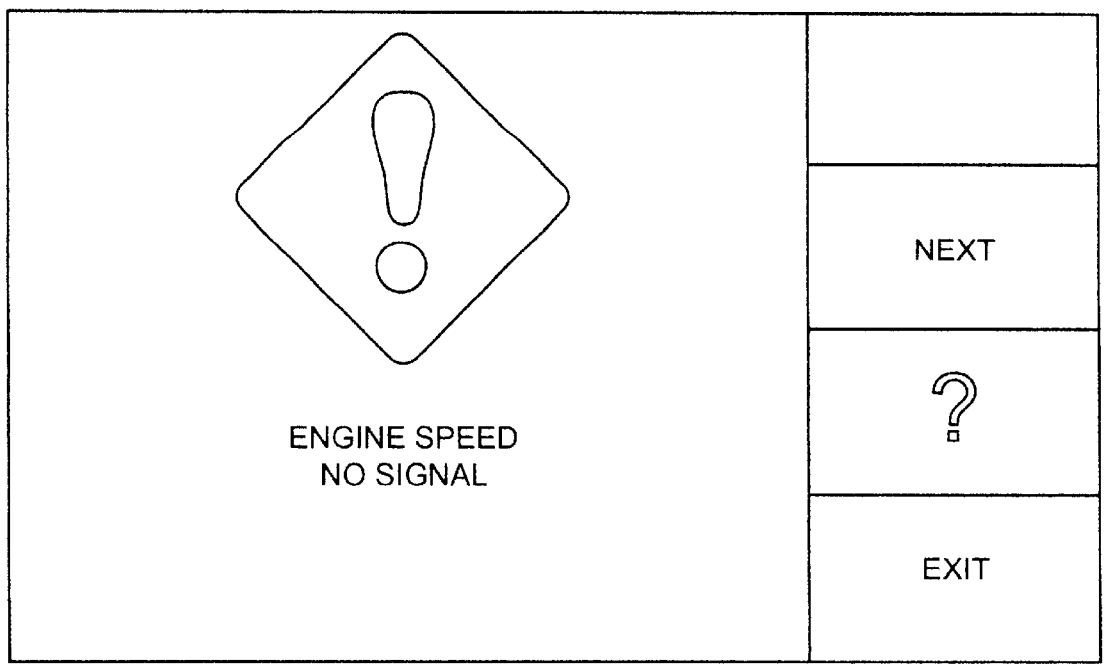
Figure 14K:
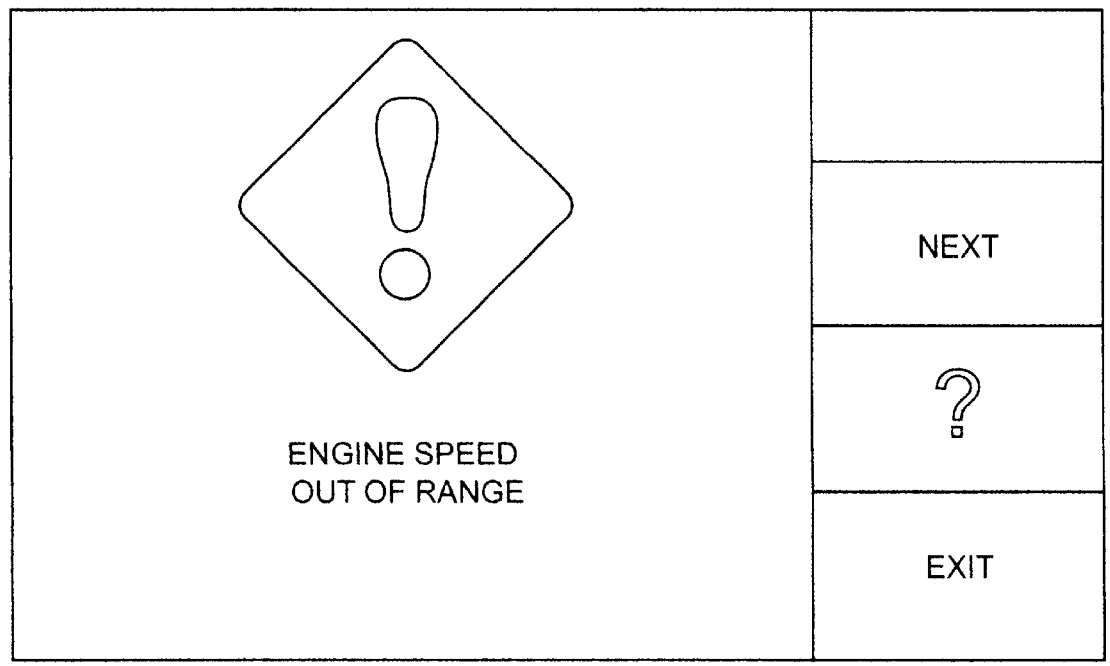
Figure 14L:
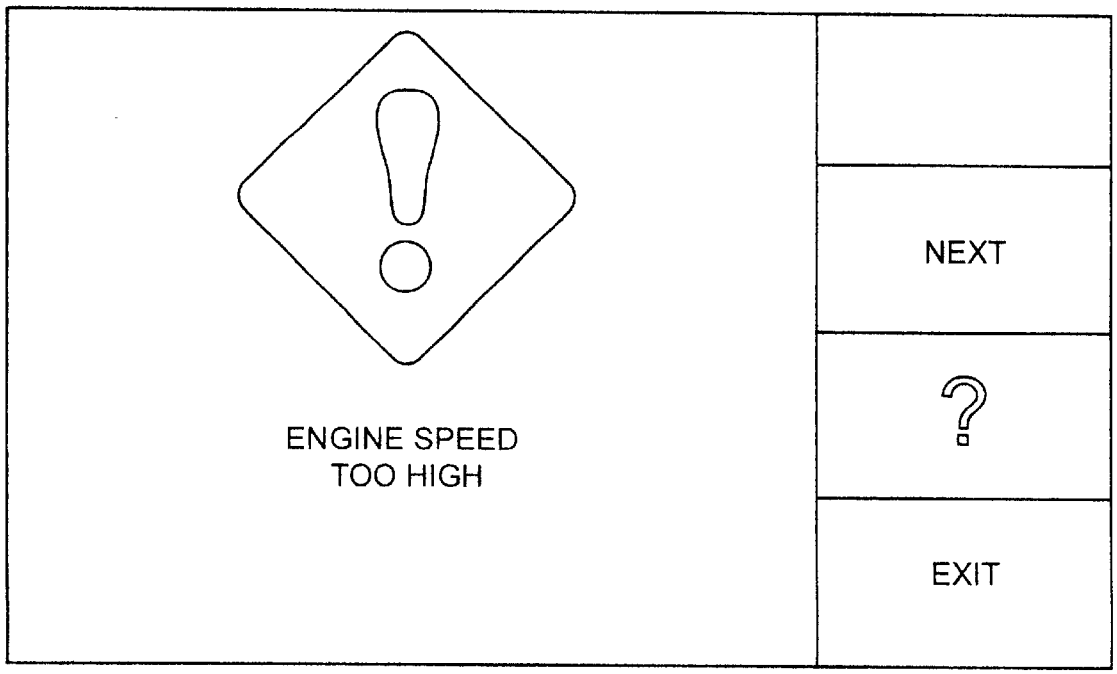
Figure 14M:
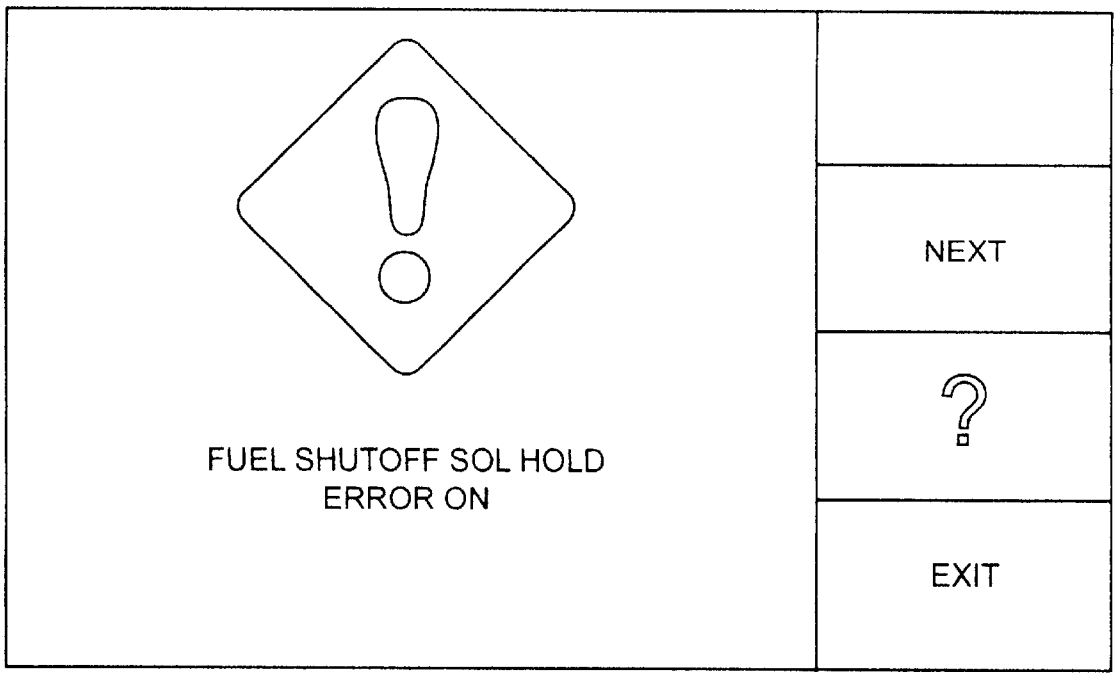
Figure 14N:
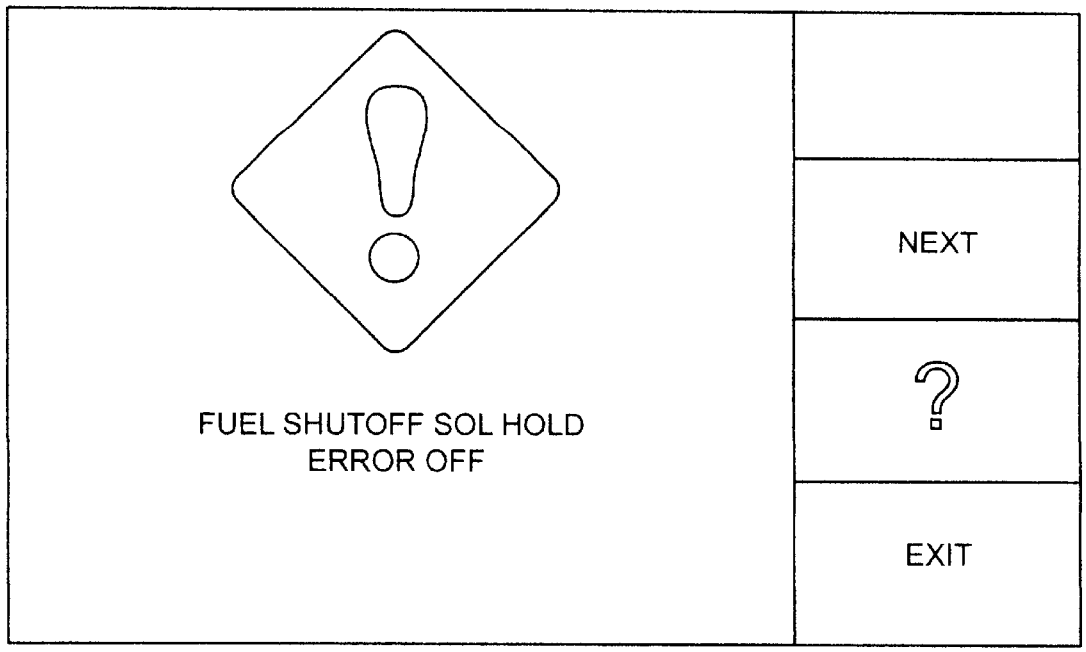
Figure 14O:
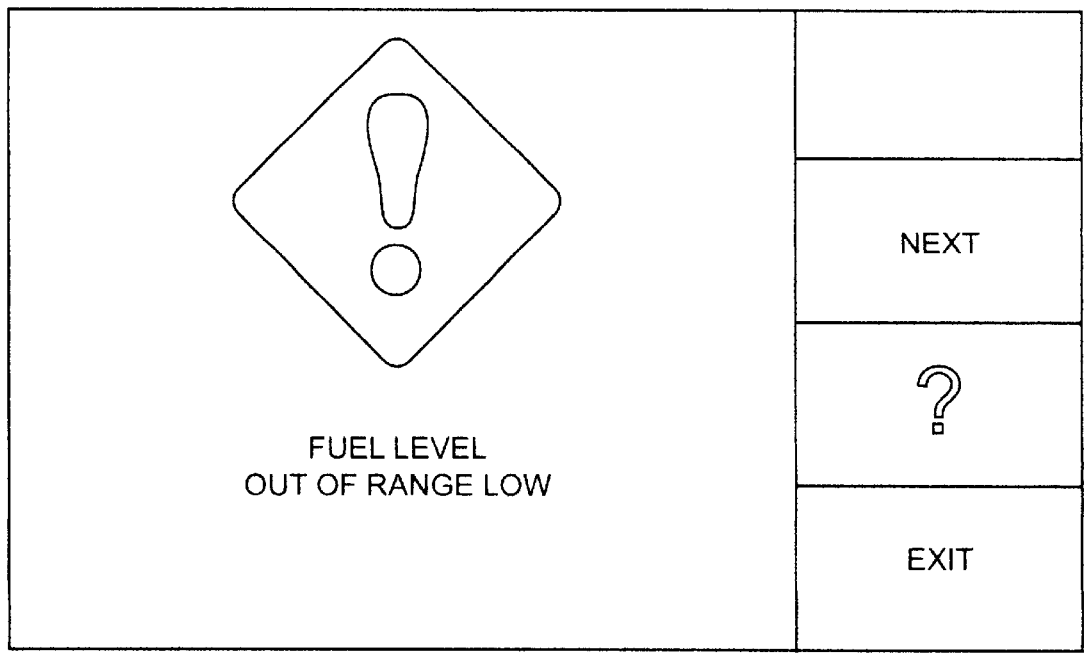
Figure 14P:
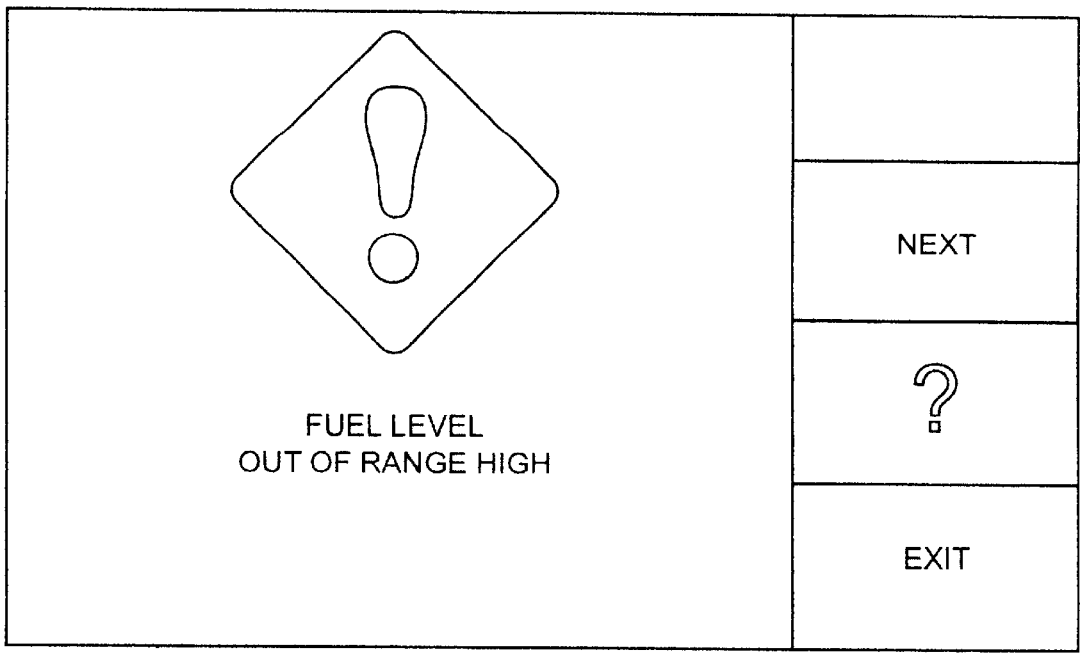
Figure 14Q:
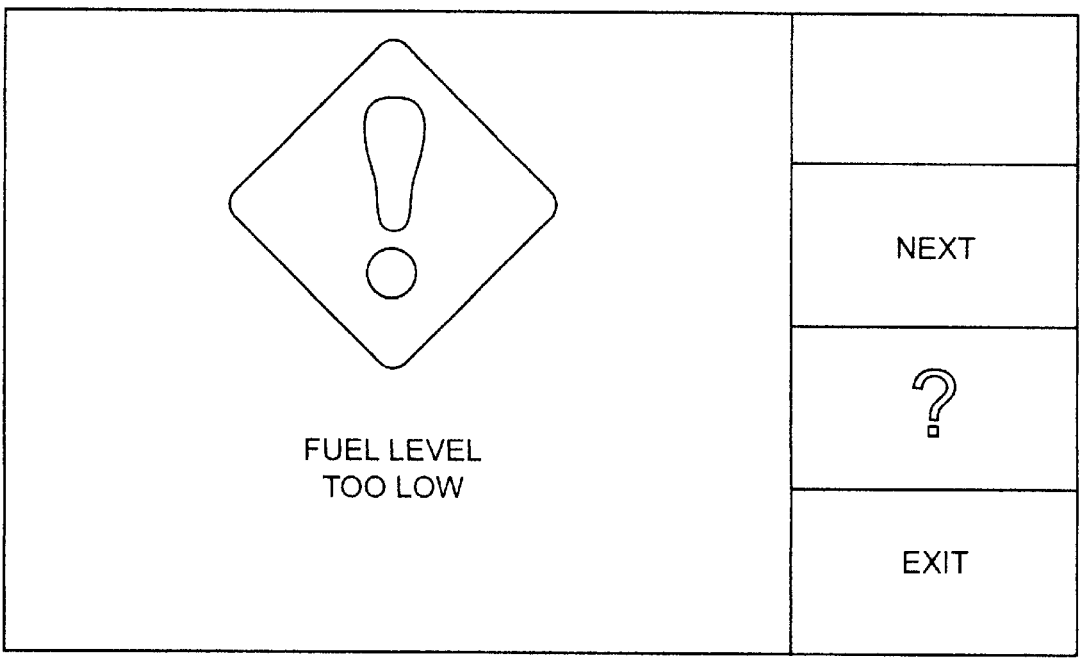
Figure 14R:
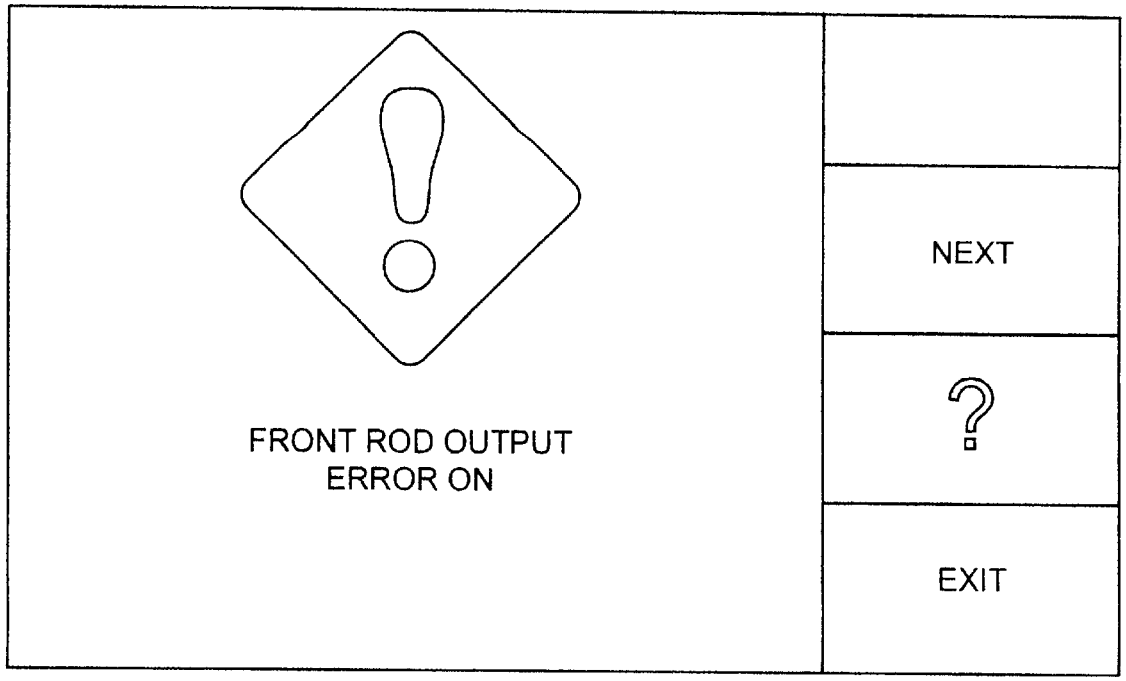
Figure 14S:
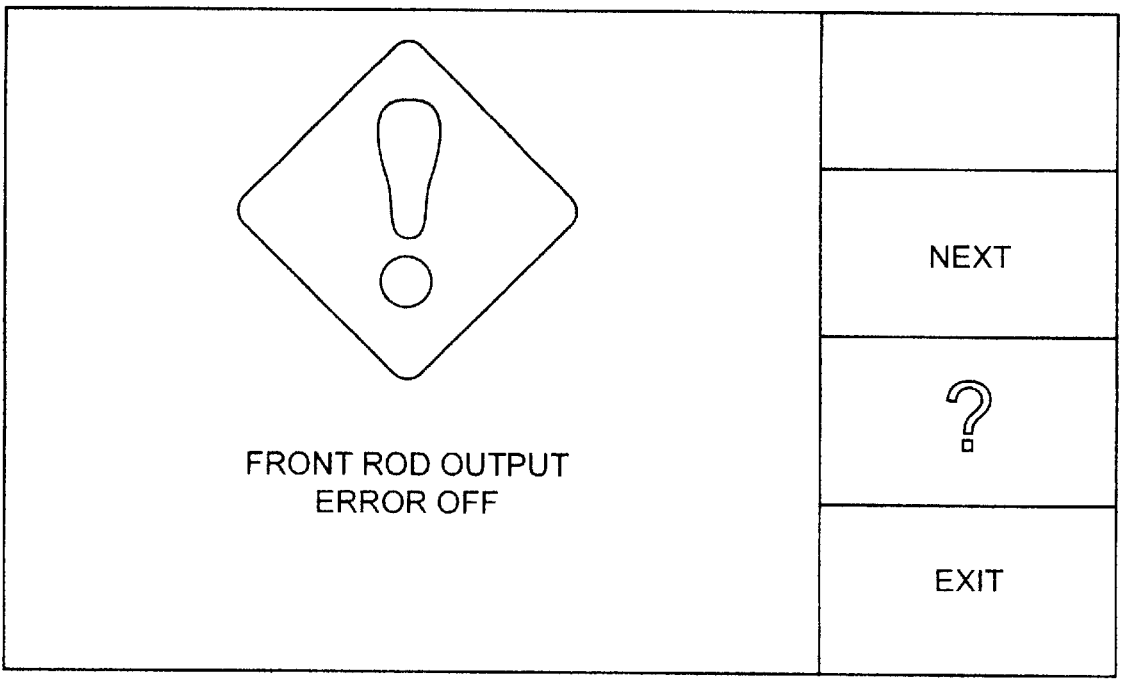
Figure 14T:
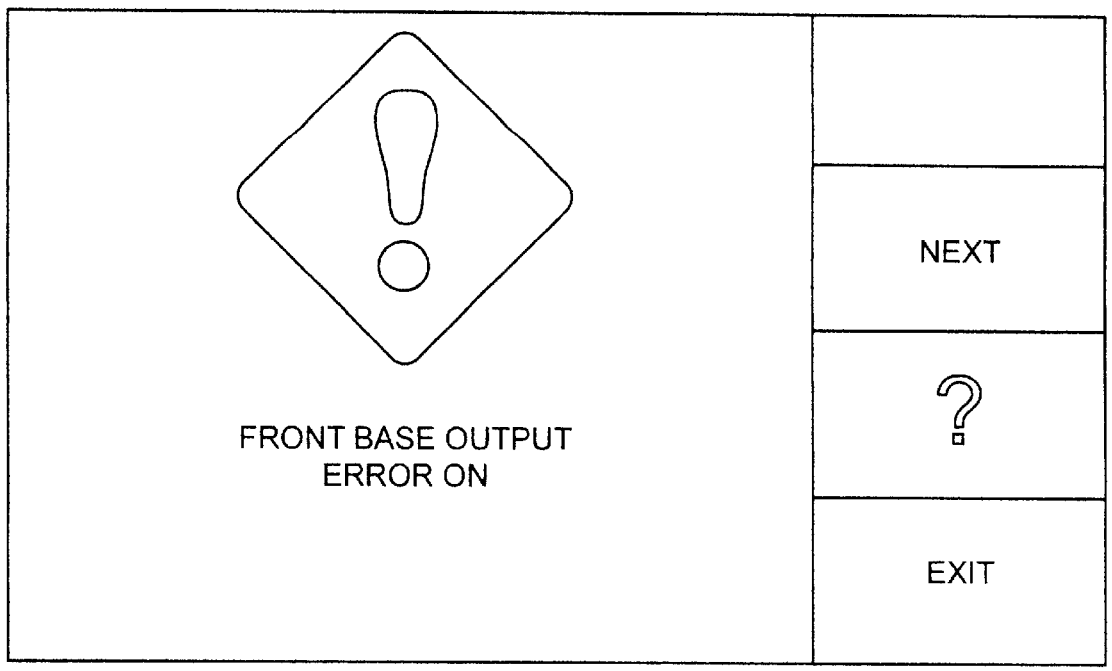
Figure 14U:
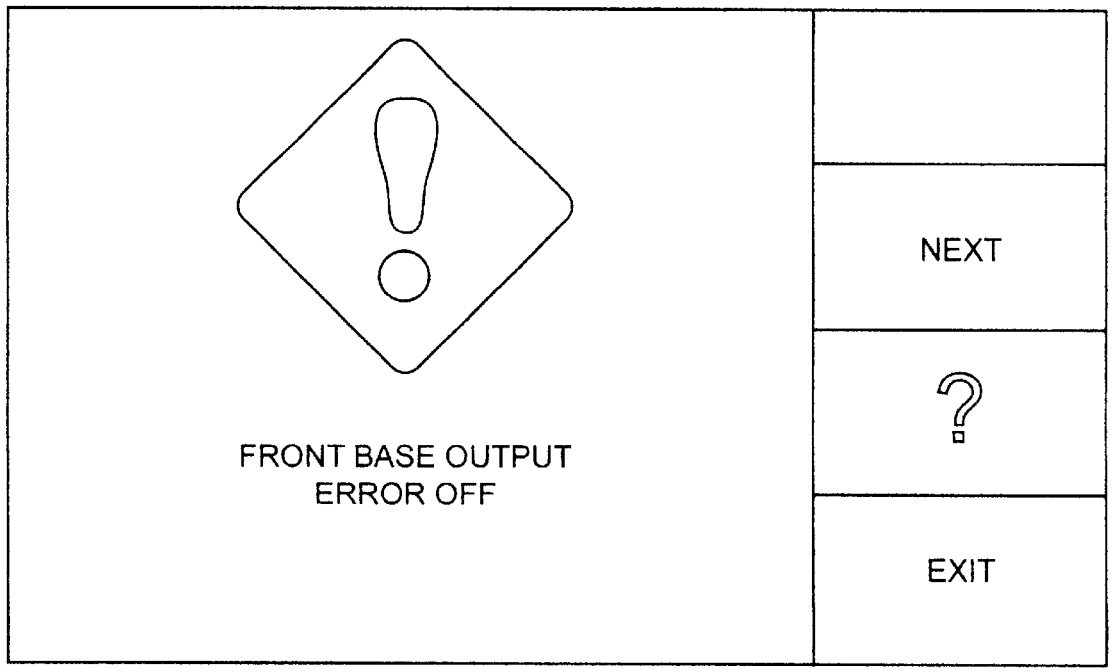
Figure 14V:
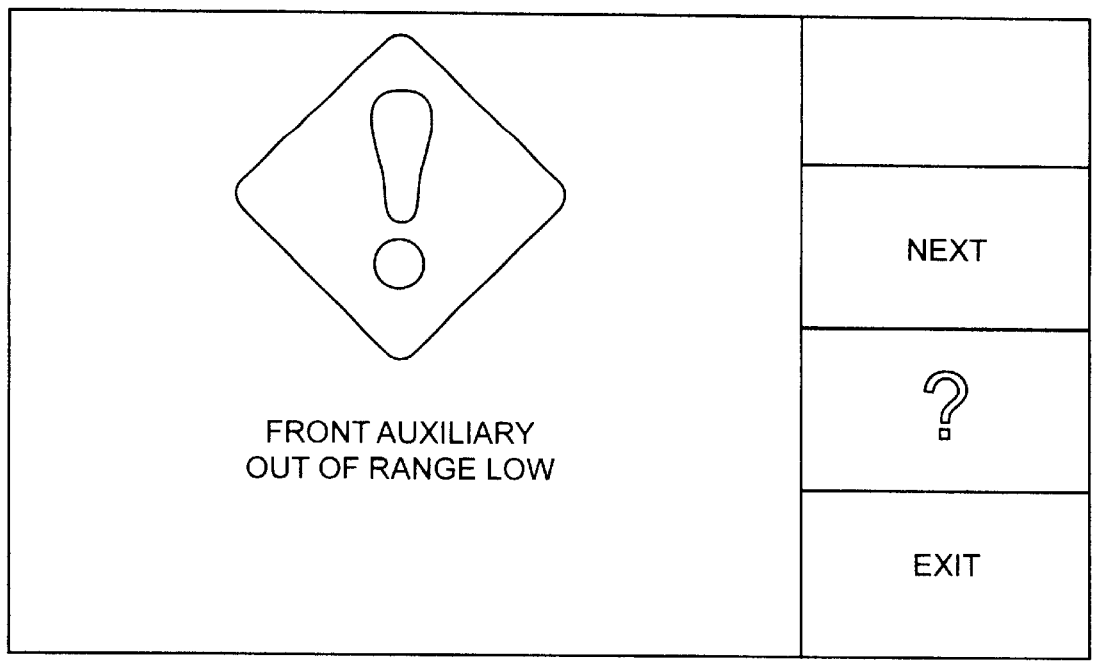
Figure 14W:
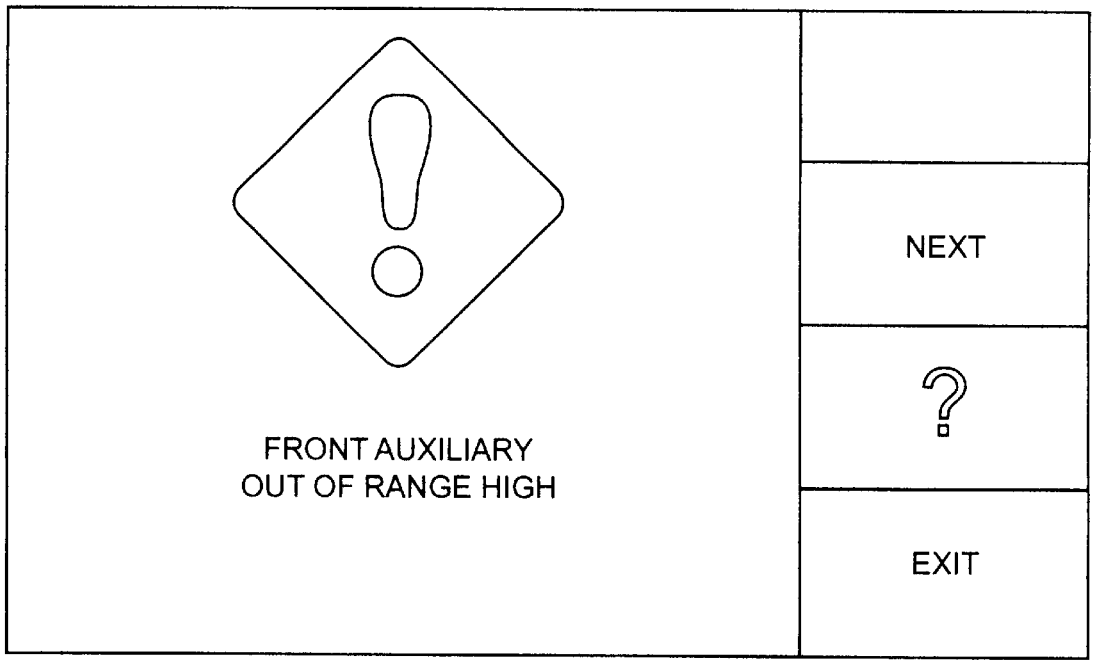
Figure 14X:
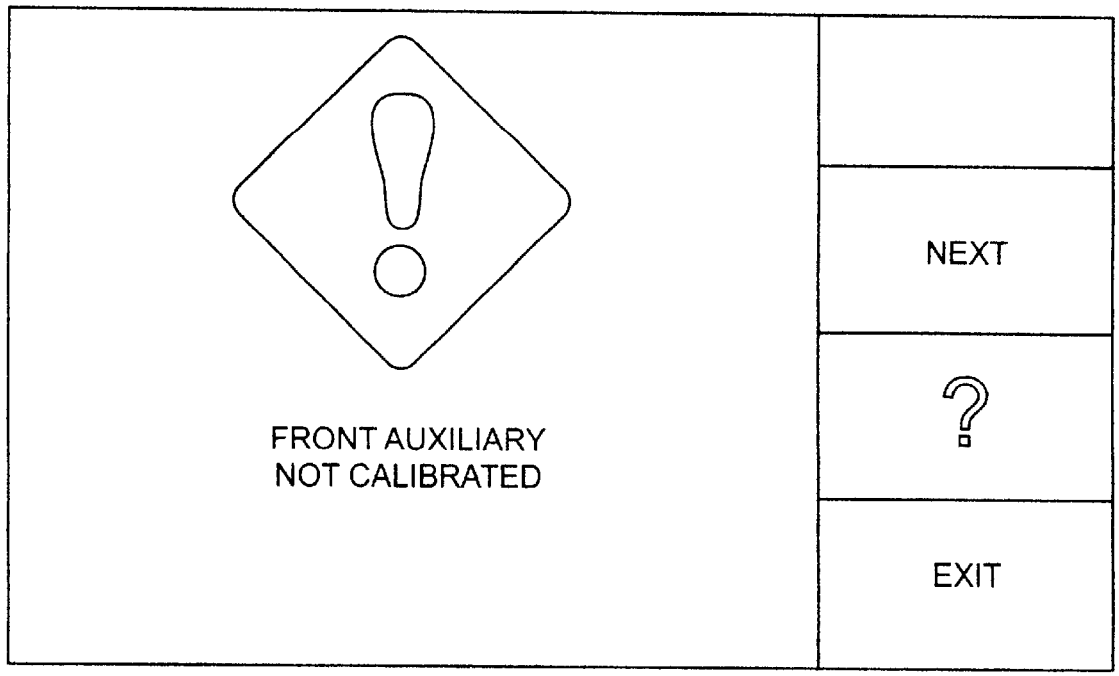

Of course, a wide variety of active warnings can be displayed, based simply on which parameters are sensed by the control system. A number of exemplary warnings are illustrated in FIGS. 14D–14X. Of course, others can be used as well.

g. Shut Down Conditions

Figure 15A:
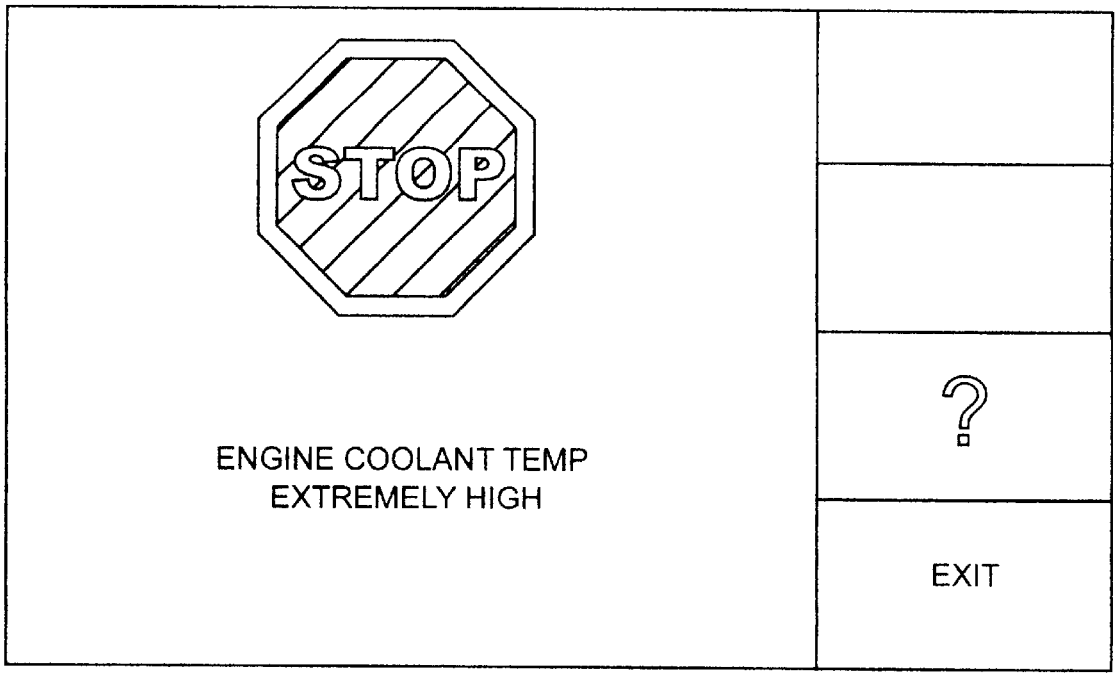
FIGS. 15A–15E illustrate exemplary shut down user interface messages.
Figure 15B:
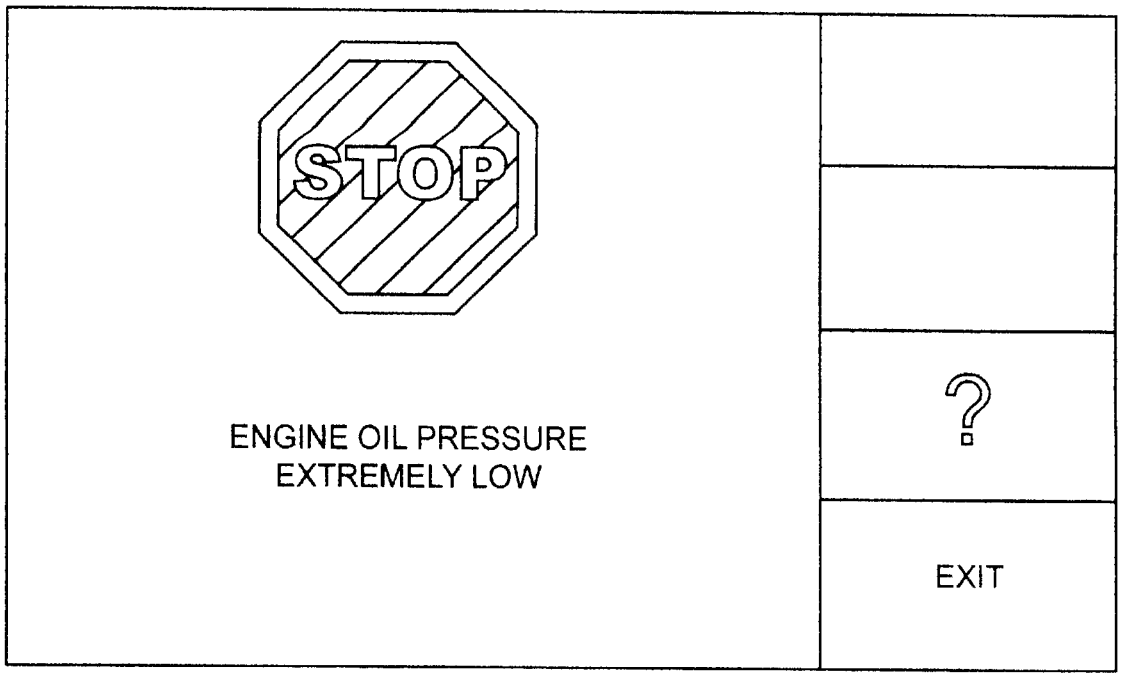
Figure 15C:
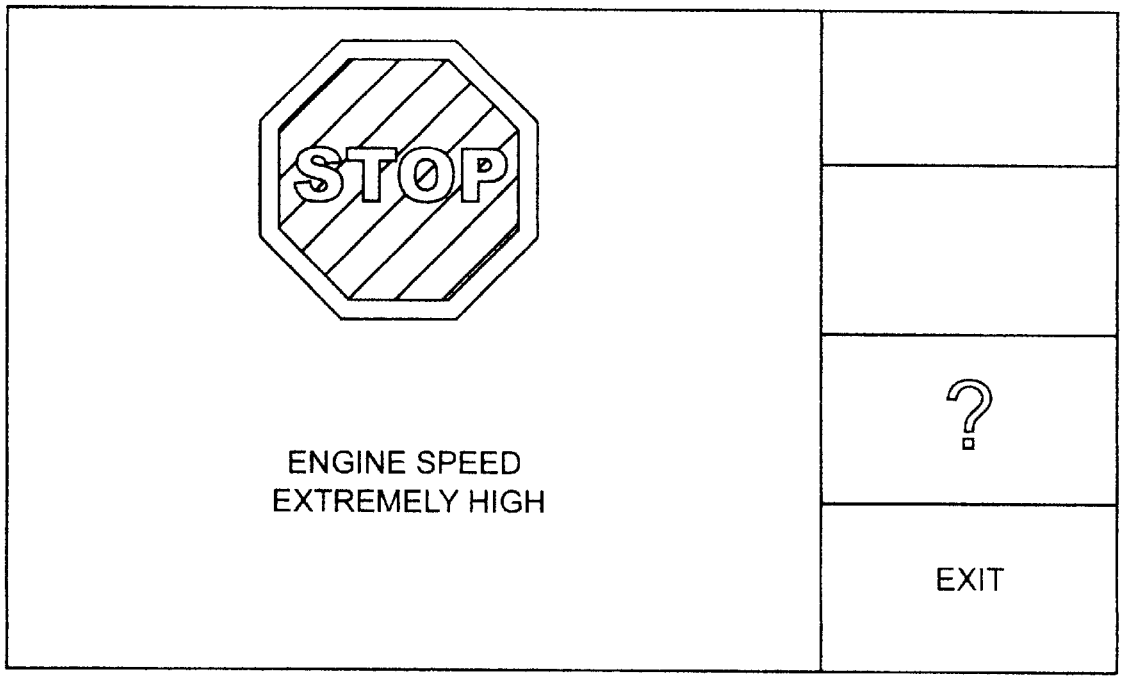
Figure 15D:
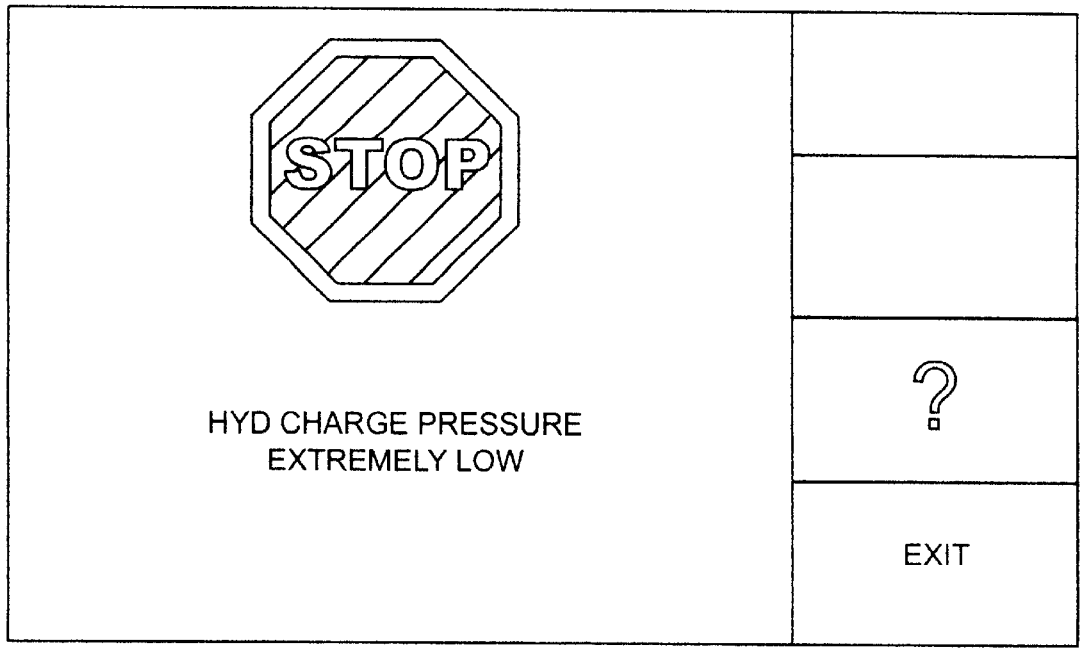
Figure 15E:
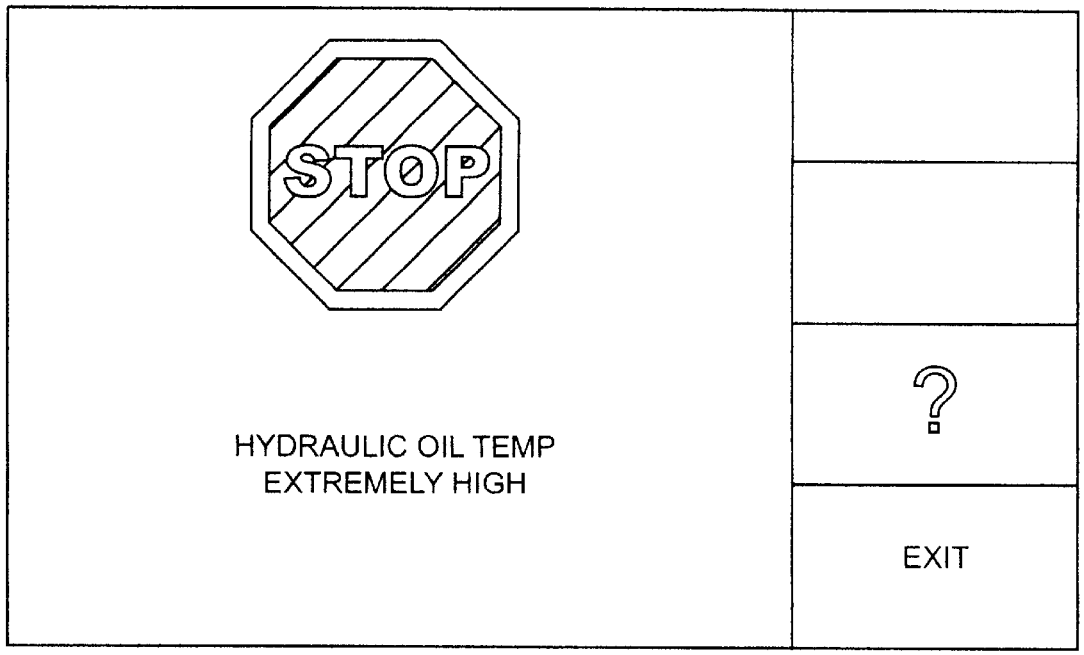

At any time during the operation of the power machine, the control system may sense operating parameters which are so critical that they cause controller 52 to shut down the engine or certain operations of the loader. In that case, controller 52 provides a message to panel controller 72 causing panel controller 72 to display a shut down message such as that illustrated in FIG. 15A. The screen in FIG. 15A illustrates that the shut down condition pertains to the engine coolant temperature, and the particular error which causes the shut down is that the engine coolant temperature is extremely high. A number of other shut down condition displays are indicated in FIGS. 15B–15E. Of course, more or fewer shut down conditions can be sensed and displayed as well.

h. Help Screens

Figure 16A:
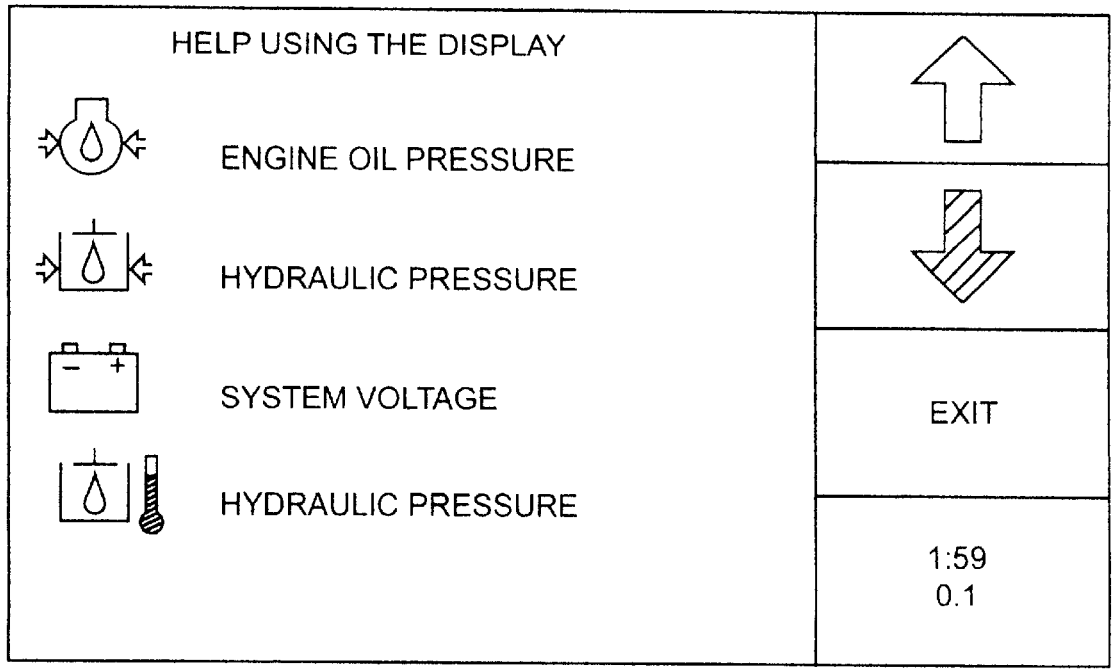
FIGS. 16A–17F illustrate exemplary help screens.
Figure 16B:
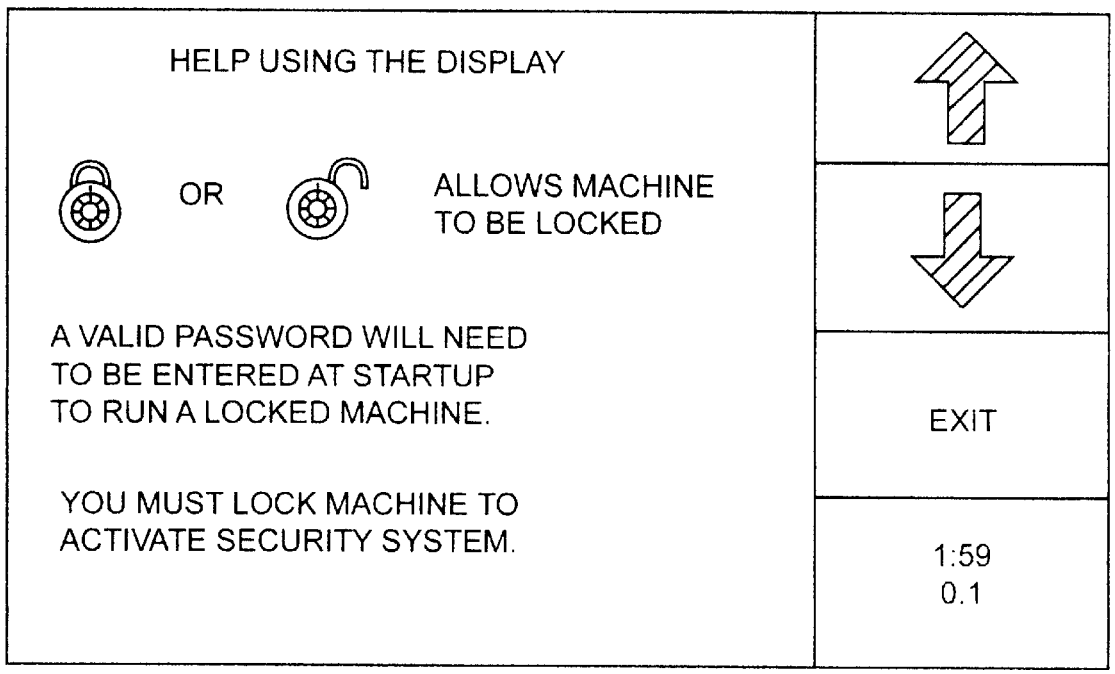
Figure 16C:
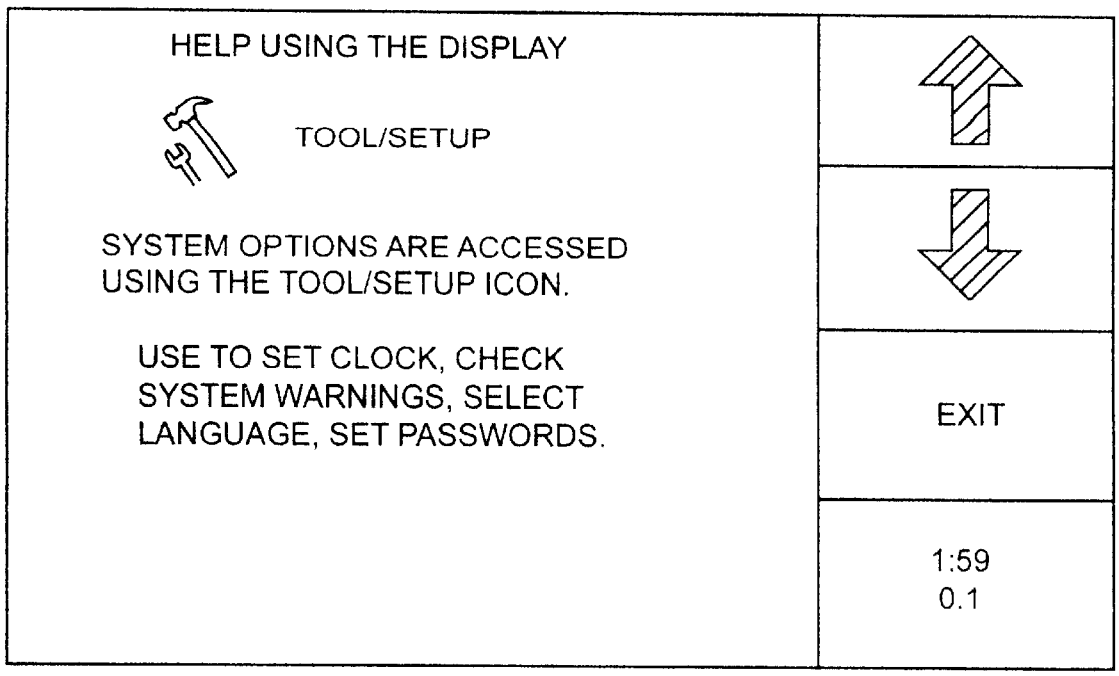
Figure 16D:
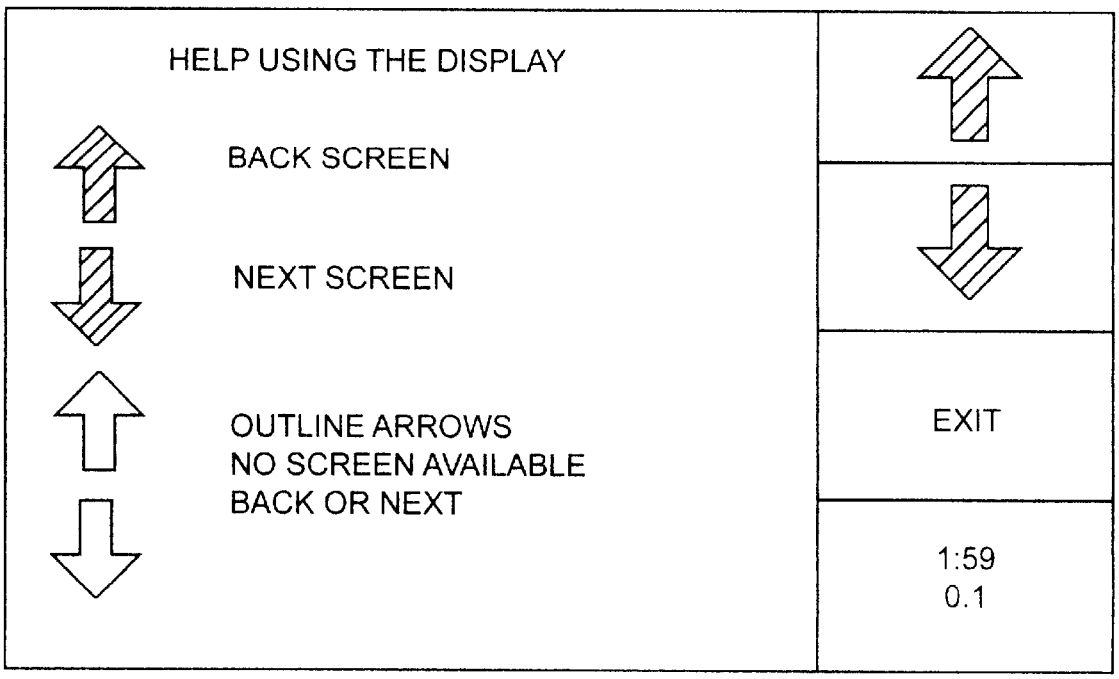
Figure 16E:
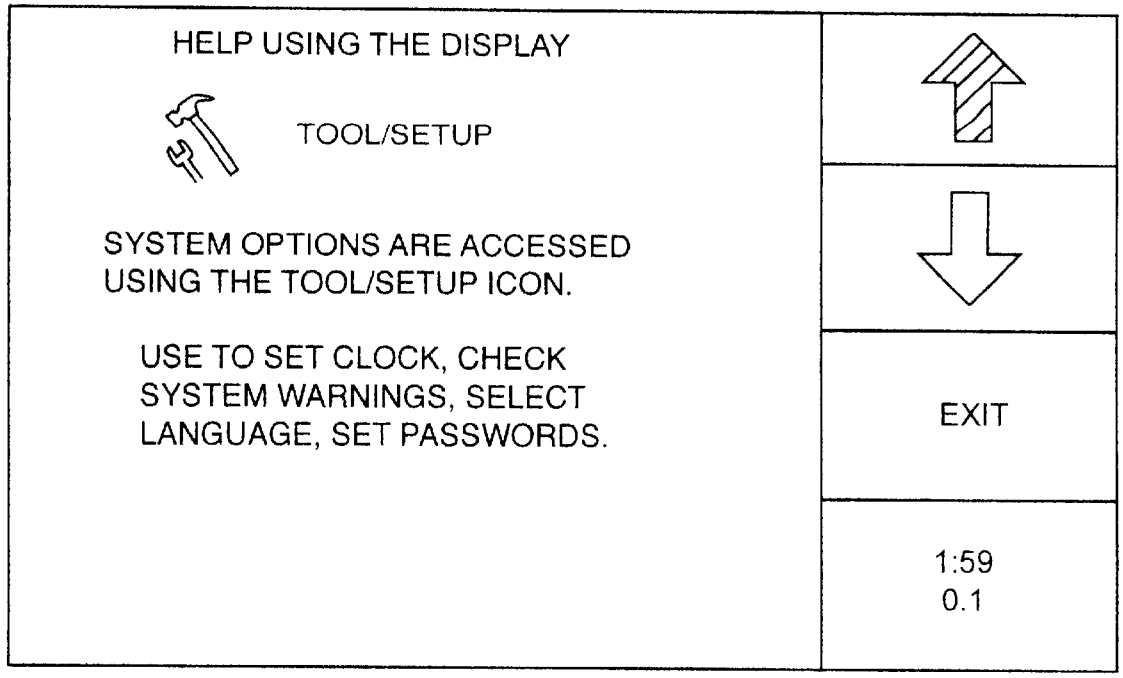

Additional help screens are provided from each screen which includes a question mark as one of the key prompts. For example, from the screen illustrated in FIG. 7B, if the user presses the button associated with the question mark prompt 114, system 70 displays a screen such as that illustrated in FIG. 16A which provides the user with an indication of various symbols on the screen in FIG. 7B. Similarly, the solid downward facing arrow indicates that there are additional pages which can be viewed for help. Examples of such additional pages are illustrated in FIG. 162–16E.

Figure 17A:
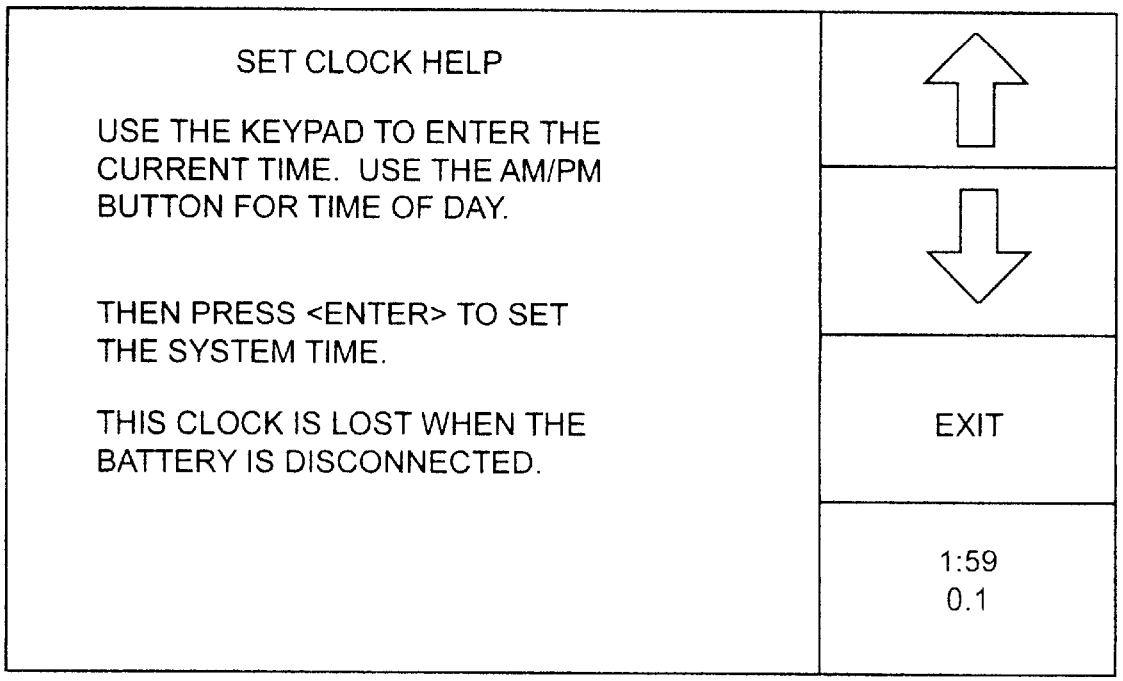
Figure 17B:
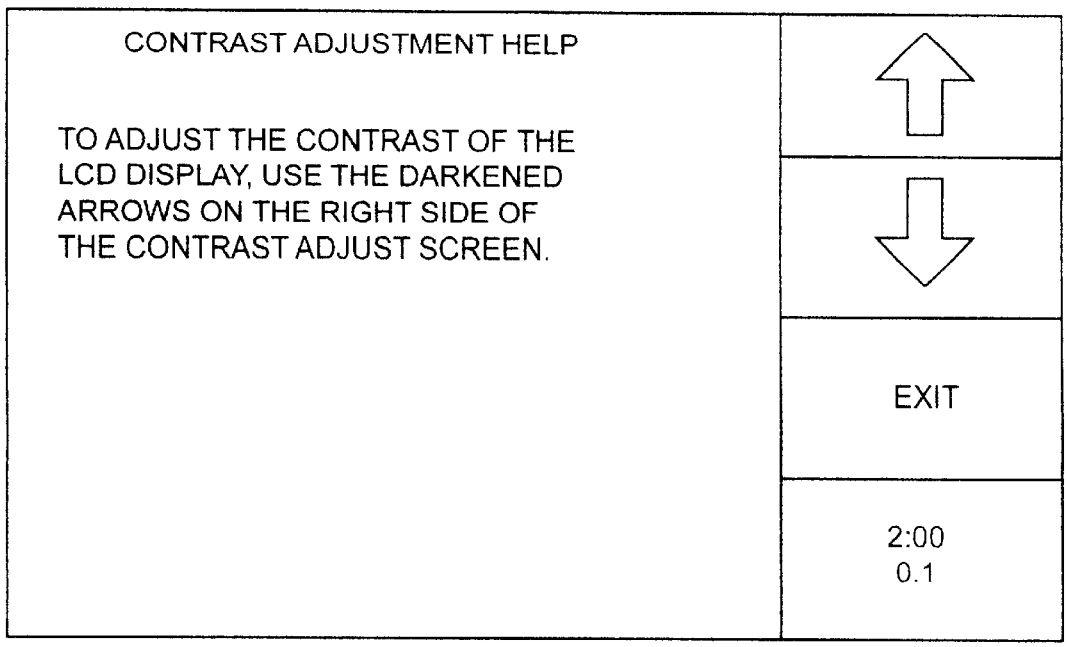
Figure 17C:
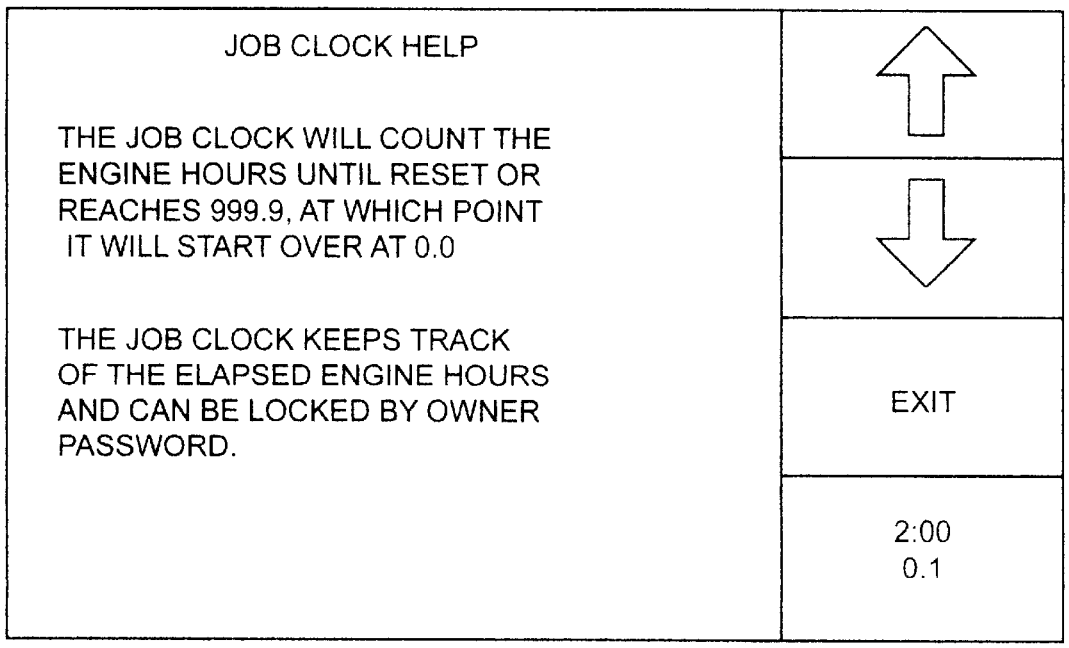

Of course, help screens can be provided for a number of other items as well. For instance, where the user wishes to have help setting the clock in the screen illustrated in FIG. 9D, the user simply presses the button associated with the question mark prompt and system 70 displays a screen such as that illustrated in FIG. 17A. Similarly, a help screen for setting the contrast adjustment at the screen shown in FIG. 9F is illustrated in FIG. 17B, while a help screen associated with resetting the job clock at screen 9E is illustrated in FIG. 17C.

Figure 17D:
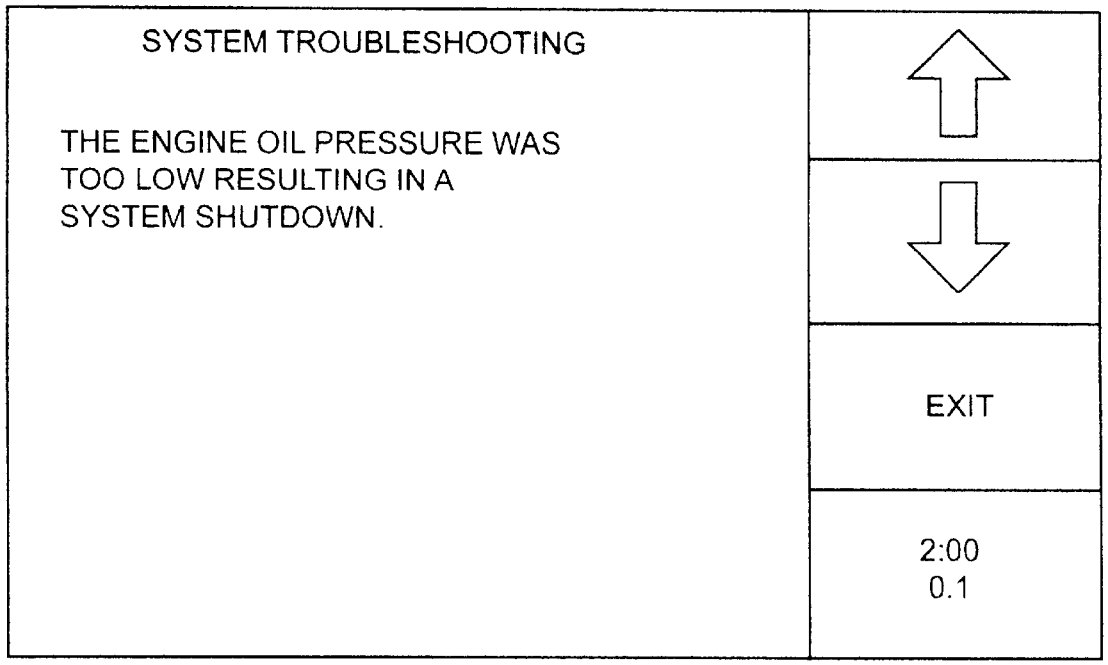
Figure 17E:
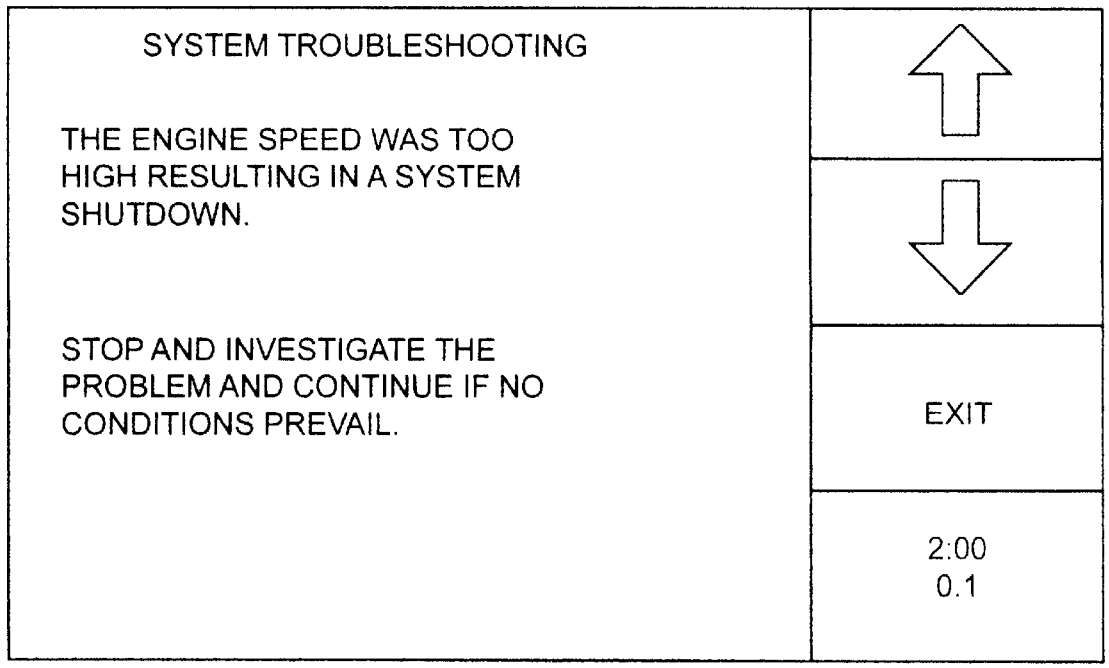
Figure 17F:
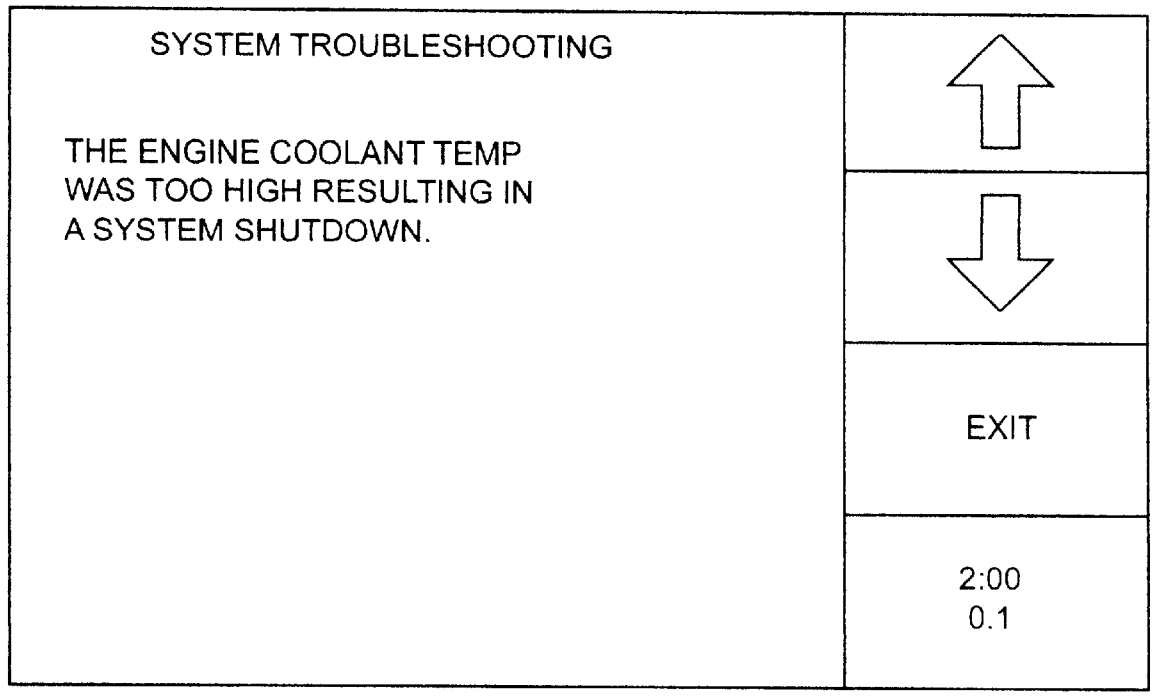

Other help screens can also be used in trouble shooting. For example, help screens can be linked to, or associated with, the active warnings or shut down conditions described earlier. In those instances, where the operator requests the help screen, those screens can be used to provide additional information regarding the causes of the active warning or shut down condition, and possible cures for the warning or shut down conditions. A number of exemplary help screens of this type are illustrated in FIGS. 17D, 17E and 17F which are associated with the shut down conditions based on engine oil pressure, the engine speed, and the engine coolant temperature.

CONCLUSION

Thus, it can be seen that the present invention can provide one or more features which enhance functionality. In one illustrative embodiment, controller 72 renders the various displays described herein as bit map images which are retrieved from display memory 73. However, other image rendering techniques can be used as well. Similarly, while the present invention has provided button prompts and separate buttons, discrete from the display screen, it will be appreciated that other arrangements can be used as well. For example, a touch sensitive screen can be used to implement operator selection or actuation of the various features described herein.

Although the present invention has been described with reference to preferred embodiments, workers skilled in the art will recognize that changes may be made in form and detail without departing from the spirit and scope of the invention.

What is claimed is:

1. In a skid steer loader, a user interface system providing a user interface to a control system on the skid steer loader, the control system sensing operating conditions and providing sensed condition signals indicative of the sensed operating conditions and also being configured to sense warning conditions and provide a bit mapped warning display illustrating information indicative of a sensed warning condition, wherein the warning display includes a scroll prompt indicating a user input necessary to scroll through warning displays corresponding to current sensed warning conditions, the user interface system comprising:
   a controller configured to receive the sensed condition signals and to provide display instructions based on the sensed conditions signals received from the control system; and
   a display device, coupled to the controller, providing a bit mapped operating condition display of the sensed operating conditions based on the display instructions.

2. The user interface system of claim 1 wherein the controller updates the display instructions, based on the sensed condition signals, at an update rate sufficient to provide substantially real time display of the sensed operating conditions.

3. The user interface system of claim 1 wherein the bit mapped operating condition display illustrates a gauge indicative of each of a plurality of the sensed operating conditions.

4. The user interface system of claim 3 wherein the sensed operating conditions include a plurality of engine speed, oil pressure, oil temperature, and system voltage.

5. The user interface system of claim 1 wherein the display device comprises:
   a liquid crystal display device.

6. The user interface system of claim 1 wherein the display device comprises:
   a touch sensitive display device.

7. The user interface system of claim 1 wherein the display device comprises:
   a cathode ray tube display device.

8. The user interface system of claim 1 and further comprising a user input device coupled to the controller for receiving a user input and providing a user input signal based on the user input received.

9. The user inerface system of claim 8 wherein the control system is configured to sense shutdown conditions and provide a shutdown signal indicative of the shutdown condition and wherein the controller receives the shutdown signal and provides a bit mapped shutdown display indicative of the shutdown condition.

10. The user interface system of claim 9 wherein the shutdown display includes a diagnostic prompt indicating a user input required to view a diagnostic display which illustrates diagnostic information related to the shutdown condition.

11. The user interface system of claim 9 wherein the shutdown display includes an indication of a specific function or piece of equipment which has failed and a nature of the failure.

12. The user interface system of claim 8 wherein the warning display includes a diagnostic prompt indicating a user input necessary to view a corresponding diagnostic display illustrating diagnostic information related to the warning condition.

13. The user interface of claim 8 wherein the warning display includes an indication of a specific function or piece of equipment causing the warning condition and a nature of the cause of the warning condition.

14. The user interface system of claim 1 and further comprising:
   a bit map memory coupled to the controller, storing display information indicative of a plurality of the bit mapped displays provided by the controller.

15. The user interface system of claim 14 wherein the controller accesses at least a portion of the display information indicative of the bit mapped displays based on the sensed condition signals.

16. The user interface system of claim 15 wherein the user interface system further comprises:
   a user input device for receiving a user input and providing a user input signal indicative of the user input, wherein a plurality of the bit mapped displays are linked such that the controller accesses the display information and displays subsequent bit mapped displays based on the user input signal.

17. The user interface system of claim 16 wherein the subsequent bit mapped displays include help screens providing user help information.

18. The user interface system of claim 16 wherein the subsequent bit mapped displays include diagnostic screens providing diagnostic information.

19. The user interface system of claim 16 wherein the subsequent bit mapped displays include tutorial screens providing tutorial information regarding operation of the skid steer loader.

20. In a skid steer loader, a user interface system providing a user interface to a control system on the skid steer loader, the control system sensing operating conditions and providing sensed condition signals indicative of the sensed operating conditions, the user interface system comprising:
   a controller configured to receive the sensed condition signals and to provide display instructions based on the sensed condition signals received from the control system, wherein the control system is configured to sense warning conditions and provide a bit mapped warning display illustrating information indicative of a sensed warning condition, and wherein the warning display includes a diagnostic prompt indicating a user input necessary to view a corresponding diagnostic display illustrating diagnostic information, including troubleshooting information, related to the warning condition;
   a display device, coupled to the controller, providing a bit mapped operating condition display of the sensed operating conditions based on the display instructions; and
   a user input device coupled to the controller for receiving a user input and providing a user input signal based on the user input received.

21. In a power machine having operator actuable inputs, a user interface system providing a user interface to a control system on the power machine, the user interface system comprising:
   an operator input device receiving an operator input and providing an operator input signal indicative of the operator input received, the input signal being indicative of a tutorial request;

a controller configured to receive the operator input signal and to provide a tutorial signal indicative of tutorial information based on the tutorial request; and a display device, coupled to the controller, providing a bit mapped tutorial display based on the tutorial signal and indicative of a feature corresponding to the tutorial information and the tutorial information related to the feature, wherein the bitmapped tutorial display includes an illustration of the operator actuable inputs and a selection prompt corresponding to each of the operator actuable inputs illustrated.

22. The user interface system of claim 21 wherein the operator input device is configured to provide the operator input signal as being indicative of an operator selection of an illustrated operator actuable input and wherein the controller provides the tutorial signal to the display device such that the display device displays a tutorial display indicative of operation resulting from operator actuation of the selected operator actuable input.

23. The user interface system of claim 22 wherein the tutorial request requests information related to an attachment attached to the power machine.

24. The user interface system of claim 23 wherein the display device displays a series of displays for operator selection of a specific attachment.

25. The user interface system of claim 23 wherein the operator actuable inputs are located on hand grips on the power machine and wherein the bit mapped tutorial display includes a pictorial illustration of the hand grips and operator actuable inputs located thereon.

* * * * *